USO11046358B2

(12) United States Patent
Kodera et al.

(10) Patent No.: US 11,046,358 B2
(45) Date of Patent: Jun. 29, 2021

(54) VEHICLE CONTROL DEVICE

(71) Applicant: JTEKT CORPORATION, Osaka (JP)

(72) Inventors: Takashi Kodera, Okazaki (JP); Masayuki Kita, Okazaki (JP)

(73) Assignee: JTEKT CORPORATION, Osaka (JP)

( * ) Notice: Subject to any disclaimer, the term of this patent is extended or adjusted under 35 U.S.C. 154(b) by 416 days.

(21) Appl. No.: 15/975,862

(22) Filed: May 10, 2018

(65) Prior Publication Data

US 2018/0339725 A1 Nov. 29, 2018

(30) Foreign Application Priority Data

May 26, 2017 (JP) .............................. JP2017-104574
Sep. 19, 2017 (JP) .............................. JP2017-179078

(51) Int. Cl.
*B62D 5/04* (2006.01)
*B62D 6/00* (2006.01)

(52) U.S. Cl.
CPC ........... *B62D 5/046* (2013.01); *B62D 5/0421* (2013.01); *B62D 6/002* (2013.01); *B62D 6/008* (2013.01)

(58) Field of Classification Search
CPC combination set(s) only.
See application file for complete search history.

(56) References Cited

U.S. PATENT DOCUMENTS 8,544,592 B2 * 10/2013 Goutsu .................. B62D 6/002
  180/402
2014/0343794 A1 * 11/2014 Tamaizumi .......... B62D 5/0472
  701/42

FOREIGN PATENT DOCUMENTS

EP        2 803 558 A2   11/2014
JP        2014-148299 A   8/2014

OTHER PUBLICATIONS

Oct. 31, 2018 Extended European Search Report issued in European Patent Application No. 18172669.6.

* cited by examiner

*Primary Examiner* — Jacob D Knutson
*Assistant Examiner* — Harold Eric Pahlck, III
(74) *Attorney, Agent, or Firm* — Oliff PLC

(57) ABSTRACT

An estimated axial force computation circuit of a control device has an axial force computation circuit that computes an axial force that acts on a steered shaft on the basis of a current value of a steering motor. The estimated axial force computation circuit has a friction compensation circuit, an efficiency compensation circuit, and a gradient compensation circuit as static characteristic computation circuits that compensate for an effect of the static characteristics of a steering mechanism on the axial force computed. The estimated axial force computation circuit has a filter as a dynamic characteristic computation circuit that compensates for an effect of the dynamic characteristics of the steering mechanism. The filter removes, from the axial force, an effect of the viscosity and the inertia of the steering motor. The axial force after compensation is used to control a reaction force motor.

13 Claims, 38 Drawing Sheets

AFTER EFFICIENCY COMPENSATION
(CHARACTERISTICS OF SYSTEM)

AFTER GRADIENT COMPENSATION
(CHARACTERISTICS OF VEHICLE)

VEHICLE CONTROL DEVICE

INCORPORATION BY REFERENCE

The disclosure of Japanese Patent Application No. 2017-104574 filed on May 26, 2017 and No. 2017-179078 filed on Sep. 19, 2017 including the specification, drawings and abstract, is incorporated herein by reference in its entirety.

BACKGROUND OF THE INVENTION

1. Field of the Invention

The present invention relates to a vehicle control device.

2. Description of the Related Art

There has hitherto been known a steering device of a so-called steer-by-wire type in which a steering wheel and steered wheels are mechanically separated from each other. The steering device has a reaction force motor that is a generation source for a steering reaction force to be applied to a steering shaft and a steering motor that is a generation source for a steering force for steering the steered wheels. When the vehicle travels, a control device of the steering device generates a steering reaction force through the reaction force motor, and steers the steered wheels through the steering motor.

In the steering device of the steer-by-wire type, the steering wheel and the steered wheels are mechanically separated from each other, and therefore a road surface reaction force that acts on the steered wheels is not easily transmitted to the steering wheel. Thus, it is difficult for a driver to feel the road surface status as the steering reaction force (response) to be felt by his/her hands through the steering wheel.

Thus, the control device described in Japanese Patent Application Publication No. 2014-148299 (JP 2014-148299 A) computes a feedforward axial force, which is an ideal rack axial force based on the steering angle, and a feedback axial force, which is an estimated axial force based on the state amounts (lateral acceleration, steering current, and yaw rate) of the vehicle. The feedback axial force is computed on the basis of a blended axial force obtained by summing up axial forces individually computed for the respective state amounts of the vehicle at predetermined allocation ratios. The control device sums up the feedforward axial force and the feedback axial force at predetermined allocation ratios to compute the final axial force, and controls the reaction force motor on the basis of the final axial force. The feedback axial force reflects the road surface status (road surface information), and therefore the steering reaction force which is generated by the reaction force motor also reflects the road surface information. Thus, the driver can feel the road surface information as the road surface reaction force.

The estimated axial force contains an inertia component due to the inertia of the steering motor etc. and a viscosity component due to viscosity, for example, as unwanted components due to mechanical elements of the steering device. In addition, the estimated axial force also contains unwanted components (noise, distortion) due to the transfer characteristics (the frequency characteristics of a transfer function) of the control device. Further, unwanted components generated under the effect of the friction etc. of the steering device are also superimposed on the estimated axial force. It has been desired to compute a more appropriate estimated axial force in order to transmit the road surface state to the driver as a steering reaction force more appropriately.

SUMMARY OF THE INVENTION

It is an object of the present invention to provide a vehicle control device that is capable of transmitting a road surface state to a driver as a steering reaction force more appropriately.

An aspect of the present invention provides a vehicle control device that controls a motor that serves as a generation source for a drive force to be applied to a steering mechanism of a vehicle on the basis of a command value computed in accordance with a steering state, including: a first computation circuit that computes a first component of the command value in accordance with at least steering torque; a second computation circuit that computes a target rotational angle for a rotary body that rotates in conjunction with steering operation of steered wheels on the basis of basic drive torque which is a total sum of the steering torque and the first component; and a third computation circuit that computes a second component of the command value through feedback control for causing an actual rotational angle of the rotary body to coincide with the target rotational angle. The second computation circuit includes an estimated axial force computation circuit that computes an axial force that acts on the steered wheels on the basis of a current value of the motor. The second computation circuit also includes at least one of a dynamic characteristic computation circuit that compensates for an effect of dynamic characteristics of the steering mechanism on the axial force, which is computed by the estimated axial force computation circuit, and a static characteristic computation circuit that compensates for an effect of static characteristics of the steering mechanism on the axial force, which is computed by the estimated axial force computation circuit. The second computation circuit computes the target rotational angle with the basic drive torque reflecting the axial force, which has been compensated for by the at least one of the dynamic characteristic computation circuit and the static characteristic computation circuit, as a reaction force component for the basic drive torque.

The current value of the motor which generates the drive force to be applied to the steering mechanism reflects the road surface state (road surface reaction force). Therefore, the target rotational angle, which is computed on the basis of the basic drive torque which reflects the axial force which acts on the steered wheels and which matches the current value of the motor as the reaction force component, and hence the second component of the command value, which is computed through the feedback control for causing the actual rotational angle to coincide with the target rotational angle, also reflect the road surface state.

In the case where the second computation circuit includes the dynamic characteristic computation circuit, at least an effect of the dynamic characteristics of the steering mechanism on the axial force which matches the current value of the motor is compensated for. That is, a more appropriate axial force that matches the road surface state is computed by removing at least the effect of the dynamic characteristics of the steering mechanism from the axial force which matches the current value of the motor. With the axial force after compensation used as the reaction force component for the basic drive torque, the second component of the command value reflects the road surface state more appropriately. With the command value determined in consideration of the second component which is more appropriate, the drive force which is generated by the motor also reflects the road surface state more appropriately. The driver can obtain a more appropriate steering reaction force that matches the road surface state as a response.

In the case where the second computation circuit includes the static characteristic computation circuit, meanwhile, at least an effect of the static characteristics of the steering mechanism on the axial force which matches the current value of the motor is compensated for. A more appropriate axial force that matches the road surface state is computed by removing at least the effect of the static characteristics of the steering mechanism from the axial force which matches the current value of the motor.

Further, in the case where the second computation circuit includes both the dynamic characteristic computation circuit and the static characteristic computation circuit, an effect of both the dynamic characteristics and the static characteristics of the steering mechanism on the axial force which matches the current value of the motor is compensated for. A more appropriate axial force that matches the road surface state is computed by removing the effect of both the dynamic characteristics and the static characteristics of the steering mechanism from the axial force which matches the current value of the motor.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

A first embodiment in which a vehicle control device according to the present invention is applied to a steering device of a steer-by-wire type will be described below.

Figure 1:
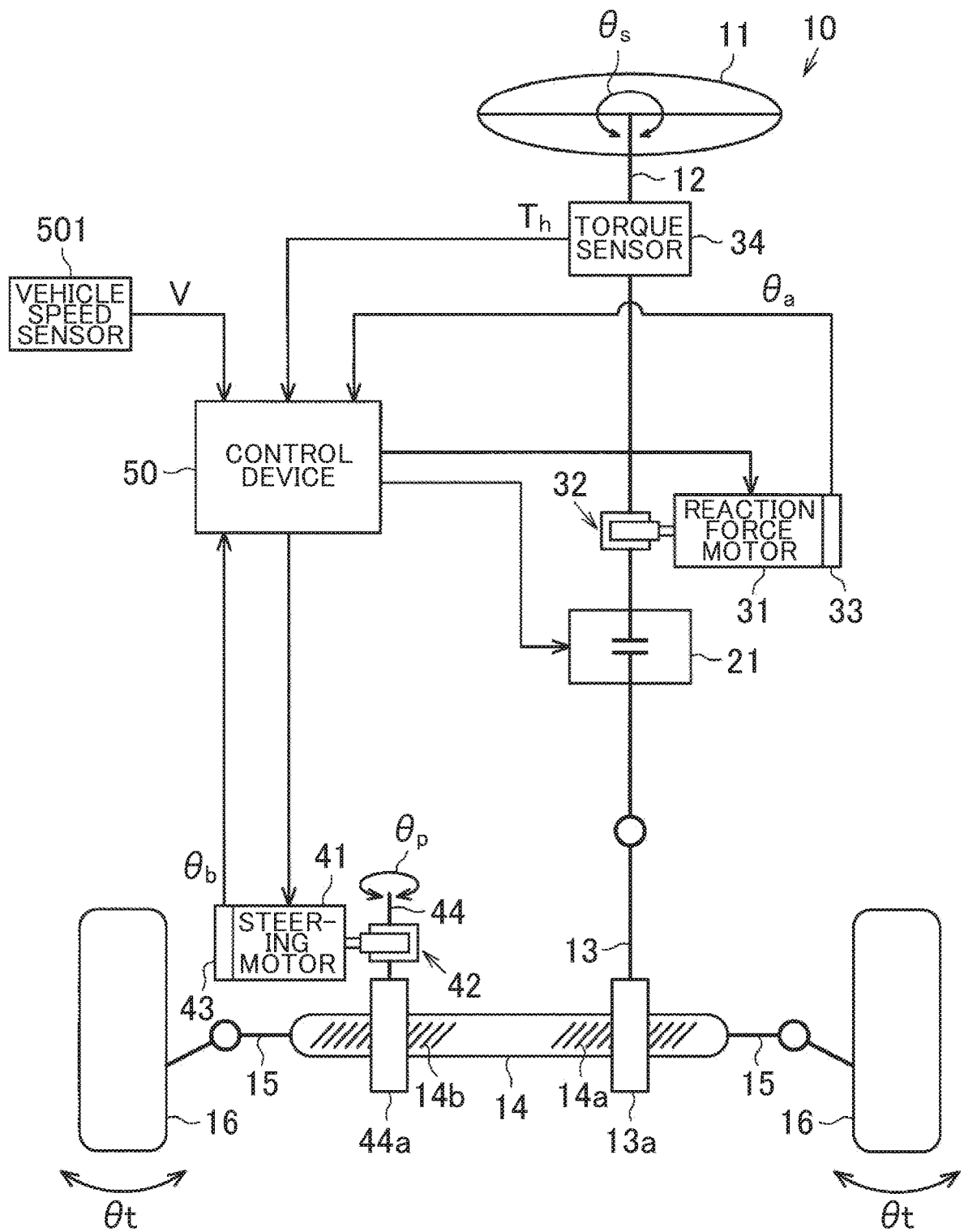
FIG. 1 is a diagram illustrating the configuration of a steering device of a steer-by-wire type on which a vehicle control device according to a first embodiment is mounted.

As illustrated in FIG. 1, a steering device 10 of a vehicle has a steering shaft 12 coupled to a steering wheel 11. A pinion shaft 13 is provided at an end portion of the steering shaft 12 on the opposite side from the steering wheel 11. Pinion teeth 13a of the pinion shaft 13 are meshed with rack teeth 14a of a steered shaft 14 that extends in a direction that crosses the pinion shaft 13. Right and left steered wheels 16 are coupled to both ends of the steered shaft 14 via tie rods 15 and 15. The steering shaft 12, the pinion shaft 13, and the steered shaft 14 function as a power transfer path between the steering wheel 11 and the steered wheels 16. That is, a steered angle θt of the steered wheels 16 is changed in accordance with linear motion of the steered shaft 14 along with a rotational operation of the steering wheel 11.

The steering device 10 also has a clutch 21. The clutch 21 is provided on the steering shaft 12. An electromagnetic clutch that turns on and off transmission of power by turning on and off energization of an excitation coil is adopted as the clutch 21. When the clutch 21 is disengaged, the power transfer path between the steering wheel 11 and the steered wheels 16 is mechanically decoupled. When the clutch 21 is engaged, power transfer between the steering wheel 11 and the steered wheels 16 is mechanically coupled.

The steering device 10 also has a reaction force motor 31, a speed reduction mechanism 32, a rotational angle sensor 33, and a torque sensor 34 as components (reaction force unit) for generating a steering reaction force. The steering reaction force refers to a force (torque) that acts in a direction opposite to the direction of an operation of the steering wheel 11 performed by a driver. It is possible to provide the driver with a suitable responsive feel by applying the steering reaction force to the steering wheel 11.

The reaction force motor 31 is a generation source for the steering reaction force. A three-phase (U, V, W) brushless motor, for example, is adopted as the reaction force motor 31. The reaction force motor 31 (a rotary shaft thereof, to be exact) is coupled to the steering shaft 12 via the speed reduction mechanism 32. The speed reduction mechanism 32 is provided on a portion of the steering shaft 12 on the steering wheel 11 side with respect to the clutch 21. Torque from the reaction force motor 31 is applied to the steering shaft 12 as the steering reaction force.

The rotational angle sensor 33 is provided to the reaction force motor 31. The rotational angle sensor 33 detects a rotational angle $\theta_a$ of the reaction force motor 31. The rotational angle $\theta_a$ of the reaction force motor 31 is used to compute a steering angle $\theta_s$. The reaction force motor 31 and the steering shaft 12 operate in conjunction with each other via the speed reduction mechanism 32. Therefore, there is a correlation between the rotational angle $\theta_a$ of the reaction force motor 31 and the rotational angle of the steering shaft 12, and hence the steering angle $\theta_s$ which is the rotational angle of the steering wheel 11. Thus, the steering angle $\theta_s$ can be calculated on the basis of the rotational angle $\theta_a$ of the reaction force motor 31.

The torque sensor 34 detects steering torque $T_h$ applied to the steering shaft 12 through an operation to rotate the steering wheel 11. The torque sensor 34 is provided on a portion of the steering shaft 12 on the steering wheel 11 side with respect to the speed reduction mechanism 32.

The steering device 10 also has a steering motor 41, a speed reduction mechanism 42, and a rotational angle sensor 43 as components (steering unit) for generating a steering force which is power for steering the steered wheels 16.

The steering motor 41 is a generation source for the steering force. A three-phase brushless motor, for example, is adopted as the steering motor 41. The steering motor 41 (a rotary shaft thereof, to be exact) is coupled to a pinion shaft 44 via the speed reduction mechanism 42. Pinion teeth 44a of the pinion shaft 44 are meshed with rack teeth 14b of the steered shaft 14. Torque from the steering motor 41 is applied to the steered shaft 14 via the pinion shaft 44 as the steering force. The steered shaft 14 is moved along the vehicle width direction (right-left direction in the drawing) in accordance with rotation of the steering motor 41. The rotational angle sensor 43 is provided to the steering motor 41. The rotational angle sensor 43 detects a rotational angle $\theta_b$ of the steering motor 41.

The steering device 10 also has a control device 50. The control device 50 controls the reaction force motor 31, the steering motor 41, and the clutch 21 on the basis of the results of detection performed by various sensors. The sensors include the rotational angle sensor 33, the torque sensor 34, and the rotational angle sensor 43 discussed earlier and a vehicle speed sensor 501. The vehicle speed sensor 501 is provided in the vehicle, and detects a vehicle speed V which is the travel speed of the vehicle.

The control device 50 executes on/off control for switching the clutch 21 on and off on the basis of whether or not a clutch engagement condition is met. Examples of the clutch engagement condition include a power switch of the vehicle being turned off. When the clutch engagement condition is not met, the control device 50 switches the clutch 21 from the engaged state to the disengaged state by energizing the excitation coil of the clutch 21. When the clutch engagement condition is met, meanwhile, the control device 50 switches the clutch 21 from the disengaged state to the engaged state by de-energizing the excitation coil of the clutch 21.

The control device 50 executes reaction force control for generating a steering reaction force that matches the steering torque $T_h$ through drive control for the reaction force motor 31. The control device 50 computes a target steering reaction force on the basis of at least the steering torque $T_h$, among the steering torque $T_h$ and the vehicle speed V, and computes a target steering angle for the steering wheel 11 on the basis of the computed target steering reaction force, the steering torque $T_h$, and the vehicle speed V. The control device 50 computes a steering angle correction amount through feedback control for the steering angle $\theta_s$, which is executed in order to cause the actual steering angle $\theta_s$ to follow the target steering angle, and adds the computed steering angle correction amount to the target steering reaction force to compute a steering reaction force command value. The control device 50 supplies the reaction force motor 31 with a current required to generate a steering reaction force that matches the steering reaction force command value.

The control device 50 executes steering control in which the steered wheels 16 are steered in accordance with the steering state through drive control for the steering motor 41. The control device 50 computes a pinion angle $\theta_p$, which is the actual rotational angle of the pinion shaft 44, on the basis of the rotational angle $\theta_b$ of the steering motor 41, which is detected through the rotational angle sensor 43. The pinion angle $\theta_p$ is a value that reflects the steered angle θt of the steered wheels 16. The control device 50 computes a target pinion angle using the target steering angle discussed earlier. Then, the control device 50 calculates a deviation between the target pinion angle and the actual pinion angle $\theta_p$, and controls power supply to the steering motor 41 so as to eliminate the deviation.

Figure 2:
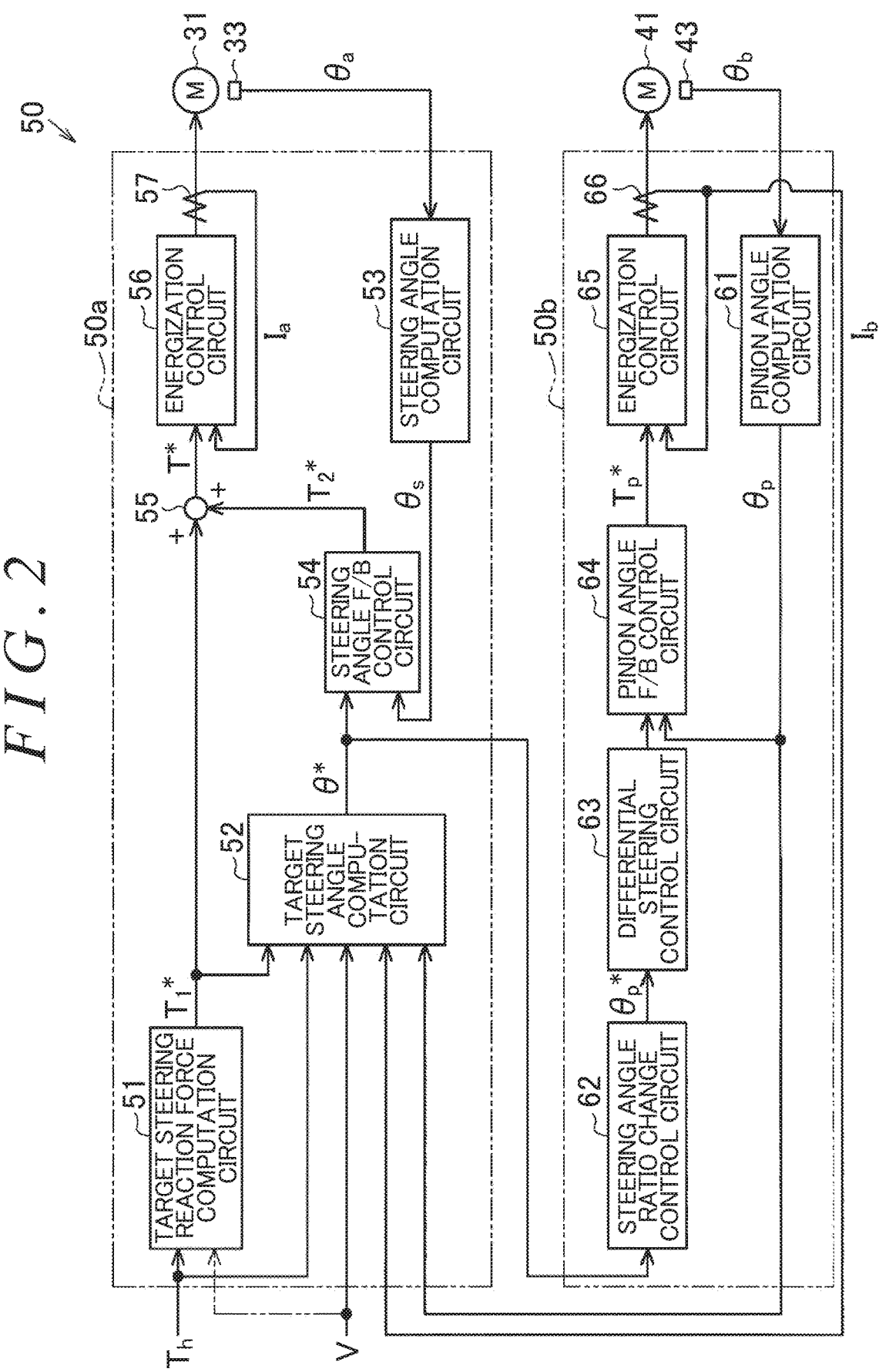
FIG. 2 is a control block diagram of an electronic control device according to the first embodiment.

Next, the configuration of the control device 50 will be described in detail. As illustrated in FIG. 2, the control device 50 has a reaction force control circuit 50a that executes reaction force control and a steering control circuit 50b that executes steering control.

The reaction force control circuit 50a has a target steering reaction force computation circuit 51, a target steering angle computation circuit 52, a steering angle computation circuit 53, a steering angle feedback control circuit 54, an adder 55, and an energization control circuit 56.

The target steering reaction force computation circuit 51 computes a target steering reaction force $T_1^*$ on the basis of the steering torque $T_h$. The target steering reaction force computation circuit 51 may compute the target steering reaction force $T_1^*$ in consideration of the vehicle speed V.

The target steering angle computation circuit 52 computes a target steering angle θ* for the steering wheel 11 on the basis of the target steering reaction force $T_1^*$, the steering torque $T_h$, and the vehicle speed V. The target steering angle computation circuit 52 has an ideal model that determines an ideal steering angle on the basis of basic drive torque when the total sum of the target steering reaction force $T_1^*$ and the steering torque $T_h$ is defined as the basic drive torque (input torque). The ideal model is obtained by preliminarily modeling a steering angle corresponding to an ideal steering angle that matches the basic drive torque through an experiment or the like. The target steering angle computation circuit 52 adds the target steering reaction force $T_1^*$ and the steering torque $T_h$ to calculate the basic drive torque, and computes the target steering angle θ* from the basic drive torque on the basis of the ideal model.

The steering angle computation circuit 53 computes the actual steering angle $\theta_s$ of the steering wheel 11 on the basis of the rotational angle $\theta_a$ of the reaction force motor 31, which is detected through the rotational angle sensor 33. The steering angle feedback control circuit 54 computes a steering angle correction amount $T_2^*$ through feedback control for the steering angle $\theta_s$ in order to cause the actual steering angle $\theta_s$ to follow the target steering angle θ*. The adder 55 adds the steering angle correction amount $T_2^*$ to the target steering reaction force $T_1^*$ to calculate a steering reaction force command value T*.

The energization control circuit 56 supplies electric power that matches the steering reaction force command value T* to the reaction force motor 31. Specifically, the energization control circuit 56 computes a current command value for the reaction force motor 31 on the basis of the steering reaction force command value T*. In addition, the energization control circuit 56 detects an actual current value $I_a$ caused in a power supply path for the reaction force motor 31 through a current sensor 57 provided in the power supply path. The current value $I_a$ is the value of the actual current to be supplied to the reaction force motor 31. Then, the energization control circuit 56 calculates a deviation between the current command value and the actual current value $I_a$, and controls power supply to the reaction force motor 31 so as to eliminate the deviation (feedback control for the current $I_a$). Consequently, the reaction force motor 31 generates torque that matches the steering reaction force command value T*. It is possible to provide the driver with a suitable responsive feel that matches the road surface reaction force.

As illustrated in FIG. 2, the steering control circuit 50b has a pinion angle computation circuit 61, a steering angle ratio change control circuit 62, a differential steering control circuit 63, a pinion angle feedback control circuit 64, and an energization control circuit 65.

The pinion angle computation circuit 61 computes the pinion angle $\theta_p$, which is the actual rotational angle of the pinion shaft 13, on the basis of the rotational angle $\theta_b$ of the steering motor 41, which is detected through the rotational angle sensor 43. As discussed earlier, the steering motor 41 and the pinion shaft 13 operate in conjunction with each other via the speed reduction mechanism 42. Therefore, there is a correlation between the rotational angle $\theta_b$ of the steering motor 41 and the pinion angle $\theta_p$. The pinion angle $\theta_p$ can be calculated from the rotational angle $\theta_b$ of the steering motor 41 by utilizing the correlation. Further, as also discussed earlier, the pinion shaft 13 is meshed with the steered shaft 14. Therefore, there is also a correlation between the pinion angle $\theta_p$ and the amount of movement of the steered shaft 14. That is, the pinion angle $\theta_p$ is a value that reflects the steered angle θt of the steered wheels 16.

The steering angle ratio change control circuit 62 sets a steering angle ratio, which is the ratio of the steered angle θt to the steering angle $\theta_s$, in accordance with the travel state (e.g. vehicle speed V) of the vehicle, and computes a target pinion angle in accordance with the set steering angle ratio. The steering angle ratio change control circuit 62 computes a target pinion angle $\theta_p^*$ such that the steered angle θt becomes larger relative to the steering angle $\theta_s$ as the vehicle speed V becomes lower, and such that the steered angle θt becomes smaller relative to the steering angle $\theta_s$ as the vehicle speed V becomes higher. In order to achieve the steering angle ratio which is set in accordance with the travel state of the vehicle, the steering angle ratio change control circuit 62 computes a correction angle for the target steering angle θ*, and adds the computed correction angle to the target steering angle θ* to compute the target pinion angle $\theta_p^*$ which matches the steering angle ratio.

The differential steering control circuit 63 differentiates the target pinion angle $\theta_p$ to compute the variation speed (steered speed) of the target pinion angle $\theta_p$. In addition, the differential steering control circuit 63 multiplies the variation speed of the target pinion angle $\theta_p^*$ by a gain to compute a correction angle for the target pinion angle $\theta_p^*$. The differential steering control circuit 63 adds the correction angle to the target pinion angle $\theta_p^*$ to compute the final target pinion angle $\theta_p^*$. Steering delay is improved by advancing the phase of the target pinion angle $\theta_p$, which is computed by the steering angle ratio change control circuit 62. That is, the steering response is secured in accordance with the steered speed.

The pinion angle feedback control circuit 64 computes a pinion angle command value $T_p^*$ through feedback control (PID control) for the pinion angle $\theta_p$ in order to cause the actual pinion angle $\theta_p$ to follow the final target pinion angle $\theta_p^*$, which is computed by the differential steering control circuit 63.

The energization control circuit 65 supplies electric power that matches the pinion angle command value $T_p^*$ to the steering motor 41. Specifically, the energization control circuit 65 computes a current command value for the steering motor 41 on the basis of the pinion angle command value $T_p^*$. In addition, the energization control circuit 65 detects an actual current value $I_b$ caused in a power supply path for the steering motor 41 through a current sensor 66 provided in the power supply path. The current value $I_b$ is the value of the actual current to be supplied to the steering motor 41. Then, the energization control circuit 65 calculates a deviation between the current command value and the actual current value $I_b$, and controls power supply to the steering motor 41 so as to eliminate the deviation (feedback control for the current $I_b$). Consequently, the steering motor 41 is rotated by an angle that matches the pinion angle command value $T_p^*$.

Next, the target steering angle computation circuit 52 will be described in detail. As discussed earlier, the target steering angle computation circuit 52 computes the target steering angle $\theta^*$ from the basic drive torque, which is the total sum of the target steering reaction force $T_1^*$ and the steering torque $T_h$, on the basis of the ideal model. The ideal model is a model that utilizes a fact that basic drive torque $T_{in}^*$, which is torque to be applied to the steering shaft 12, is represented by the following formula (1).

$$T_{in}^* = J\theta^{*\prime\prime} + C\theta^{*\prime} + K\theta^* \tag{1}$$

In the formula, J is the moment of inertia of the steering wheel 11 and the steering shaft 12. C is the viscosity coefficient (friction coefficient) corresponding to the friction of the steered shaft 14 with respect to a housing or the like. K is the spring coefficient with each of the steering wheel 11 and the steering shaft 12 considered as a spring.

As seen from the formula (1), the basic drive torque $T_{in}^*$ is obtained by adding a value obtained by multiplying a second-order time differential value $\theta^{*\prime\prime}$ of the target steering angle $\theta^*$ by the moment of inertia J, a value obtained by multiplying a first-order time differential value $\theta^{*\prime}$ of the target steering angle $\theta^*$ by the viscosity coefficient C, and a value obtained by multiplying the target steering angle $\theta^*$ by the spring coefficient K. The target steering angle computation circuit 52 computes the target steering angle $\theta^*$ in accordance with the ideal model based on the formula (1).

Figure 3:
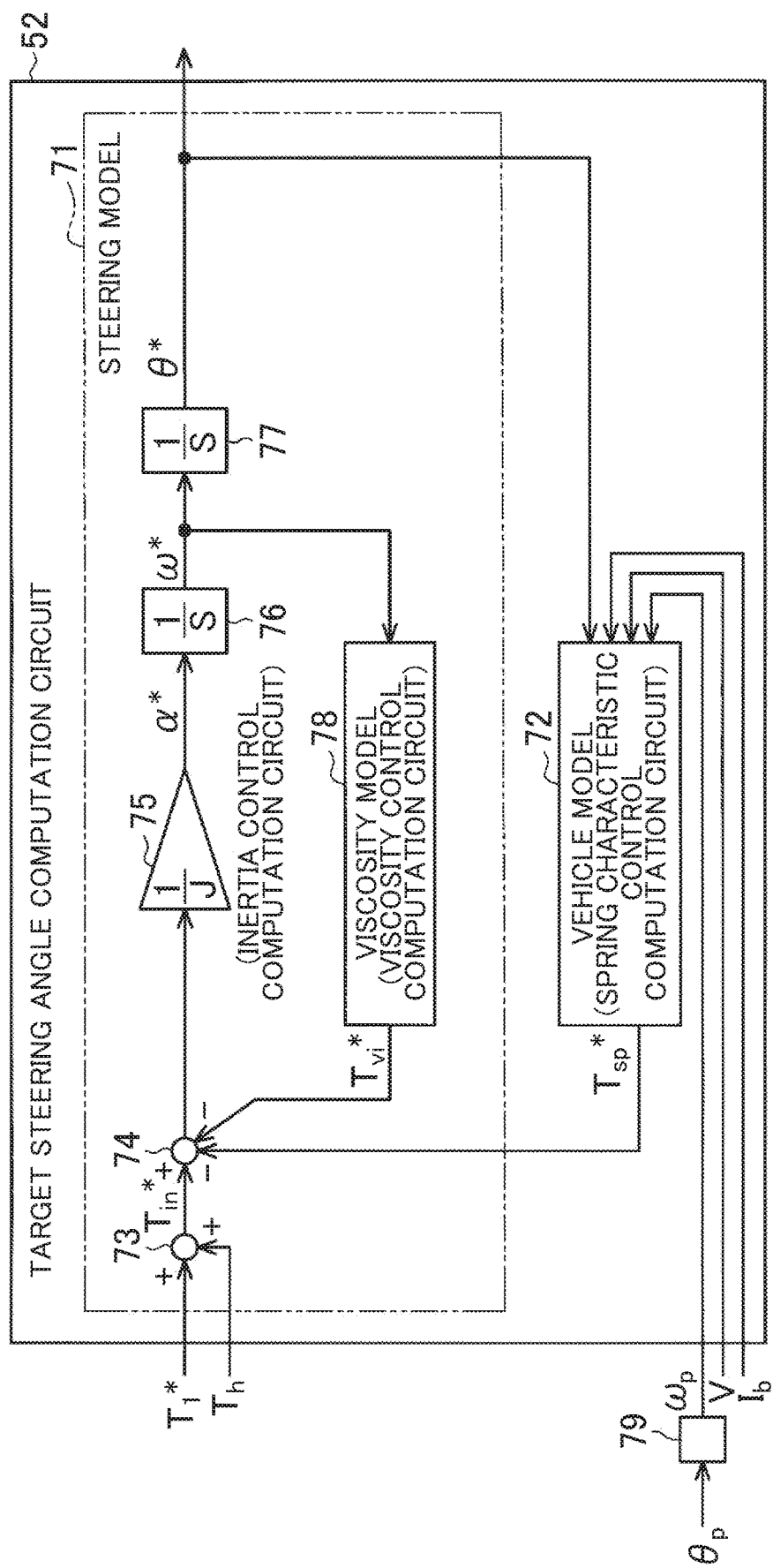
FIG. 3 is a control block diagram of a target steering angle computation circuit according to the first embodiment.

As illustrated in FIG. 3, the ideal model based on the formula (1) is divided into a steering model 71 and a vehicle model 72. The steering model 71 is tuned in accordance with the properties of constituent elements of the steering device 10 such as the steering shaft 12 and the reaction force motor 31. The steering model 71 has an adder 73, a subtractor 74, an inertia model 75, a first integrator 76, a second integrator 77, and a viscosity model 78.

The adder 73 adds the target steering reaction force $T_1^*$ and the steering torque $T_h$ to compute the basic drive torque $T_{in}^*$. The subtractor 74 subtracts a viscosity component $T_{vi}^*$ and a spring component $T_{sp}^*$ to be discussed later from the basic drive torque $T_{in}^*$, which is calculated by the adder 73, to compute the final basic drive torque $T_{in}^*$.

The inertia model 75 functions as an inertia control computation circuit corresponding to the inertia term of the formula (1). The inertia model 75 multiplies the final basic drive torque $T_{in}^*$, which is calculated by the subtractor 74, by the reciprocal of the moment of inertia J to compute a steering angle acceleration $\alpha^*$.

The first integrator 76 integrates the steering angle acceleration $\alpha^*$, which is calculated by the inertia model 75, to compute a steering angle speed $\omega^*$. The second integrator 77 further integrates the steering angle speed $\omega^*$, which is calculated by the first integrator 76, to compute the target steering angle $\theta^*$. The target steering angle $\theta^*$ is an ideal rotational angle of the steering wheel 11 (steering shaft 12) based on the steering model 71.

The viscosity model 78 functions as a viscosity control computation circuit corresponding to the viscous term of the formula (1). The viscosity model 78 multiplies the steering angle speed $\omega^*$, which is calculated by the first integrator 76, by the viscosity coefficient C to compute the viscosity component $T_{vi}^*$ of the basic drive torque $T_{in}^*$.

The vehicle model 72 is tuned in accordance with the properties of the vehicle on which the steering device 10 is mounted. The properties of the vehicle which affect the steering properties are decided in accordance with the specifications of suspensions and wheel alignment, the gripping force (friction force) of the steered wheels 16, and so forth, for example. The vehicle model 72 functions as a spring property control computation circuit corresponding to the spring term of the formula (1). The vehicle model 72 multiplies the target steering angle $\theta^*$, which is calculated by the second integrator 77, by the spring coefficient K to compute the spring component $T_{sp}^*$ (spring reaction force torque) of the basic drive torque $T_{in}^*$.

The vehicle model 72 computes the spring component $T_{sp}^*$ in consideration of the vehicle speed V and the current value $I_b$ of the steering motor 41, which is detected through the current sensor 66. In addition, the vehicle model 72 retrieves a pinion angle speed $\omega_p$. The pinion angle speed $\omega_p$ is obtained by a differentiator 79 provided in the control device 50 differentiating the pinion angle $\theta_p$, which is computed by the pinion angle computation circuit 61. The pinion shaft 13 is meshed with the steered shaft 14. Therefore, there is a correlation between the variation speed (pinion angle speed $\omega_p$) of the pinion angle $\theta_p$ and the movement speed (steered speed) of the steered shaft 14. That is, the pinion angle speed $\omega_p$ is a value that reflects the steered speed of the steered wheels 16. The steered speed can also be calculated from the pinion angle speed $\omega_p$ utilizing the correlation between the pinion angle speed $\omega_p$ and the steered speed.

With the thus configured target steering angle computation circuit 52, it is possible to directly tune the relationship between the basic drive torque $T_{in}^*$ and the target steering angle $\theta^*$, and hence to achieve desired steering properties, by adjusting the moment of inertia J and the viscosity coefficient C of the steering model 71 and the spring coefficient K of the vehicle model 72.

In addition, the target pinion angle $\theta_p^*$ is computed using the target steering angle $\theta^*$, which is computed from the basic drive torque $T_{in}^*$ on the basis of the steering model 71 and the vehicle model 72. The actual pinion angle $\theta_p$ is subjected to feedback control so as to coincide with the target pinion angle $\theta_p^*$. As discussed earlier, there is a correlation between the pinion angle $\theta_p$ and the steered angle θt of the steered wheels 16. Therefore, steering operation for the steered wheels 16 that matches the basic drive torque $T_{in}^*$ is also determined by the steering model 71 and the vehicle model 72. That is, the steering feel of the vehicle is decided by the steering model 71 and the vehicle model 72. Thus, a desired steering feel can be achieved by adjusting the steering model 71 and the vehicle model 72.

However, a steering reaction force (a response felt through steering), which is a force (torque) that acts in a direction opposite to the direction of steering by the driver, only matches the target steering angle θ*. That is, the steering reaction force is not varied in accordance with the road surface state (such as the slipperiness of the road surface). Therefore, it is difficult for the driver to grasp the road surface state through the steering reaction force. Thus, in the present example, the vehicle model 72 is configured as follows from the viewpoint of resolving such an apprehension.

Figure 4:
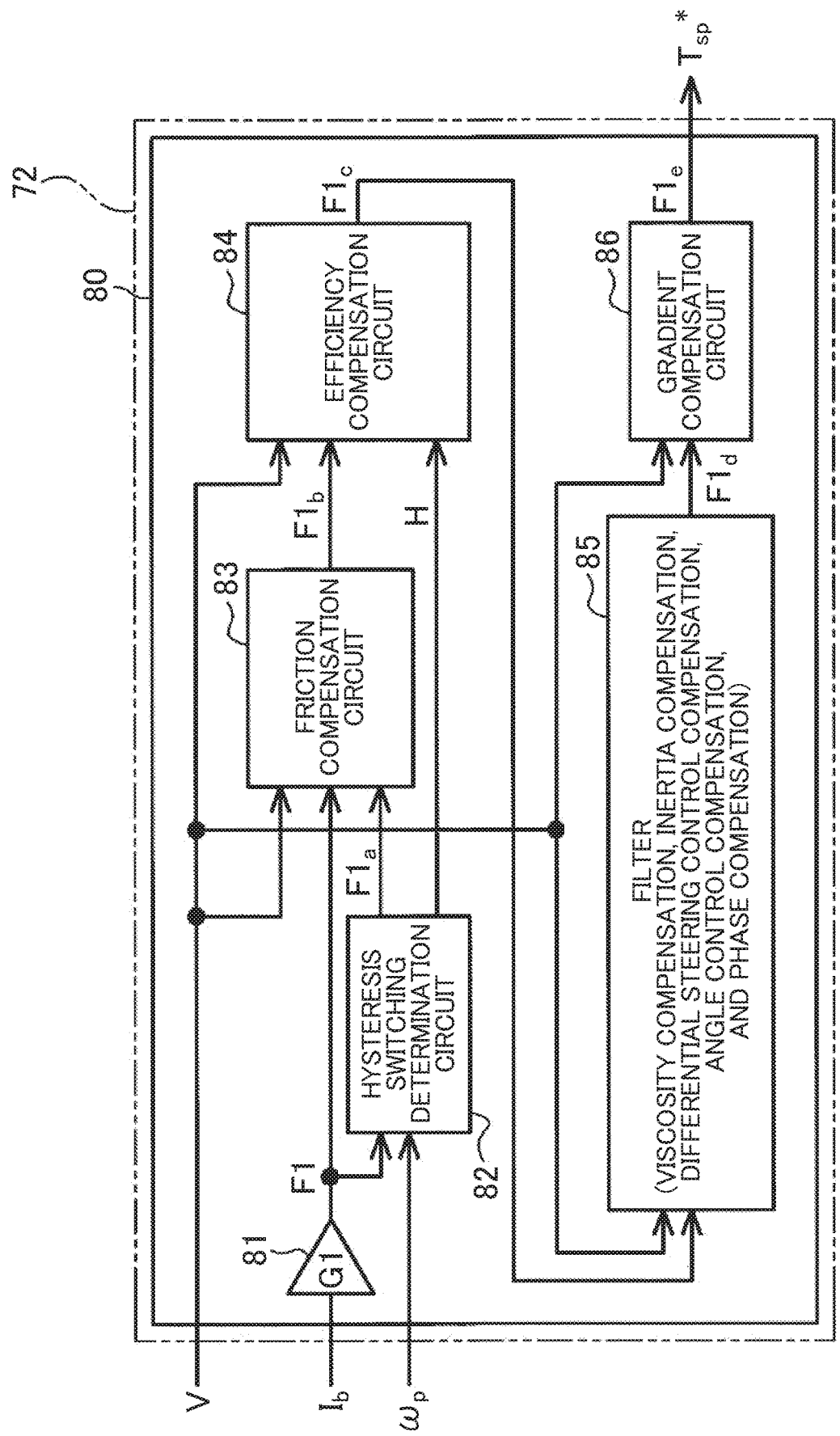
FIG. 4 is a control block diagram of a vehicle model (estimated axial force computation circuit) according to the first embodiment.

As illustrated in FIG. 4, the vehicle model 72 has an estimated axial force computation circuit 80. The estimated axial force computation circuit 80 has an axial force computation circuit 81, a hysteresis switching determination circuit 82, a friction compensation circuit 83, an efficiency compensation circuit 84, a filter 85, and a gradient compensation circuit 86.

The axial force computation circuit 81 computes an actual axial force F1 (road surface reaction force) that acts on the steered shaft 14 (steered wheels 16) on the basis of the following formula (2). The current value $I_b$ of the steering motor 41 is varied by the occurrence of a difference between the target pinion angle $θ_p$ and the actual pinion angle $θ_p$ due to disturbance that matches the road surface state (road surface frictional resistance) acting on the steered wheels 16. That is, the current value $I_b$ of the steering motor 41 reflects the actual road surface reaction force which acts on the steered wheels 16. Therefore, it is possible to compute an axial force that reflects the effect of the road surface state on the basis of the current value $I_b$ of the steering motor 41.

$$F1 = I_b \times G1 \quad (2)$$

In the formula, $I_b$ is the current value $I_b$ of the steering motor 41. G1 is a gain, and also a coefficient for converting a current value into an axial force (reaction force torque).

Figure 5:
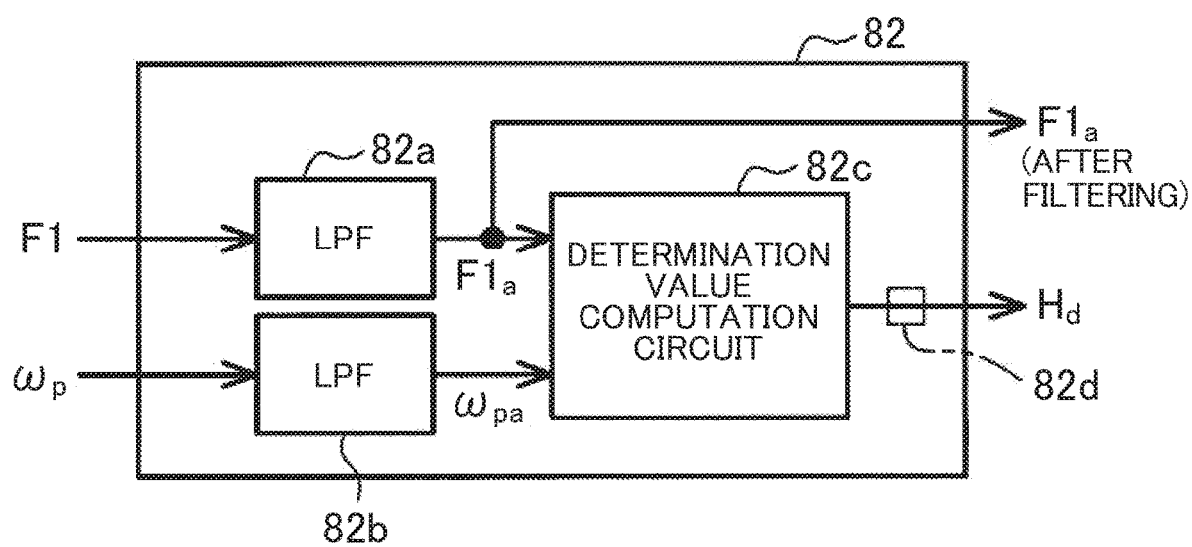
FIG. 5 is a control block diagram of a hysteresis switching determination circuit according to the first embodiment.

As illustrated in FIG. 5, the hysteresis switching determination circuit 82 has two low-pass filters 82a and 82b and a determination value computation circuit 82c. The low-pass filter 82a removes a frequency component such as noise contained in the axial force F1, which is computed by the axial force computation circuit 81. The low-pass filter 82b removes a frequency component such as noise contained in the pinion angle speed $ω_p$, which is computed by the differentiator 79. The determination value computation circuit 82c computes a hysteresis switching determination value $H_d$ on the basis of the following formula (3).

$$H_d = F1_a \times ω_{pa} \quad (3)$$

In the formula, $F1_a$ is an estimated axial force after being subjected to a filtering process performed by the low-pass filter 82a. $ω_{pa}$ is a pinion angle speed after being filtered by the low-pass filter 82b.

The hysteresis switching determination value $H_d$ is used to determine variations in the properties of the axial force due to the difference between the forward efficiency during forward operation of the steering device 10 and the reverse efficiency during reverse operation thereof. The forward efficiency refers to a (work) conversion efficiency for a case where rotational motion of the steering motor 41 is converted into linear motion of the steered shaft 14 (hereinafter referred to as "during forward operation") through meshing between the pinion shaft 44 and the steered shaft 14. In other words, the forward efficiency is a conversion efficiency at the time when the direction of movement of the steered shaft 14 that accompanies drive of the steering motor 41 and the direction of an axial force that actually acts on the steered shaft 14 are the same.

The reverse efficiency refers to a (work) conversion efficiency for a case where linear motion of the steered shaft 14 is converted into rotational motion of the steering motor 41 (hereinafter referred to as "during reverse operation") through meshing between the pinion shaft 44 and the steered shaft 14. In other words, the reverse efficiency is a conversion efficiency at the time when the direction of movement of the steered shaft 14 that accompanies drive of the steering motor 41 and the direction of an axial force that actually acts on the steered shaft 14 are opposite to each other. A situation in which an axial force acts on the steered shaft 14 with the steered wheels 16 steered due to projections and depressions of the road surface during travel of the vehicle, for example, is assumed as an example of a situation in which reverse operation occurs.

Output torque from the steering motor 41 for the same current supplied to the steering motor 41 differs between forward operation, in which the steering motor 41 operates to move the steered wheels 16 against the road surface reaction force, and reverse operation, in which the steering motor 41 is moved by a reaction force from the steered wheels 16. Therefore, a control deviation between the target steering angle θ* and the actual steering angle $θ_s$ differs between forward operation and reverse operation. That is, the following performance of the steering motor 41 differs between forward operation and reverse operation. In addition, the current value $I_b$ of the steering motor 41, and hence the axial force F1 which is computed on the basis of the current value $I_b$ of the steering motor 41, also differ between forward operation and reverse operation. A hysteresis due to the difference between the axial force F1 which is computed during forward operation and the axial force F1 which is computed during reverse operation is caused between such axial forces under the effect of switching between forward operation and reverse operation.

Figure 6:
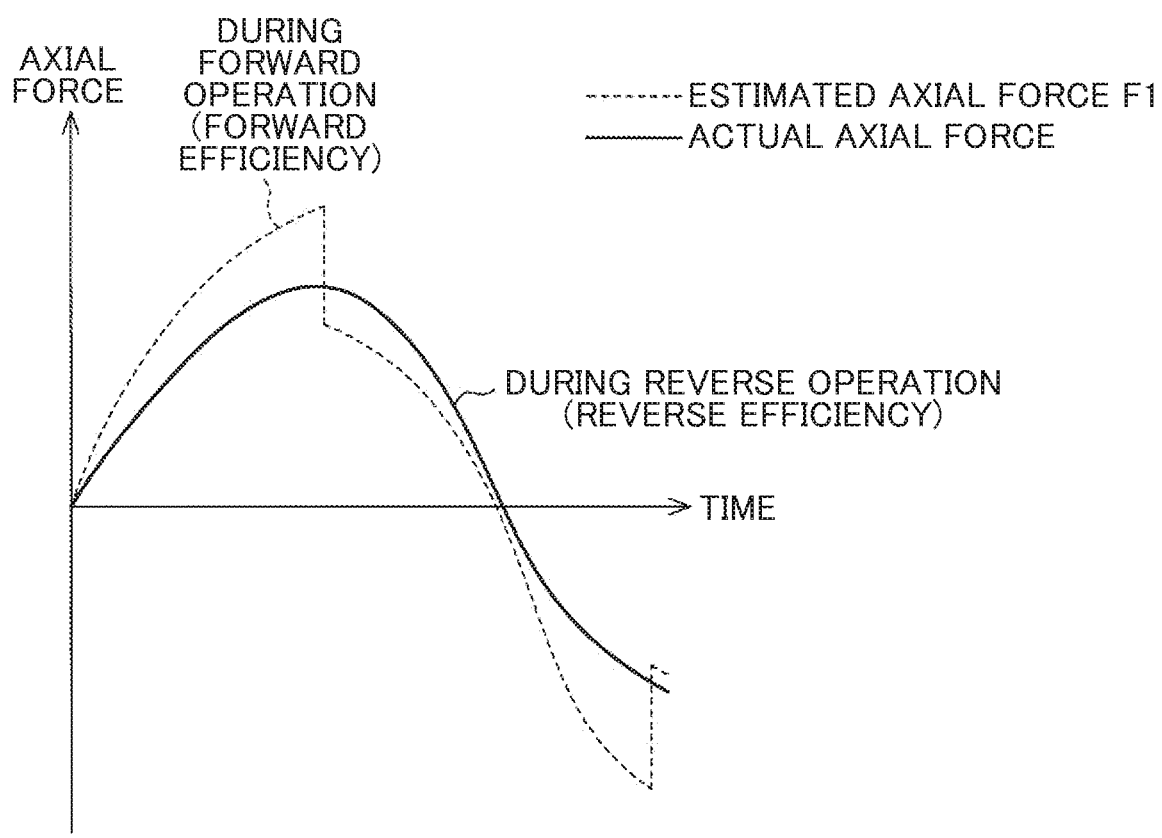
FIG. 6 is a graph illustrating temporal variations in the axial force according to the first embodiment.

As indicated in the graph of FIG. 6, for example, the absolute value of the axial force F1, which is computed by the axial force computation circuit 81, tends to be larger than the actual axial force during forward operation (forward efficiency) of the steering device 10. The absolute value of the axial force F1, which is computed by the axial force computation circuit 81, tends to be smaller than the actual axial force during reverse operation (reverse efficiency) of the steering device 10.

Figure 7:
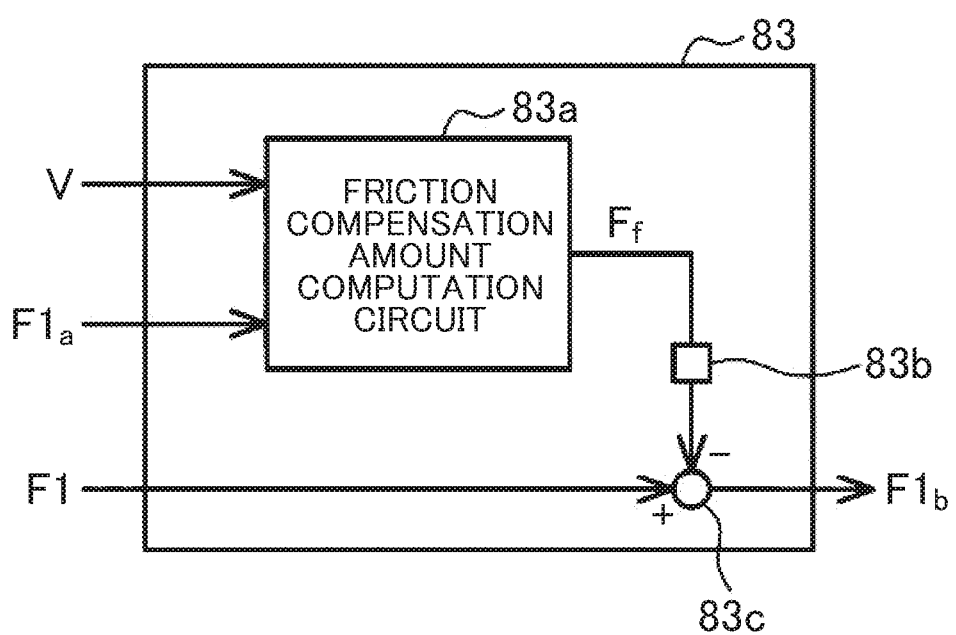
FIG. 7 is a control block diagram of a friction compensation circuit according to the first embodiment.

As illustrated in FIG. 7, the friction compensation circuit 83 has a friction compensation amount computation circuit 83a, an upper/lower limit guard processing circuit 83b, and a subtractor 83c.

The friction compensation amount computation circuit 83a computes a friction compensation amount $F_f$ on the basis of the axial force $F1_a$ after filtering and the vehicle speed V using a friction compensation map.

Figure 8:
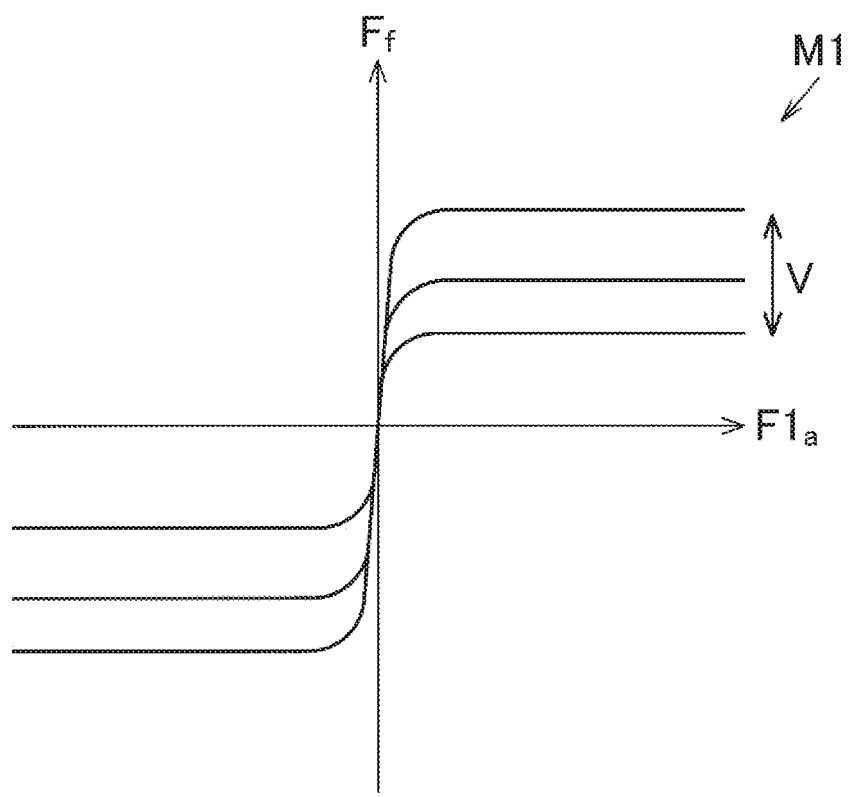
FIG. 8 is a friction compensation map that prescribes the relationship between the estimated axial force and the friction compensation amount according to the first embodiment.

As illustrated in FIG. 8, a friction compensation map M1 is a three-dimensional map that prescribes the relationship between the axial force $F1_a$ after filtering and the friction compensation amount $F_f$ in accordance with the vehicle speed V, and has the following properties. That is, when the axial force $F1_a$ after filtering has a positive value, the friction compensation amount $F_f$ has a positive value. When the axial force $F1_a$ after filtering has a negative value, the friction compensation amount $F_f$ has a negative value. When the axial force $F1_a$ after filtering has a positive value in the vicinity of zero, the friction compensation amount $F_f$ is increased in the positive direction as the absolute value of the axial force $F1_a$ becomes larger. When the axial force $F1_a$ after filtering has a negative value in the vicinity of zero, the friction compensation amount $F_f$ is increased in the negative direction as the absolute value of the axial force $F1_a$ becomes larger. When the absolute value of the axial force $F1_a$ after filtering has a predetermined value or more, the absolute value of the friction compensation amount $F_f$ does not depend on the axial force $F1_a$, and has a constant value.

Figure 9:
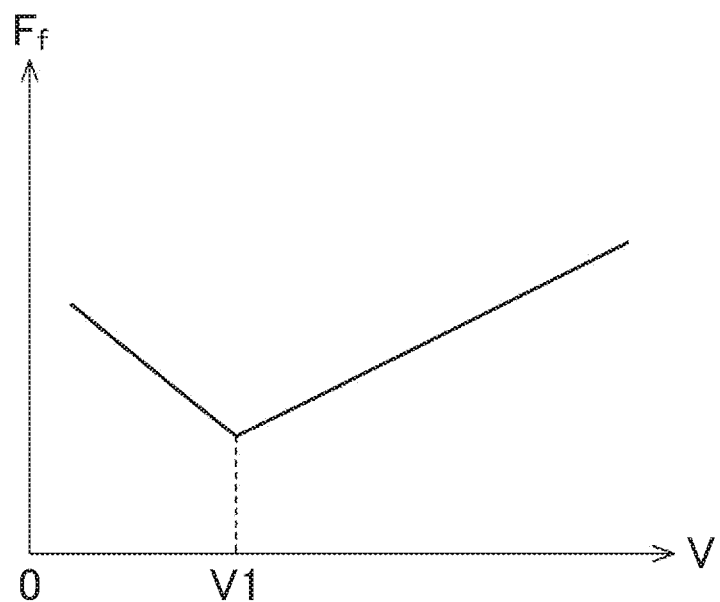
FIG. 9 is a graph illustrating the relationship between the vehicle speed and the friction compensation amount according to the first embodiment.

In addition, the following relationship is established between the friction compensation amount $F_f$ and the vehicle speed V. As illustrated in FIG. 9, when the vehicle speed V is less than a predetermined value V1 based on zero, the friction compensation amount $F_f$ has a value that becomes smaller as the vehicle speed V becomes higher. When the vehicle speed V is equal to or more than the predetermined value V1, the friction compensation amount $F_f$ has a value that becomes larger as the vehicle speed V becomes higher.

The upper/lower limit guard processing circuit 83b executes a restriction process on the friction compensation amount $F_f$, which is computed by the friction compensation amount computation circuit 83a, on the basis of restriction values (an upper limit value and a lower limit value) stored in a storage device of the control device 50. That is, the upper/lower limit guard processing circuit 83b restricts the friction compensation amount $F_f$ to the upper limit value in the case where the friction compensation amount $F_f$ exceeds the upper limit value, and restricts the friction compensation amount $F_f$ to the lower limit value in the case where the friction compensation amount $F_f$ falls below the lower limit value. It should be noted, however, that the friction compensation circuit 83 may be configured not to include the upper/lower limit guard processing circuit 83b.

The subtractor 83c subtracts the friction compensation amount $F_f$, which has been subjected to the restriction process which is performed by the upper/lower limit guard processing circuit 83b, from the axial force F1, which is computed by the axial force computation circuit 81, to compute an axial force $F1_b$ after friction compensation as indicated by the following formula (4).

$$F1_b = F1 - F_f \quad (4)$$

Figure 10:
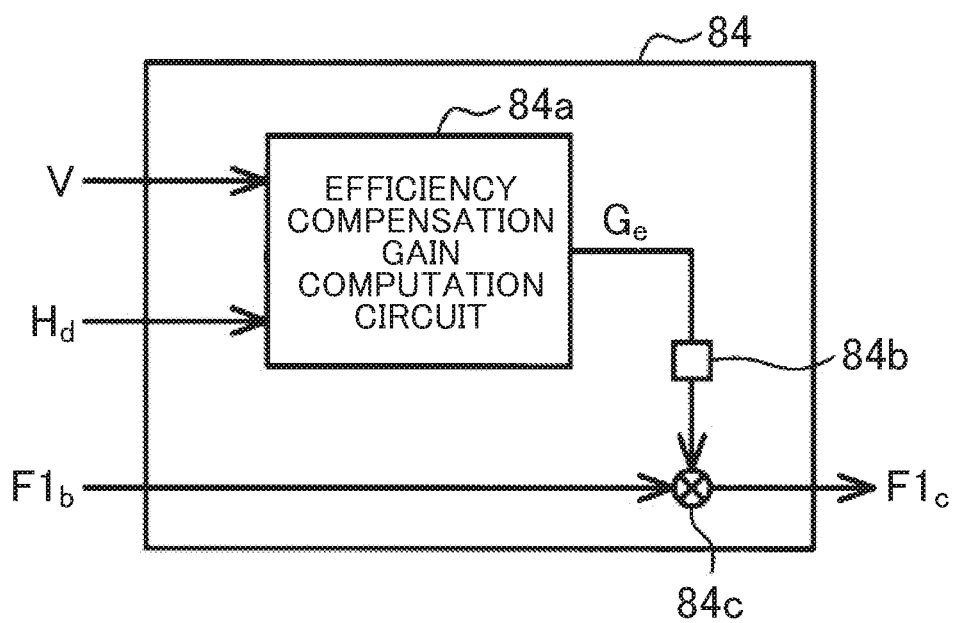
FIG. 10 is a control block diagram of an efficiency compensation circuit according to the first embodiment.

As illustrated in FIG. 10, the efficiency compensation circuit 84 has an efficiency compensation gain computation circuit 84a, an upper/lower limit guard processing circuit 84b, and a multiplier 84c.

The efficiency compensation gain computation circuit 84a computes an efficiency compensation gain $G_e$ on the basis of the hysteresis switching determination value $H_d$ and the vehicle speed V using an efficiency compensation map.

Figure 11:
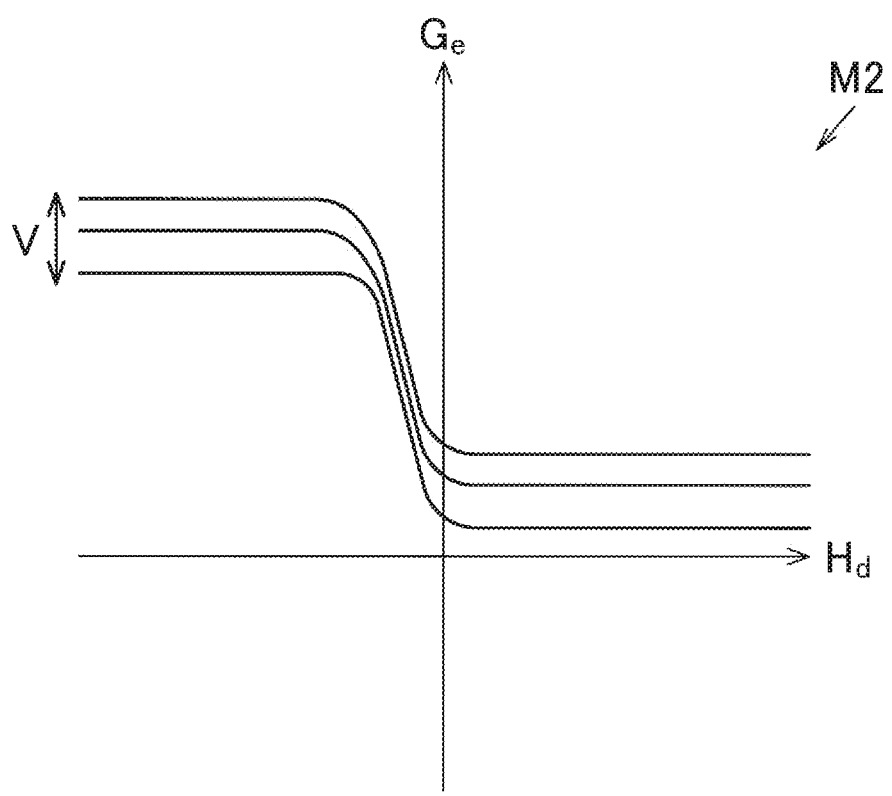
FIG. 11 is an efficiency compensation map that prescribes the relationship between the hysteresis switching determination value and the efficiency compensation gain according to the first embodiment.

As illustrated in FIG. 11, an efficiency compensation map M2 is a three-dimensional map that prescribes the relationship between the hysteresis switching determination value $H_d$ and the efficiency compensation gain $G_e$ in accordance with the vehicle speed V, and has the following properties. That is, the efficiency compensation gain $G_e$ always has a positive value irrespective of the sign (positive or negative) of the hysteresis switching determination value $H_d$. When the hysteresis switching determination value $H_d$ has a positive value, the efficiency compensation gain $G_e$ does not depend on the hysteresis switching determination value $H_d$, and has a constant value. When the hysteresis switching determination value $H_d$ has a negative value in the vicinity of zero, the efficiency compensation gain $G_e$ has a value that becomes larger as the absolute value of the hysteresis switching determination value $H_d$ is increased. When the hysteresis switching determination value $H_d$ has a negative value and the absolute value of the hysteresis switching determination value $H_d$ is equal to or more than a predetermined value, the efficiency compensation gain $G_e$ does not depend on the hysteresis switching determination value $H_d$, and has a constant value.

The upper/lower limit guard processing circuit 84b executes a restriction process on the efficiency compensation gain $G_e$, which is computed by the efficiency compensation gain computation circuit 84a, on the basis of restriction values (an upper limit value and a lower limit value) stored in the storage device of the control device 50. That is, the upper/lower limit guard processing circuit 84b restricts the efficiency compensation gain $G_e$ to the upper limit value in the case where the efficiency compensation gain $G_e$ exceeds the upper limit value, and restricts the efficiency compensation gain $G_e$ to the lower limit value in the case where the efficiency compensation gain $G_e$ falls below the lower limit value. It should be noted, however, that the efficiency compensation circuit 84 may be configured not to include the upper/lower limit guard processing circuit 84b.

The multiplier 84c multiplies the axial force $F1_b$ after friction compensation by the efficiency compensation gain $G_e$, which has been subjected to the restriction process which is performed by the upper/lower limit guard processing circuit 84b, to compute an axial force $F1_c$ after efficiency compensation as indicated by the following formula (5).

$$F1_c = F1_b \times G_e \quad (5)$$

The filter 85 removes an unwanted component superimposed on the axial force $F1_c$ after efficiency compensation. A component generated under the effect of the dynamic characteristics of the steering device 10 (mainly the steering motor 41) is assumed as the unwanted component. The dynamic characteristics of the steering device 10 are represented by the inertia and the viscosity of the steering motor 41 etc. A component generated under the effect of the transfer characteristics of the control device 50 (mainly the steering control circuit 50b) is also assumed as the unwanted component.

That is, the unwanted component which is superimposed on the axial force $F1_c$ (the axial force F1 which is computed by the axial force computation circuit 81, to be more exact) contains a component due to the viscosity and the inertia of the steering motor 41 etc. and a component due to the transfer characteristics (frequency characteristics of a transfer function) of the steering control circuit 50b. The transfer function of the filter 85 is set from the viewpoint of canceling out the unwanted component.

A transfer function G(s) of the filter 85 is represented by the following formula (6).

$$G(s) = Ts + 1/(Ls+1) \times (Js^2 + Cs + K) \quad (6)$$

The formula (6) is obtained by multiplying an inverse transfer function $M_1(s)$ of the differential steering control circuit 63, an inverse transfer function $M_2(s)$ of the pinion angle feedback control circuit 64, and an inverse transfer function $M_3(s)$ of the steering motor 41, which are represented by the following formulas (6-1), (6-2), and (6-3), respectively. An inverse transfer function is the reciprocal of a transfer function.

$$M_1(s) = 1/(Ls+1) \quad (6-1)$$

$$M_2(s) = Ts+1 \quad (6-2)$$

$$M_3(s) = 1/(Js^2 + Cs + K) \quad (6-3)$$

In the formulas, L is a time constant constituted of a differential steering control constant. T is a time constant constituted of a pinion angle feedback control constant. In addition, J is the inertia, C is the viscosity, and K is the spring properties (elasticity).

Therefore, with the filter 85 performing a filtering process on the axial force $F1_c$ after efficiency compensation, unwanted components due to the viscosity, the inertia, and the transfer function of each control circuit superimposed on the axial force $F1_c$ after efficiency compensation are canceled out. That is, the filter 85 functions as a dynamic characteristic compensation circuit that compensates for an effect of the dynamic characteristics of the steering device 10 on the axial force F1, which is computed by the axial force computation circuit 81.

Figure 12:
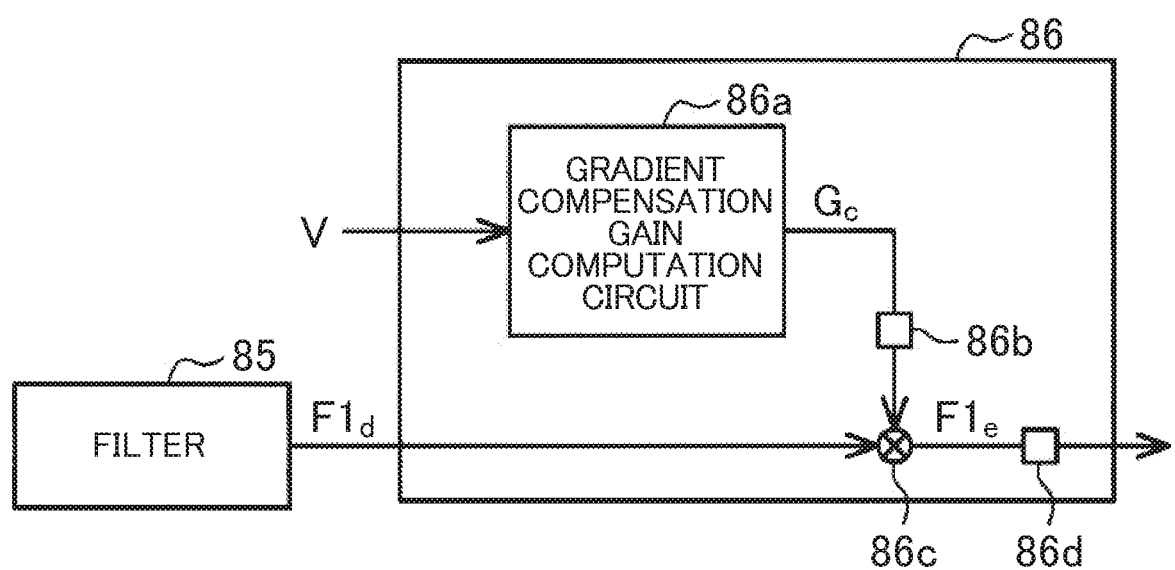
FIG. 12 is a control block diagram of a gradient compensation circuit according to the first embodiment.

As illustrated in FIG. 12, the gradient compensation circuit 86 has a gradient compensation gain computation circuit 86a, an upper/lower limit guard processing circuit 86b, a multiplier 86c, and an upper/lower limit guard processing circuit 86d. The gradient compensation gain computation circuit 86a computes a gradient compensation gain $G_c$ on the basis of an axial force $F1_d$ that has been subjected to the filtering process which is performed by the filter 85 and the vehicle speed V using a gradient compensation gain map.

Figure 13:
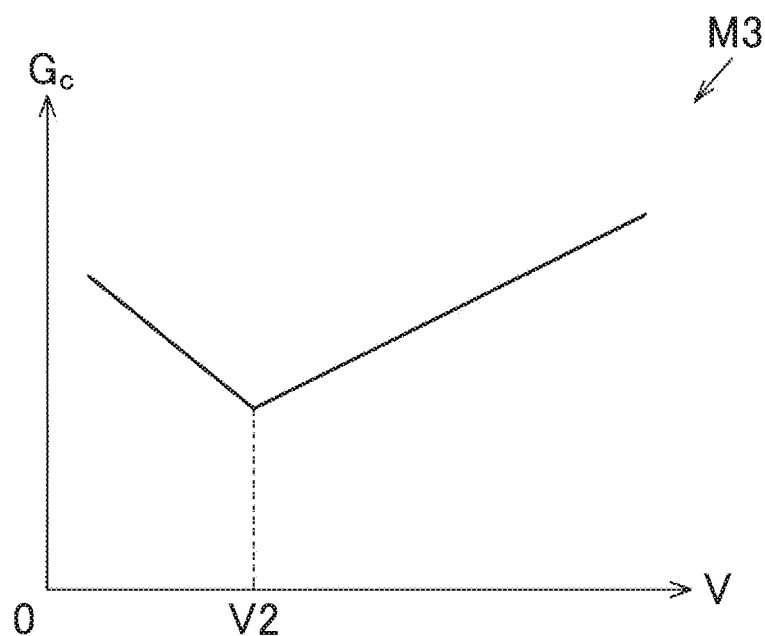
FIG. 13 is a gradient compensation gain map that prescribes the relationship between the vehicle speed and the gradient compensation gain according to the first embodiment.

As illustrated in FIG. 13, a gradient compensation gain map M3 is a two-dimensional map that prescribes the relationship between the axial force $F1_d$, which has been subjected to the filtering process which is performed by the filter 85, and the vehicle speed V, and has the following properties. When the vehicle speed V is less than a predetermined value V2 based on zero, the gradient compensation gain $G_c$ has a value that becomes smaller as the vehicle speed V becomes higher. When the vehicle speed V is equal to or more than the predetermined value V2, the gradient compensation gain $G_c$ has a value that becomes larger as the vehicle speed V becomes higher. The predetermined value V2 corresponds to a vehicle speed in a so-called medium speed range.

The upper/lower limit guard processing circuit 86b executes a restriction process on the gradient compensation gain $G_c$, which is computed by the gradient compensation gain computation circuit 86a, on the basis of restriction values (an upper limit value and a lower limit value) stored in the storage device of the control device 50. That is, the upper/lower limit guard processing circuit 86b restricts the gradient compensation gain $G_c$ to the upper limit value in the case where the gradient compensation gain $G_c$ exceeds the upper limit value, and restricts the gradient compensation gain $G_c$ to the lower limit value in the case where the gradient compensation gain $G_c$ falls below the lower limit value. It should be noted, however, that the gradient compensation circuit 86 may be configured not to include the upper/lower limit guard processing circuit 86b.

The multiplier 86c multiplies the axial force $F1_d$, which has been subjected to the filtering process which is performed by the filter 85, by the gradient compensation gain $G_e$, which has been subjected to the restriction process which is performed by the upper/lower limit guard processing circuit 86b, to compute an axial force $F1_e$ after gradient compensation as indicated by the following formula (7).

$$F1_e = F1_d \times G_c \quad (7)$$

The upper/lower limit guard processing circuit 86d executes a restriction process on the axial force $F1_e$ after gradient compensation on the basis of restriction values (an upper limit value and a lower limit value) stored in the storage device of the control device 50. That is, the upper/lower limit guard processing circuit 86d restricts the axial force $F1_e$ after gradient compensation to the upper limit value in the case where the axial force $F1_e$ exceeds the upper limit value, and restricts the axial force $F1_e$ after gradient compensation to the lower limit value in the case where the axial force $F1_e$ falls below the lower limit value.

The friction compensation circuit 83, the efficiency compensation circuit 84, and the gradient compensation circuit 86 function as a static characteristic compensation circuit that compensates for an effect of the static characteristics of the steering device 10 (steering unit) on the axial force F1, which is computed by the axial force computation circuit 81.

The vehicle model 72 converts the axial force $F1_e$, which has been subjected to the restriction process which is performed by the upper/lower limit guard processing circuit 86d, into torque (spring reaction force torque) to compute the spring component $T_{sp}^*$ of the basic drive torque $T_{in}^*$.

Figure 14:
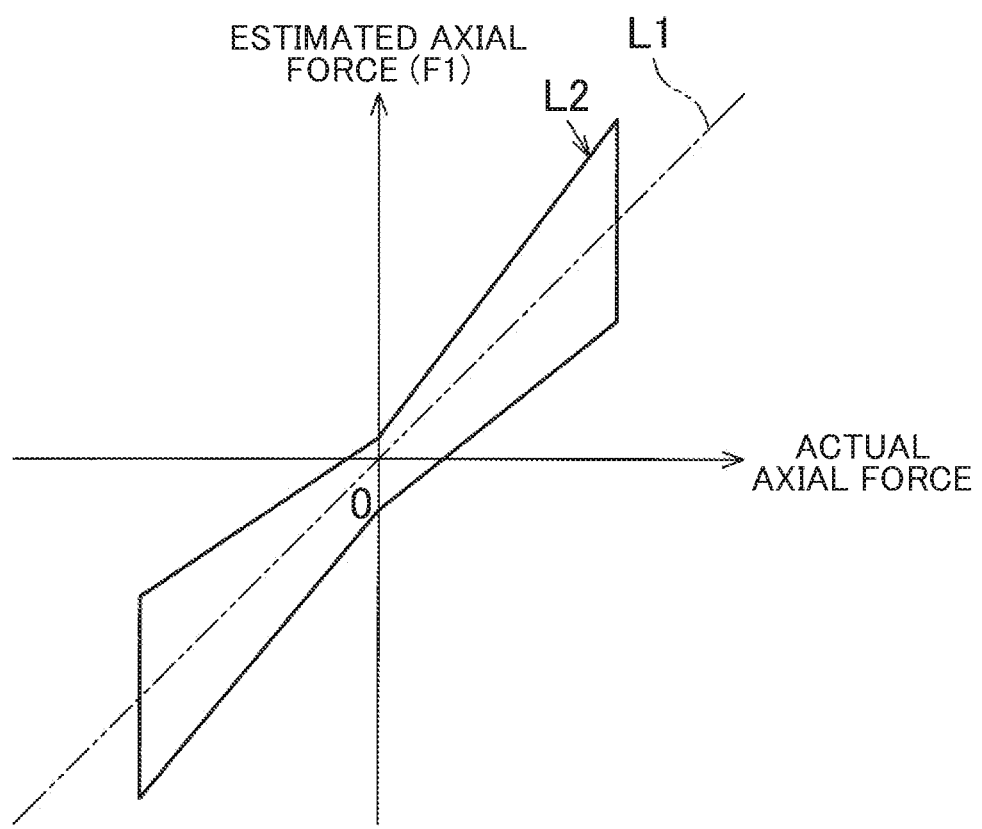
FIG. 14 is a graph (before friction compensation) illustrating the relationship between the actual axial force and the estimated axial force according to the first embodiment.

Next, the function and the effect of the estimated axial force computation circuit 80 will be described. As indicated by the long dashed double-short dashed line in the graph of FIG. 14, it is ideal that the axial force F1 (estimated axial force), which is computed by the axial force computation circuit 81, and the actual axial force make one-to-one correspondence. That is, a characteristic line L1 that indicates an ideal relationship between the axial force F1, which is computed by the axial force computation circuit 81, and the actual axial force is a line with a slope of 1 that passes through the origin.

However, an unwanted component generated under the effect of the static characteristics (such as friction) of the steering device 10 and an unwanted component generated under the effect of the dynamic characteristics (such as inertia) of the steering device 10 are superimposed on the axial force F1 which is estimated and computed. Therefore, the axial force F1, which is computed by the axial force computation circuit 81, and the actual axial force do not coincide with each other. That is, a difference is caused between the axial force F1, which is computed by the axial force computation circuit 81, and the actual axial force. Thus, as indicated by the continuous line in the graph of FIG. 14, a characteristic line L2 in a loop shape that indicates the relationship between the axial force F1, which is computed by the axial force computation circuit 81, and the actual axial force has a hysteresis that matches the difference between the axial force F1, which is computed by the axial force computation circuit 81, and the actual axial force with respect to the ideal characteristic line L1.

In the present example, the characteristic line L2 is brought closer to the ideal characteristic line L1 by reducing the hysteresis, which is the difference between the axial force F1 and the actual axial force, through execution of various types of compensation control on the axial force F1, which is computed by the axial force computation circuit 81. The example will be specifically described below.

Figure 15:
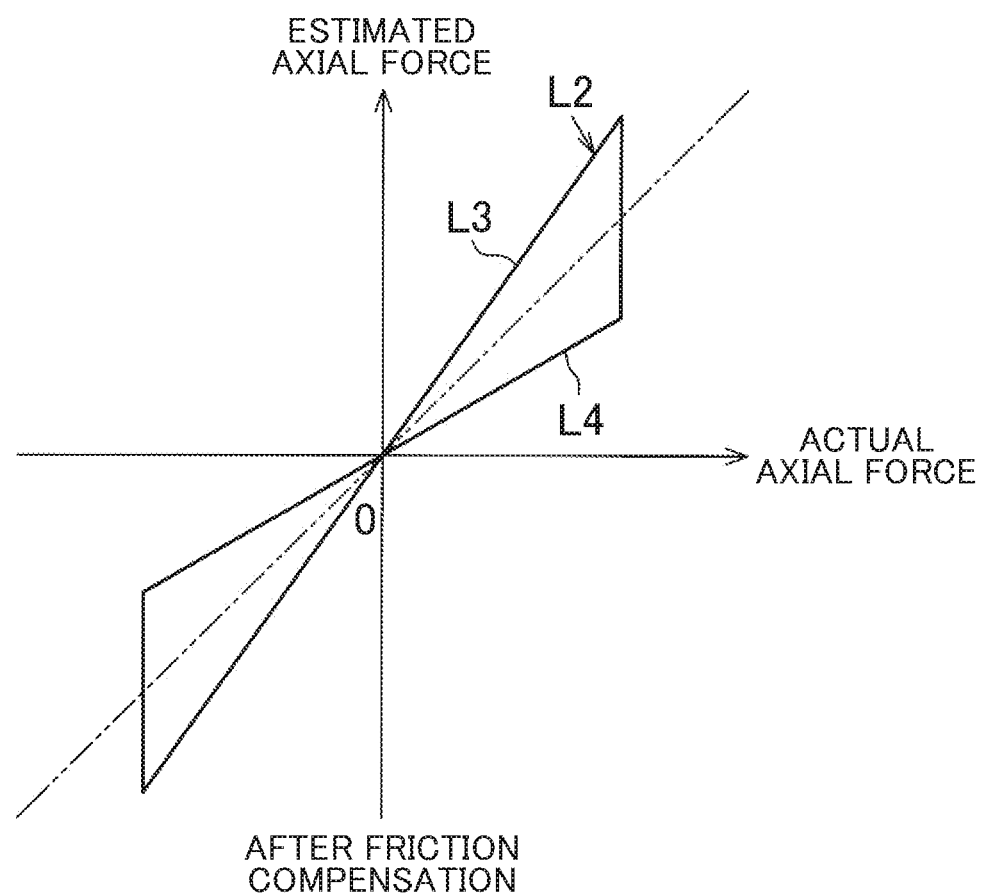
FIG. 15 is a graph (after friction compensation) illustrating the relationship between the actual axial force and the estimated axial force according to the first embodiment.

First, the hysteresis width at the time when the actual axial force is in the vicinity of 0 (origin), which corresponds to the neutral position (straight-ahead position) of the steering wheel 11, is reduced through execution of friction compensation control by the friction compensation circuit 83. Ideally, as indicated in the graph of FIG. 15, the axial force $F1_b$, which is an estimated axial force after friction compensation, is also zero when the actual axial force is zero. It should be noted, however, that the axial force $F1_b$, which is an estimated axial force after friction compensation, includes hysteresis due to the difference between the forward efficiency and the reverse efficiency. The hysteresis due to the difference between the forward efficiency and the reverse efficiency is caused when the actual axial force F1, which acts on the steered shaft 14, is computed on the basis of the current value $I_b$ of the steering motor 41 by the axial force computation circuit 81.

Therefore, the hysteresis characteristics (shape of the hysteresis loop) indicated by the characteristic line L2 have a so-called bow shape in which the hysteresis width becomes zero at the zero point (origin) corresponding to the neutral position (straight-ahead position) of the steering wheel 11, for example. The characteristic line L2 which indicates the hysteresis characteristics of the axial force $F1_b$ after friction compensation includes two characteristic lines L3 and L4 with different slopes that pass through the origin. The slope of the characteristic line L3 is larger than that of the ideal characteristic line L1. The slope of the characteristic line L4 is smaller than that of the ideal characteristic line L1.

Figure 17A:
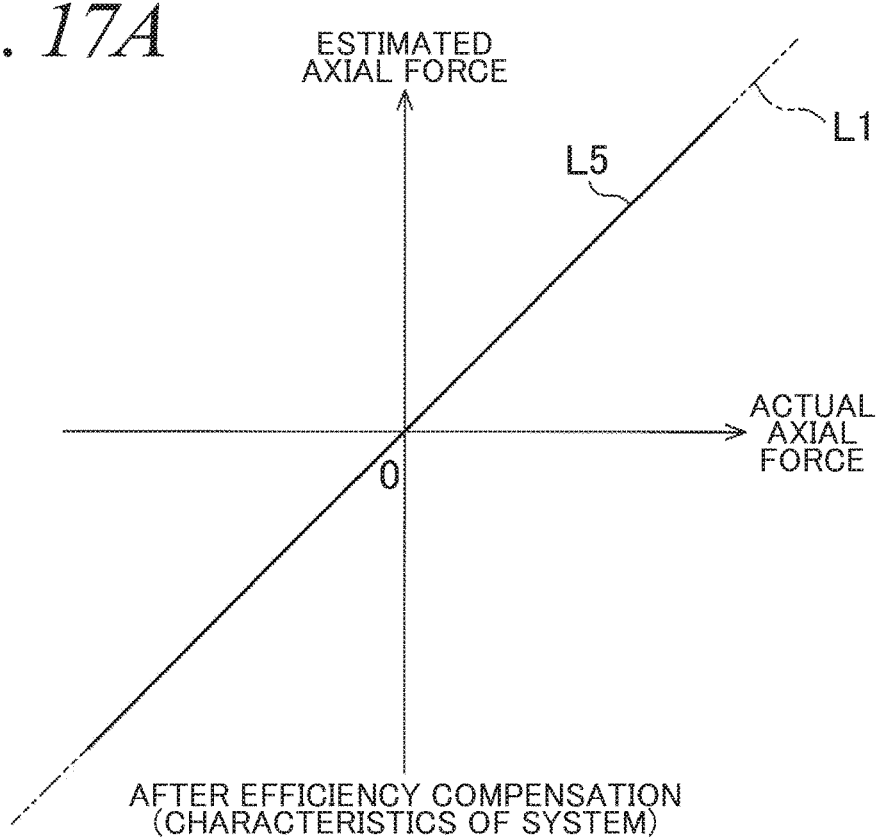
FIG. 17A is a graph (after efficiency compensation) illustrating the relationship between the actual axial force and the estimated axial force according to the first embodiment.

Next, the hysteresis included in the axial force $F1_b$ after friction compensation is removed through execution of efficiency compensation control by the efficiency compensation circuit 84. Consequently, as indicated by the continuous line in FIG. 17A, a characteristic line L5 that indicates the relationship between the axial force $F1_c$ (estimated axial force) after efficiency compensation and the actual axial force is a line with a slope of 0.8 to 1.0 that passes through the origin. The slope of the characteristic line L5 slightly differs in accordance with the vehicle speed V, but generally coincides with that of the ideal characteristic line L1.

Next, an unwanted component contained in the axial force $F1_c$ after efficiency compensation is removed through a filtering process performed by the filter 85. The unwanted component includes an unwanted component due to the inertia of the steering motor 41 etc., and an unwanted component due to the transfer function of each control circuit (63, 64) related to the steering control, for example.

The transfer function G(s) of the filter 85 is set from the viewpoint of canceling out a transfer function $G_1(s)$ of the differential steering control circuit 63, a transfer function $G_2(s)$ of the pinion angle feedback control circuit 64, and a transfer function $G_3(s)$ of the steering motor 41, which are represented by the following formulas (8-1), (8-2), and (8-3), respectively.

$$G_1(s)=Ls+1 \tag{8-1}$$

$$G_2(s)=1/(Ts+1) \tag{8-2}$$

$$G_3(s)=Js^2+Cs+K \tag{8-3}$$

That is, the transfer function of the filter 85 is obtained by multiplying the inverse transfer function $M_1(s)$ of the differential steering control circuit 63, the inverse transfer function $M_2(s)$ of the pinion angle feedback control circuit 64, and the inverse transfer function $M_3(s)$ of the steering motor 41 as represented by the formula (6) described earlier.

Thus, with the axial force $F1_c$ after efficiency compensation subjected to the filtering process which is performed by the filter 85, an unwanted component due to the viscosity, the inertia, etc. of the steering motor 41 and an unwanted component due to the frequency characteristics of the transfer function of each control circuit (63, 64), which are superimposed on the axial force $F1_c$ after efficiency compensation, are canceled out.

Figure 16:
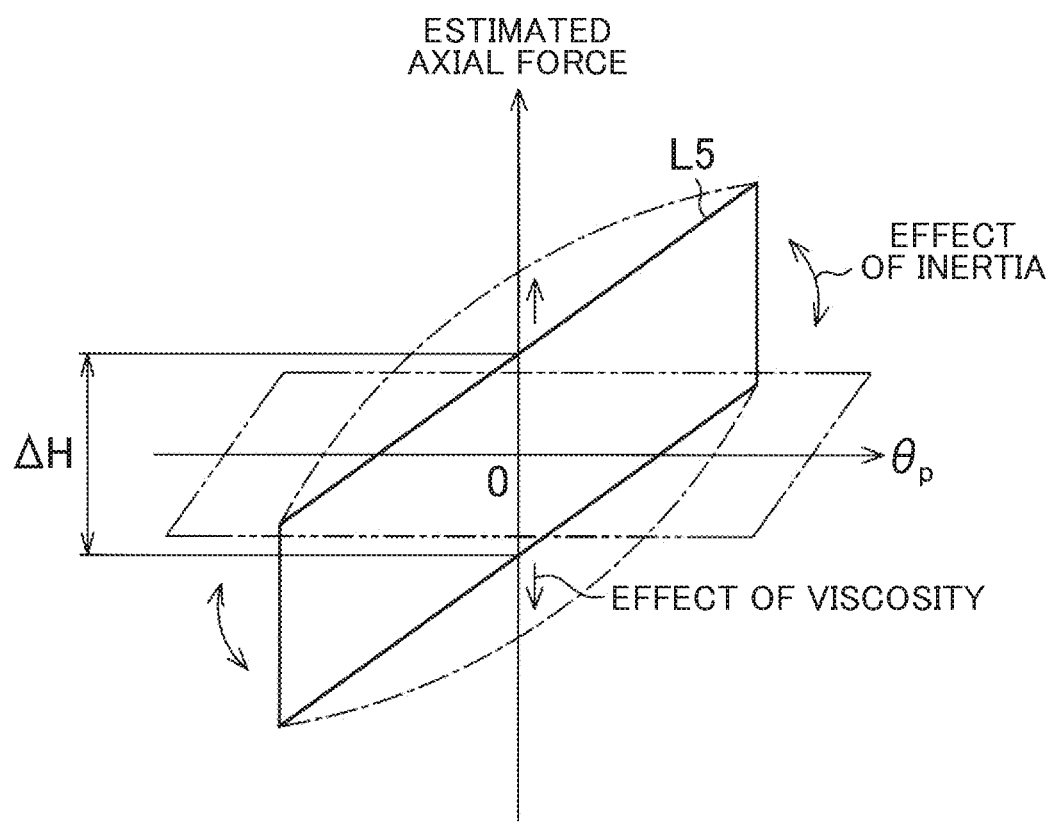
FIG. 16 is a graph illustrating the relationship between a pinion angle and the axial force according to the first embodiment.

The relationship between the pinion angle $\theta_p$ and the axial force will be described. As indicated in the graph of FIG. 16, when the pinion angle $\theta_p$ and the axial force are plotted on the horizontal axis and the vertical axis, respectively, the axial force has hysteresis characteristics with respect to the pinion angle $\theta_p$. As indicated by a characteristic line L5 in a loop shape in the graph of FIG. 16, in the case where the pinion angle $\theta_p$ and the axial force have an ideal relationship, the axial force is in a constant range ΔH when the pinion angle $\theta_p$ is at the zero point (origin) corresponding to the neutral position of the steered angle θt. In the case where the pinion angle $\theta_p$ and the axial force have an ideal relationship, in addition, the hysteresis width of the axial force with respect to the pinion angle $\theta_p$ is constant (ΔH).

In practice, however, the hysteresis characteristics of the axial force with respect to the pinion angle $\theta_p$ may not be ideal due to the effect of the viscosity and the inertia of the steering motor 41 etc. As indicated by the long dashed short dashed line in the graph of FIG. 16, the viscosity of the steering motor 41 acts in the direction of increasing the axial force with respect to the pinion angle $\theta_p$. As the pinion angle $\theta_p$ is brought closer to the origin, the effect of the viscosity becomes stronger, and therefore the axial force becomes larger.

As indicated by the long dashed double-short dashed line in the graph of FIG. 16, meanwhile, the inertia of the steering motor 41 acts so as to decrease the degree of variation in the axial force with respect to an increase in the pinion angle $\theta_p$. When described conceptually, the inertia acts in the direction of rotating the ideal characteristic line L5 in a loop shape about the origin in the graph of FIG. 16.

An unwanted component due to the inertia and the viscosity of the steering motor 41 etc. has been superimposed on the axial force $F1_c$ after efficiency compensation. The transfer function $G_3(s)$ of the steering motor 41 is canceled out through filtering performed by the filter 85. Consequently, an unwanted component due to the inertia of the steering motor 41 etc. is removed from the axial force $F1_c$ after efficiency compensation. Therefore, in the relationship between the pinion angle $\theta_p$ and the axial force, the hysteresis characteristics of the axial force $F1_c$ with respect to the pinion angle $\theta_p$ is brought closer to the characteristic line L5 which is an ideal hysteresis loop indicated in the graph of FIG. 16.

In addition, the transfer function $G_1(s)$ of the differential steering control circuit 63 and the transfer function $G_2(s)$ of the pinion angle feedback control circuit 64 are canceled out through filtering performed by the filter 85. Consequently, unwanted components due to the transfer functions $G_1(s)$ and $G_2(s)$ are removed from the axial force $F1_c$ after efficiency compensation. In addition, the phase of the axial force $F1_c$ after efficiency compensation (a phase shift with respect to the frequency of the transfer function of a first-order delay element) is also compensated for. Therefore, the phase of the axial force $F1_c$ after efficiency compensation is stabilized.

The axial force $F1_d$ after filtering, which is obtained by performing viscosity compensation, inertia compensation, differential steering control compensation, pinion angle feedback control compensation, and phase compensation through the filtering process which is performed by the filter 85, ideally coincides with the actual axial force.

Figure 17B:
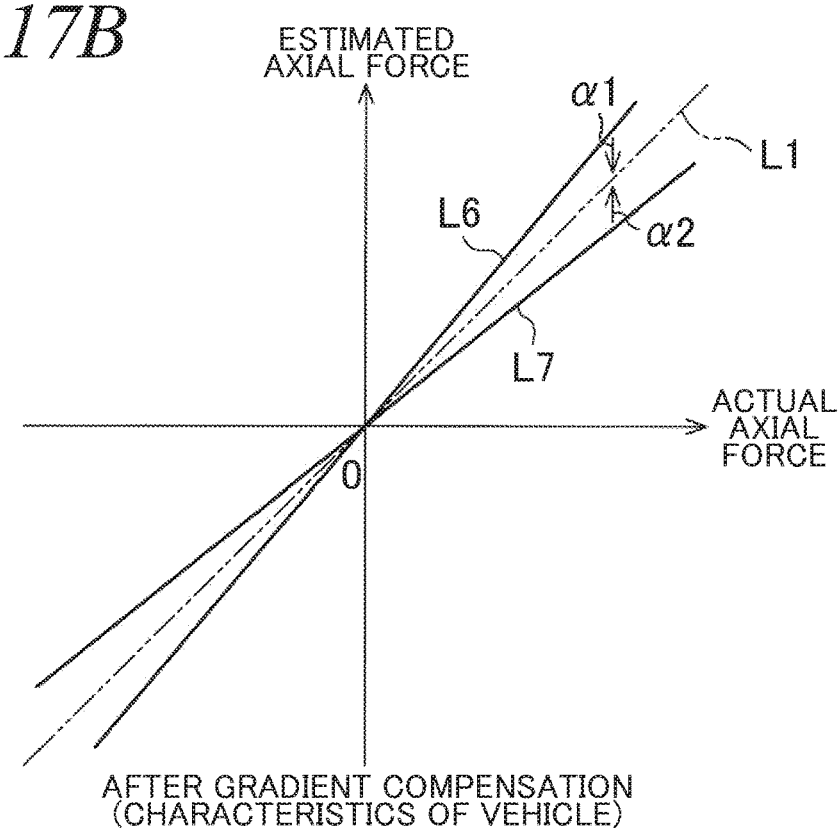
FIG. 17B is a graph (after gradient compensation) illustrating the relationship between the actual axial force and the estimated axial force according to the first embodiment.

Due to the effect of the vehicle speed V etc., however, the axial force $F1_d$ after filtering and the actual axial force occasionally do not coincide with each other. For example, the absolute value of the estimated axial force (the axial force $F1_d$ after filtering) may be larger than the absolute value of the actual axial force as indicated by a characteristic line L6 in FIG. 17B. Meanwhile, the absolute value of the estimated axial force may be smaller than the absolute value of the actual axial force as indicated by a characteristic line L7 in FIG. 17B.

Thus, the characteristic lines L6 and L7 are brought further closer to the ideal characteristic line L1 through execution of gradient compensation control by the gradient compensation circuit 86. That is, as indicated by arrows α1 and α2 in FIG. 17B, the slopes of the characteristic lines L6 and L7 are brought further closer to 1 so that the two characteristic lines L6 and L7 ideally generally coincide with the ideal characteristic line L1. The axial force $F1_e$, which is obtained through execution of gradient compensation control by the gradient compensation circuit 86, generally makes one-to-one correspondence with the actual axial force.

Thus, according to the present embodiment, the following effect can be obtained.

Unwanted components (those due to the static characteristics such as friction and efficiency and those due to viscosity, inertia, and transfer functions for control) superimposed on the axial force F1 are removed through various types of compensation control and filtering performed on the axial force F1, which is computed by the axial force computation circuit 81. Therefore, the axial force $F1_e$ which reflects the road surface state more appropriately can be computed. When the appropriate axial force $F1_e$ is used as the spring component $T_{sp}*$ of the basic drive torque $T_{in}*$, the target steering angle θ*, and hence the steering angle correction amount $T_2*$ which is computed by the steering angle feedback control circuit 54, reflect the road surface state (such as road surface frictional resistance) more appropriately. Thus, a more appropriate steering reaction force that matches the road surface state is applied to the steering wheel 11. The driver can grasp the road surface state more adequately by feeling the steering reaction force which is applied to the steering wheel 11 as a response. In addition, the controllability (operability) and the steering feel of the steering wheel 11 can be further improved.

The first embodiment may also be implemented in the following modified forms. As indicated by the long dashed double-short dashed line in FIG. 5, the hysteresis switching determination circuit 82 may be further provided with a low-pass filter 82d. The low-pass filter 82d removes a frequency component such as noise contained in the hysteresis switching determination value $H_d$, which is computed by the determination value computation circuit 82c.

In the present example, in order to compensate for the friction of the steering device 10, the friction compensation circuit 83 subtracts the friction compensation amount $F_f$ corresponding to such friction from the axial force $F1_a$ after filtering. However, the friction compensation amount $F_f$ corresponding to the friction may be added to the axial force $F1_a$ after filtering in order to apply friction on purpose. In this case, the sign (positive or negative) of the friction compensation amount $F_f$ may be reversed from the original sign with the subtractor 83c remaining unchanged.

The efficiency compensation circuit 84 and the gradient compensation circuit 86 may be integrated with each other. For example, when the gradient compensation circuit 86 is combined with the efficiency compensation circuit 84, the multiplier 84c multiplies the axial force $F1_b$ after friction compensation by the efficiency compensation gain $G_e$ and the gradient compensation gain $G_c$. The filter 85 performs a filtering process on the axial force which has been subjected to efficiency compensation and gradient compensation. The axial force after being subjected to the filtering process which is performed by the filter 85 is converted into the spring component $T_{sp}*$ of the basic drive torque $T_{in}*$.

The gradient compensation gain computation circuit 86a computes the gradient compensation gain $G_c$ in accordance with the vehicle speed V. However, the gradient compensation gain $G_c$ may be a constant. In this case, the gradient compensation gain $G_c$ may be set from the viewpoint of bringing the axial force F1 which has been subjected to the compensation circuits (83, 84, 85) closer to the actual axial force. Meanwhile, in order to obtain a greater feel (steering reaction force), the gradient compensation gain $G_c$ may be set to a larger value from the viewpoint of computing the axial force F1 with a larger value on purpose. Conversely, in order to make the steering torque $T_h$ (steering force) smaller, the gradient compensation gain $G_c$ may be set to a smaller value from the viewpoint of computing the axial force F1 with a smaller value on purpose.

The estimated axial force computation circuit 80 has the filter 85 which functions as a dynamic characteristic computation circuit and the friction compensation circuit 83, the efficiency compensation circuit 84, and the gradient compensation circuit 86 which function as static characteristic computation circuits. However, the estimated axial force computation circuit 80 may have one of a dynamic characteristic computation circuit (85) and a static characteristic computation circuit (83, 84, 86). Also in this way, the effect of either the dynamic characteristics or the static characteristics of the steering device 10 (steering unit) on the axial force F1, which is computed by the axial force computation circuit 81, is compensated for.

The filter 85 which serves as a dynamic characteristic computation circuit may remove one or two of a first component due to the viscosity of the steering device 10, a second component due to the inertia of the steering device 10, and a third component due to the transfer characteristics of the steering control circuit 50b as an unwanted component superimposed on the axial force F1, which is computed by the axial force computation circuit 81.

The estimated axial force computation circuit 80 has the friction compensation circuit 83, the efficiency compensation circuit 84, and the gradient compensation circuit 86 as static characteristic computation circuits. However, the estimated axial force computation circuit 80 may be configured to have one or two of such compensation circuits.

Figure 18:
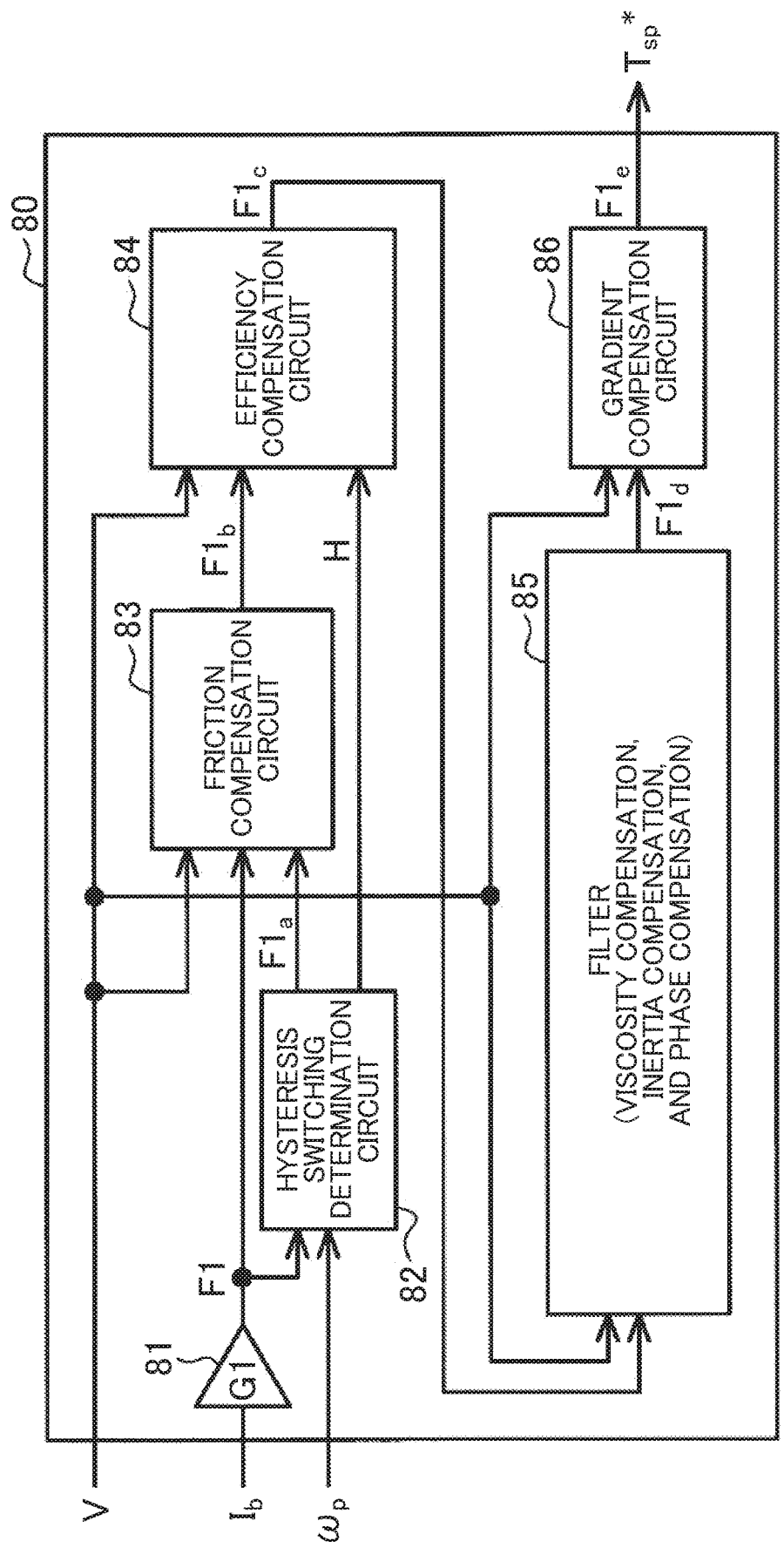
FIG. 18 is a control block diagram of a vehicle model (estimated axial force computation circuit) according to a second embodiment.

Next, a vehicle control device according to a second embodiment will be described. As illustrated in FIG. 18, the estimated axial force computation circuit 80 has the axial force computation circuit 81, the hysteresis switching determination circuit 82, the friction compensation circuit 83, the efficiency compensation circuit 84, the filter 85, and the gradient compensation circuit 86, as in the first embodiment.

It should be noted, however, that the transfer function G(s) of the filter 85 is different from that according to the first embodiment. Specifically, the transfer function G(s) of the filter 85 is set from the viewpoint of canceling out the transfer function $G_3(s)$ of the steering motor 41, which is represented by the formula (8-3) described earlier, without consideration of the transfer function $G_1(s)$ of the differential steering control circuit 63, which is represented by the formula (8-1) described earlier, and the transfer function $G_2(s)$ of the pinion angle feedback control circuit 64, which is represented by the formula (8-2) described earlier.

Thus, the transfer function G(s) of the filter 85 is represented by the following formula (9).

$$G(s)=1/(Js^2+Cs+K) \qquad (9)$$

In the formula, J is the inertia, C is the viscosity, and K is the spring properties (elasticity).

Also in this way, with the filter 85 performing a filtering process on the axial force $F1_c$ after efficiency compensation, an unwanted component due to the viscosity and the inertia of the steering motor 41 etc. superimposed on the axial force $F1_c$ after efficiency compensation can be canceled out. In addition, the phase of the axial force $F1_c$ after efficiency compensation can also be compensated for.

Next, a vehicle control device according to a third embodiment will be described. The present example differs from the second embodiment in the configuration of the estimated axial force computation circuit. In the second embodiment, viscosity compensation, inertia compensation, and phase compensation are performed on the axial force $F1_c$ after efficiency compensation using the single filter 85. In the present example, however, the three types of compensation control are performed individually.

Figure 19:
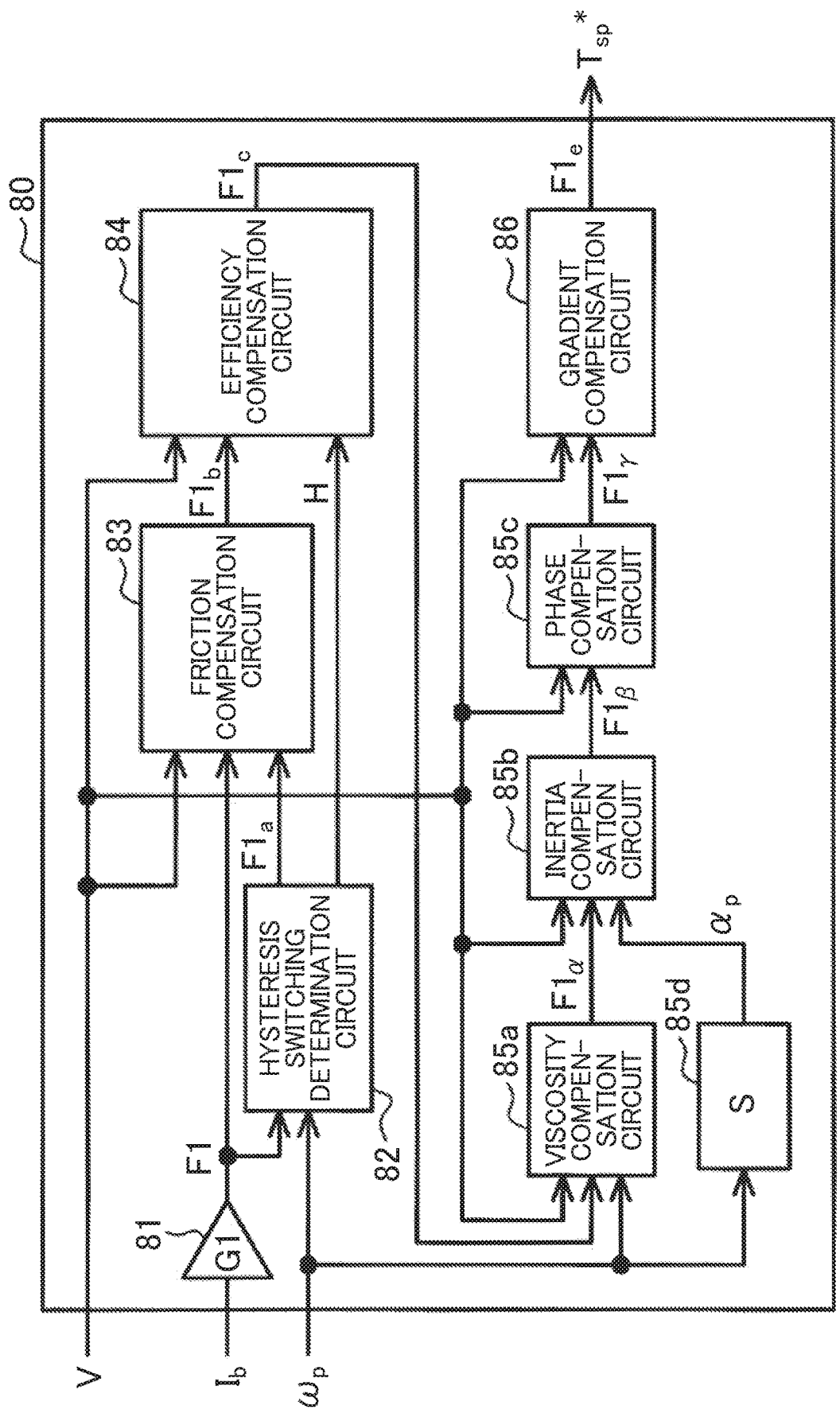
FIG. 19 is a control block diagram of a vehicle model (estimated axial force computation circuit) according to a third embodiment.

As illustrated in FIG. 19, the estimated axial force computation circuit 80 has a viscosity compensation circuit 85a, an inertia compensation circuit 85b, a phase compensation circuit 85c, and a differentiator 85d in place of the filter 85 described earlier (see FIG. 18).

The viscosity compensation circuit 85a compensates for the viscosity of the steering motor 41. The viscosity compensation circuit 85a retrieves the axial force after efficiency compensation, the pinion angle speed $\omega_p$ which is computed by the differentiator 79 (see FIG. 3), and the vehicle speed V. The viscosity compensation circuit 85a multiplies the pinion angle speed $\omega_p$ by a viscosity compensation coefficient to compute a viscosity compensation amount, and adds the computed viscosity compensation amount to the axial force $F1_c$ after efficiency compensation to compute an axial force $F1_\alpha$ after viscosity compensation. The viscosity compensation coefficient is varied in accordance with the vehicle speed V.

The differentiator 85d differentiates the pinion angle speed $\omega_p$ which is computed by the differentiator 79 (see FIG. 3) to compute a pinion angle acceleration $\alpha_p$. The inertia compensation circuit 85b compensates for the inertia of the steering motor 41. The inertia compensation circuit 85b retrieves the axial force $F1_\alpha$ after viscosity compensation, the pinion angle acceleration $\alpha_p$ which is computed by the differentiator 85d, and the vehicle speed V. The inertia compensation circuit 85b multiplies the pinion angle accelerator $\alpha_p$ by an inertia compensation coefficient to compute an inertia compensation amount, and adds the computed inertia compensation amount to the axial force $F1_\alpha$ after viscosity compensation to compute an axial force $F1_\beta$ after inertia compensation. The inertia compensation coefficient is varied in accordance with the vehicle speed V.

The phase compensation circuit 85c compensates for the phase of the axial force $F1_\beta$ after inertia compensation. The phase compensation circuit 85c retrieves the axial force $F1_\beta$ after inertia compensation and the vehicle speed V. The phase compensation circuit 85c multiplies the axial force $F1_\beta$ after inertia compensation by a phase compensation coefficient to compute a phase compensation amount, and adds the computed phase compensation amount to the axial force $F1_\beta$ after inertia compensation to compute an axial force $F1_\gamma$ after phase compensation. The axial force $F1_\gamma$ after phase compensation is subjected to gradient compensation performed by the gradient compensation circuit 86.

Also in this way, an unwanted component due to the viscosity and the inertia of the steering motor 41 etc. superimposed on the axial force $F1_c$ after efficiency compensation can be removed. In addition, the phase of the axial force $F1_c$ after efficiency compensation can also be compensated for.

The estimated axial force computation circuit 80 has the viscosity compensation circuit 85a, the inertia compensation circuit 85b, and the phase compensation circuit 85c as dynamic characteristic computation circuits. However, the estimated axial force computation circuit 80 may be configured to have one or two of such compensation circuits.

Next, a vehicle control device according to a fourth embodiment will be described. The present example differs from the first embodiment in the configuration of the estimated axial force computation circuit. The present embodiment can also be applied to the second embodiment and the third embodiment described earlier.

Figure 20:
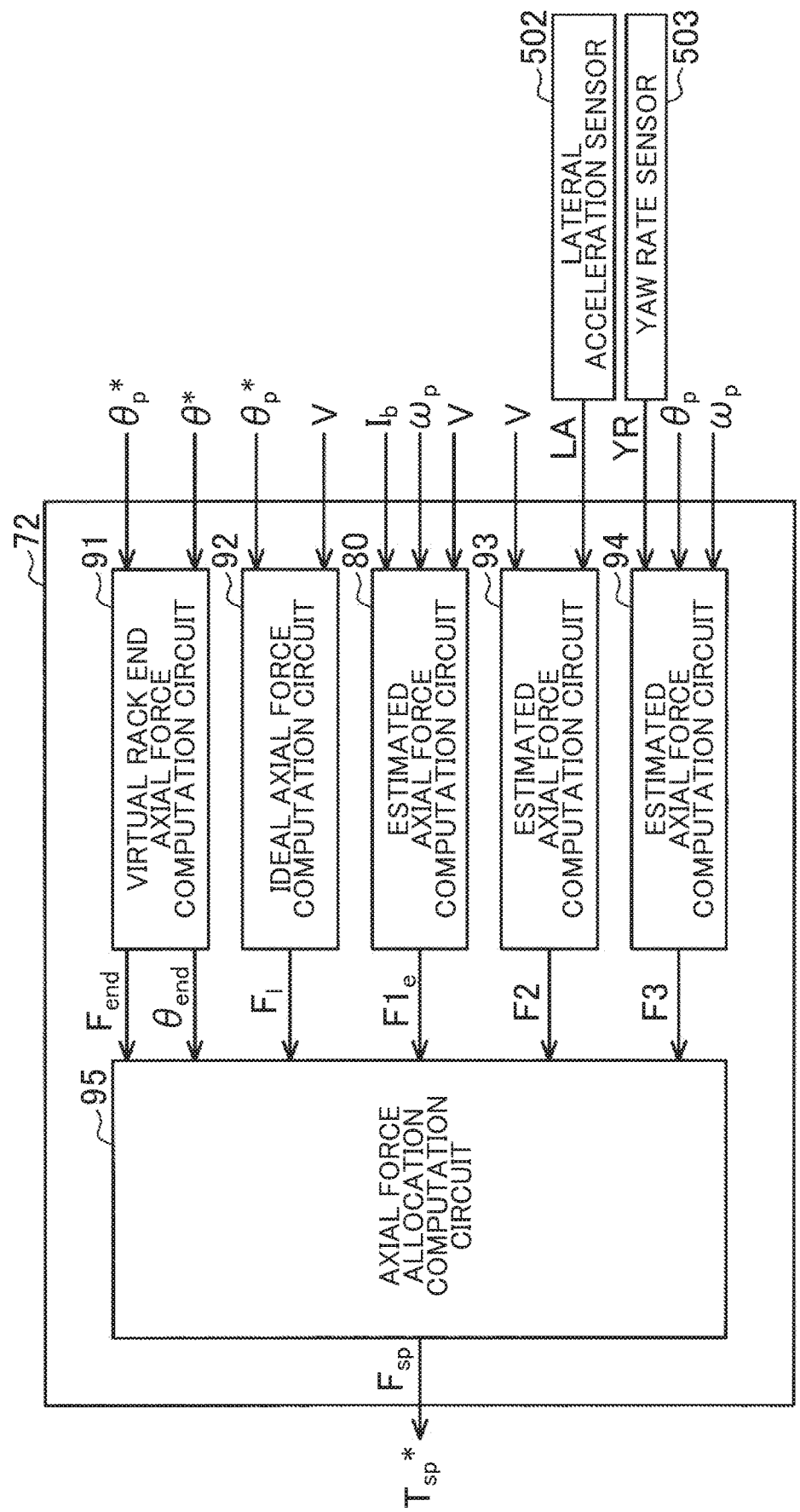
FIG. 20 is a control block diagram of a vehicle model according to a fourth embodiment.

As illustrated in FIG. 20, the vehicle model 72 has a virtual rack end axial force computation circuit 91, an ideal axial force computation circuit 92, an estimated axial force computation circuit 93, an estimated axial force computation circuit 94, and an axial force allocation computation circuit 95 in addition to the estimated axial force computation circuit 80 described earlier.

The virtual rack end axial force computation circuit 91 computes a virtual rack end axial force $F_{end}$ as a correction amount for the basic drive torque $T_{in}^*$ in order to virtually restrict the operation range of the steering wheel 11 to a range that is narrower than the original physical maximum steering range when the operation position of the steering wheel 11 approaches a limit position of the physical operation range. The virtual rack end axial force $F_{end}$ is computed from the viewpoint of abruptly increasing torque (steering reaction force torque) in a direction opposite to the steering direction generated by the reaction force motor 31.

The limit position of the physical operation range of the steering wheel 11 is also a position at which the steered shaft 14 reaches a limit of the movable range. When the steered shaft 14 reaches the limit of the movable range, a so-called "end abutment" in which an end portion (rack end) of the steered shaft 14 abuts against the housing occurs so that the moving range of the rack shaft is physically restricted. Consequently, the operation range of the steering wheel is also restricted.

The virtual rack end axial force computation circuit 91 retrieves the target steering angle $\theta^*$ and the target pinion angle $\theta_p^*$, which is computed by the steering angle ratio change control circuit 62 (see FIG. 2). The virtual rack end axial force computation circuit 91 multiplies the target pinion angle $\theta_p^*$ by a predetermined conversion coefficient to compute the target steered angle. The virtual rack end axial force computation circuit 91 compares the target steered angle and the target steering angle $\theta^*$, and uses one of the two angles, the absolute value of which is the larger, as a virtual rack end angle $\theta_{end}$.

The virtual rack end axial force computation circuit 91 computes the virtual rack end axial force $F_{end}$ using a virtual rack end map stored in the storage device (not illustrated) of the control device 50 when the virtual rack end angle $\theta_{end}$ reaches an end determination threshold. The end determination threshold is set on the basis of a value in the vicinity of the physical maximum steering range of the steering wheel 11, or a value in the vicinity of the maximum movable range of the steered shaft 14. The virtual rack end axial force $F_{end}$ is a correction amount for the basic drive torque $T_{in}^*$, and is set to have the same sign as the sign (positive or negative) of the virtual rack end angle $\theta_{end}$. After the virtual rack end angle $\theta_{end}$ reaches the end determination threshold, the virtual rack end axial force $F_{end}$ is set to a larger value as the absolute value of the virtual rack end angle $\theta_{end}$ is increased.

The ideal axial force computation circuit 92 computes an ideal axial force $F_1$, which is an ideal value of the axial force which acts on the steered shaft 14 through the steered wheels 16. The ideal axial force computation circuit 92 computes the ideal axial force $F_i$ using an ideal axial force map stored in the storage device (not illustrated) of the control device 50. The ideal axial force $F_i$ is set to have a larger absolute value as the absolute value of the target steered angle, which is obtained by multiplying the target pinion angle $\theta_p^*$ by a predetermined conversion coefficient, is increased, and as the vehicle speed V is lower. The ideal axial force $F_i$ may be computed on the basis of only the target steered angle without consideration of the vehicle speed V.

The estimated axial force computation circuit 93 estimates and computes an axial force F2 that acts on the steered shaft 14 on the basis of a lateral acceleration LA detected through a lateral acceleration sensor 502 provided in the vehicle. The axial force F2 is calculated by multiplying the lateral acceleration LA by a gain, which is a coefficient that matches the vehicle speed V. The lateral acceleration LA reflects the road surface state such as road surface frictional resistance. Therefore, the axial force F2 which is computed on the basis of the lateral acceleration LA reflects the actual road surface state.

The estimated axial force computation circuit 94 estimates and computes an axial force F3 that acts on the steered shaft 14 on the basis of a yaw rate YR detected through a yaw rate sensor 503 provided in the vehicle. The axial force F3 is calculated by multiplying a yaw rate differential value, which is obtained by differentiating the yaw rate YR, by a vehicle speed gain, which is a coefficient that matches the vehicle speed V. The vehicle speed gain is set to a larger value as the vehicle speed V is higher. The yaw rate YR reflects the road surface state such as road surface frictional resistance. Therefore, the axial force F3 which is computed on the basis of the yaw rate YR reflects the actual road surface state.

The axial force F3 may be computed as follows. That is, the estimated axial force computation circuit 94 calculates the axial force F3 by adding at least one of a correction axial force that matches the steered angle θt, a correction axial force that matches the steered speed, and a correction axial force that matches a steered angle acceleration to a value obtained by multiplying the yaw rate differential value by the vehicle speed gain. The steered angle θt is obtained by multiplying the pinion angle $\theta_p$ by a predetermined conversion coefficient. The steered speed may be obtained by differentiating the steered angle θt, or may be obtained by converting the pinion angle speed $\omega_p$. The steered angle acceleration may be obtained by differentiating the steered angle speed, or may be obtained by converting the pinion angle acceleration $\alpha_p$.

The axial force allocation computation circuit 95 sums up the virtual rack end axial force $F_{end}$, the ideal axial force $F_1$, the axial force $F1_e$, the axial force F2, and the axial force F3 at predetermined allocation ratios based on various state amounts that reflect the travel state or the steering state of the vehicle to compute a final axial force $F_{sp}$ used to compute the spring component $T_{sp}^*$ for the basic drive torque $T_{in}$. The vehicle model 72 computes (converts) the spring component $T_{sp}^*$ for the basic drive torque $T_{in}^*$ on the basis of the axial force $F_{sp}$.

Figure 21:
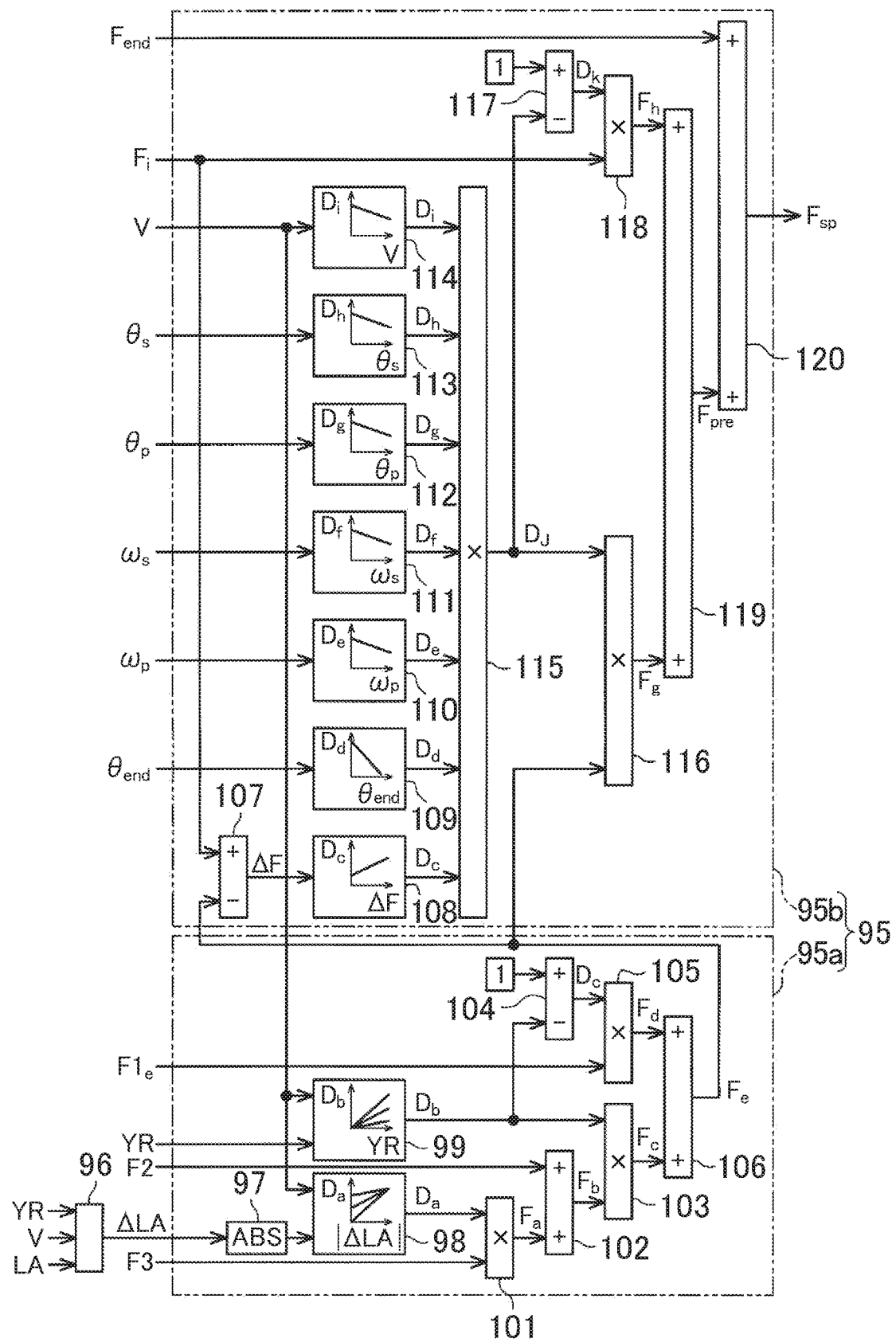
FIG. 21 is a control block diagram of an axial force allocation computation circuit according to the fourth embodiment.

Next, the axial force allocation computation circuit 95 will be described in detail. As illustrated in FIG. 21, the axial force allocation computation circuit 95 has a first computation circuit 95a and a second computation circuit 95b.

The first computation circuit 95a sums up the axial forces $F1_e$, F2, and F3, which are estimated and computed by the estimated axial force computation circuits 80, 93, and 94, respectively, at predetermined distribution ratios to compute a more appropriate estimated axial force $F_e$.

The first computation circuit 95a retrieves the axial forces $F1_e$, F2, and F3, the yaw rate YR, and a lateral acceleration difference value ΔLA. The lateral acceleration difference value ΔLA is computed by a difference value computation circuit 96 provided to the vehicle model 72. The difference value computation circuit 96 computes the lateral acceleration difference value ΔLA on the basis of the formula (10).

$$\Delta LA = YR \times V - LA \quad (10)$$

In the formula, YR is the yaw rate which is detected through the yaw rate sensor 503. V is the vehicle speed which is detected through the vehicle speed sensor 501. LA is the lateral acceleration which is detected through the lateral acceleration sensor 502.

The first computation circuit 95a has an absolute value computation circuit 97, distribution ratio computation circuits 98 and 99, multipliers 101, 103, and 105, adders 102 and 106, and a subtractor 104. The absolute value computation circuit 97 computes an absolute value |ΔLA| of the lateral acceleration difference value ΔLA which is computed by the difference value computation circuit 96. The distribution ratio computation circuit 98 computes a distribution ratio $D_a$ in accordance with the absolute value |ΔLA| of the lateral acceleration difference value ΔLA. The distribution ratio $D_a$ is set to a larger value as the absolute value |ΔLA| of the lateral acceleration difference value ΔLA is increased, and as the vehicle speed V is higher. The multiplier 101 multiplies the axial force F3, which is based on the yaw rate YR, by the distribution ratio $D_a$ to compute an axial force $F_a$ after allocation. The adder 102 adds the axial force F2, which is based on the lateral acceleration LA, and the axial force $F_a$, which is computed by the multiplier 101 to compute an axial force $F_b$.

The distribution ratio computation circuit 99 computes a distribution ratio $D_b$ in accordance with the yaw rate YR. The distribution ratio $D_b$ is set to a larger value as the yaw rate YR is increased, and as the vehicle speed V is higher. The multiplier 103 multiplies the axial force $F_b$, which is computed by the adder 102, by the distribution ratio $D_b$ to compute an axial force $F_c$.

The subtractor 104 computes a distribution ratio $D_c$ by subtracting the distribution ratio $D_b$, which is computed by the distribution ratio computation circuit 99, from 1, which is a fixed value stored in the storage device of the control device 50. The multiplier 105 multiplies the axial force $F1_e$, which is based on the current value $I_b$ of the steering motor 41, by the distribution ratio $D_c$ to compute an axial force $F_d$.

The adder 106 adds the axial force $F_d$, which is computed by the multiplier 105, and the axial force $F_c$, which is computed by the multiplier 103, to compute the final estimated axial force $F_e$. The second computation circuit 95b sums up the estimated axial force $F_e$, which is computed by the first computation circuit 95a, and the ideal axial force $F_1$, which is computed by the ideal axial force computation circuit 92, at predetermined allocation ratios based on various state amounts that reflect the travel state or the steering state of the vehicle to compute the final axial force $F_{sp}$, which is used to compute the spring component $T_{sp}^*$ for the basic drive torque $T_{in}$.

The second computation circuit 95b has subtractors 107 and 117, distribution ratio computation circuits 108 to 114, multipliers 115 and 118, and adders 119 and 120.

The subtractor 107 computes an axial force deviation ΔF by subtracting the estimated axial force $F_e$, which is allocated and computed by the first computation circuit 95a (adder 106), from the ideal axial force $F_1$, which is based on the target pinion angle $\theta_p$.

The distribution ratio computation circuit 108 computes a distribution ratio $D_c$ in accordance with the axial force deviation ΔF. The distribution ratio $D_c$ is set to a larger value as the axial force deviation ΔF is increased. The distribution ratio computation circuit 109 computes a distribution ratio $D_d$ in accordance with the virtual rack end axial force $F_{end}$. The distribution ratio computation circuit 110 computes a distribution ratio $D_e$ in accordance with the pinion angle speed $\omega_p$ (which may be converted into a steered speed). The distribution ratio computation circuit 111 computes a distribution ratio $D_f$ in accordance with a steering speed $\omega_s$ obtained by differentiating the steering angle $\theta_s$. The distribution ratio computation circuit 112 computes a distribution ratio $D_g$ in accordance with the pinion angle $\theta_p$. The distribution ratio computation circuit 113 computes a distribution ratio $D_h$ in accordance with the steering angle $\theta_s$. The distribution ratio computation circuit 114 computes a distribution ratio $D_1$ in accordance with the vehicle speed V. The distribution ratios $D_d$, $D_e$, $D_f$, $D_g$, $D_h$, and $D_1$ are set to a smaller value as each of the state amounts ($\theta_{end}$, $\omega_p$, $\omega_s$, $\theta_p$, $\theta_s$, V) which are retrieved by the distribution ratio computation circuits (109 to 114) is increased.

The multiplier 115 multiplies the distribution ratios $D_c$, $D_d$, $D_e$, $D_f$, $D_g$, $D_h$, and $D_i$ to compute a distribution ratio $D_j$ of the final estimated axial force $F_e$, which is computed by the first computation circuit 95a. The multiplier 116 multiplies the final estimated axial force $F_e$, which is computed by the first computation circuit 95a, by the distribution ratio $D_j$, which is based on the state amounts, to compute an estimated axial force $F_g$ after allocation.

The subtractor 117 subtracts the distribution ratio $D_j$, which is computed by the multiplier 115, from 1, which is a fixed value stored in the storage device of the control device 50, to compute a distribution ratio $D_k$ of the ideal axial force $F_i$. The multiplier 118 multiplies the ideal axial force $F_i$, which is computed by the ideal axial force computation circuit 92, by the distribution ratio $D_k$ to compute an ideal axial force $F_h$ after allocation.

The adder 119 sums up the ideal axial force $F_h$ after allocation and the estimated axial force $F_g$ after allocation to compute an axial force $F_{pre}$. The adder 120 sums up the axial force $F_{pre}$, which is computed by the adder 119, and the virtual rack end axial force $F_{end}$ to compute the final axial force $F_{sp}$, which is used to compute the spring component $T_{sp}^*$ for the basic drive torque $T_{in}$. When the virtual rack end axial force $F_{end}$ is not computed, the axial force $F_{pre}$, which is computed by the adder 119, is used as the final axial force $F_{sp}$, which is used to compute the spring component $T_{sp}^*$ for the basic drive torque $T_{in}^*$.

Thus, in the present embodiment, an axial force $F1_{pre}$ ($F_{sp}$) that reflects the road surface state more finely is computed by allocating the ideal axial force $F_1$, which is computed on the basis of the axial forces $F1_e$, F2, and F3, which are estimated and computed on the basis of a plurality of types of state amounts, and the target pinion angle $\theta_p^*$ (target steered angle), in accordance with the various state amounts. With the axial force $F1_{pre}$ reflected in the basic drive torque $T_{in}^*$, a finer steering reaction force that matches the road surface state is applied to the steering wheel 11.

The fourth embodiment may also be implemented in the following modified forms.

In the present example, the vehicle model 72 may be configured not to include at least one of the two estimated axial force computation circuits 93 and 94. That is, the axial force $F_{pre}$ may be computed by summing up at least the axial force $F1_e$ (estimated axial force), which is estimated and computed by the estimated axial force computation circuit 80, and the ideal axial force $F_i$ at predetermined allocation ratios. The final axial force $F_{sp}$ is computed by summing up the axial force $F_{pre}$ and the virtual rack end axial force $F_{end}$.

In addition, the distribution ratio $D_j$ of the estimated axial force $F_e$, which is computed by the first computation circuit 95a, may be calculated using at least one of the distribution ratios $D_c$, $D_d$, $D_e$, $D_f$, $D_g$, $D_h$, and $D_1$, which are computed by the distribution ratio computation circuits (109 to 114). In the case where only one of the distribution ratios is used, the one distribution ratio is used, as it is, as the distribution ratio $D_i$ of the estimated axial force $F_e$.

Next, a vehicle control device according to a fifth embodiment will be described. In the present example, the configuration of a portion around the pinion angle feedback control circuit 64 is different from that according to the first embodiment. The present example can also be applied to any of the second to fourth embodiments described earlier.

As illustrated in FIG. 4 described earlier, when the pinion angle feedback control circuit 64 computes a pinion angle command value $T_p^*$ through feedback control (PID control) for the pinion angle $\theta_p$, the following concern arises. That is, there is a frequency band in which the performance of feedback control for the pinion angle $\theta_p$ cannot be fully demonstrated due to the effect of the pneumatic pressure of the tires.

Figure 22:
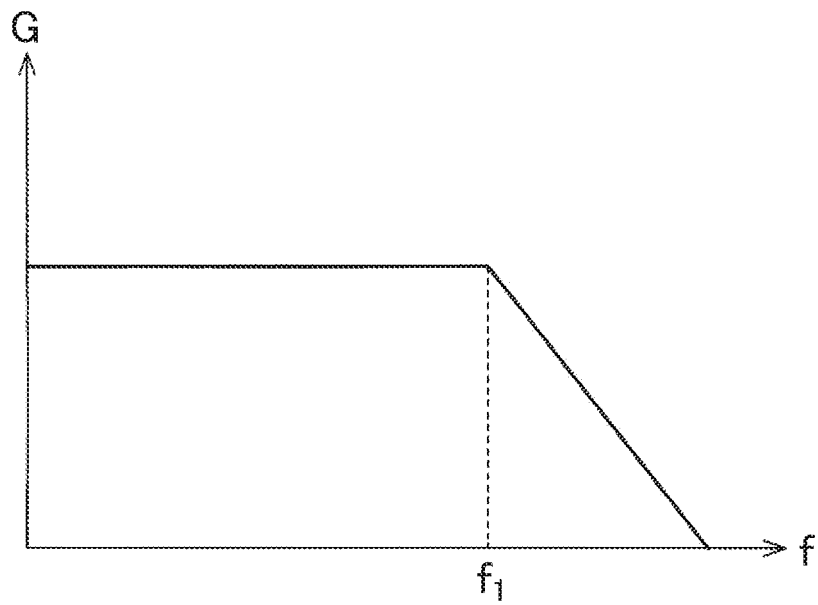
FIG. 22 is a graph illustrating ideal frequency characteristics of a pinion angle feedback computation circuit according to a fifth embodiment.

As indicated in the graph of FIG. 22, when a frequency f and a gain are plotted on the horizontal axis and the vertical axis, respectively, ideal frequency characteristics (transfer characteristics) for the frequency of the pinion angle feedback control circuit 64 are as follows. That is, a gain G is maintained at a constant value before the frequency f reaches a particular frequency $f_1$. It should be noted, however, that the gain G is gradually decreased as the frequency f is increased after the frequency f reaches the particular frequency $f_1$.

Figure 23:
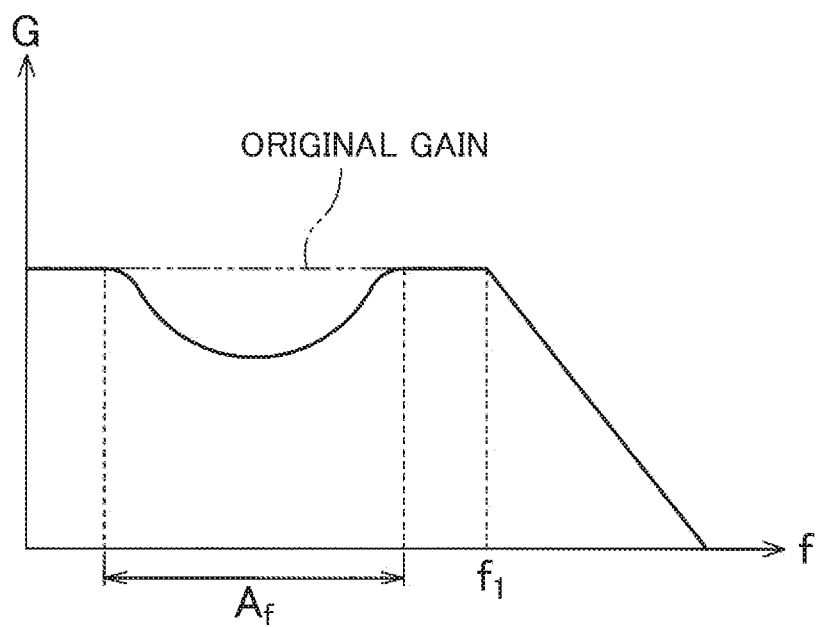
FIG. 23 is a graph illustrating the actual frequency characteristics of the pinion angle feedback computation circuit according to the fifth embodiment.

As indicated by the continuous line in the graph of FIG. 23, however, there is a frequency domain $A_f$ in which the value of the gain G with respect to the frequency f is smaller than the original value indicated by the long dashed double-short dashed line in FIG. 23 due to the effect of the pneumatic pressure of the tires. In the frequency domain $A_f$, the response is lowered by an amount by which the value of the gain G is smaller than the original value, and therefore the performance of feedback control for the pinion angle $\theta_p$ may not be fully demonstrated.

Figure 24A:
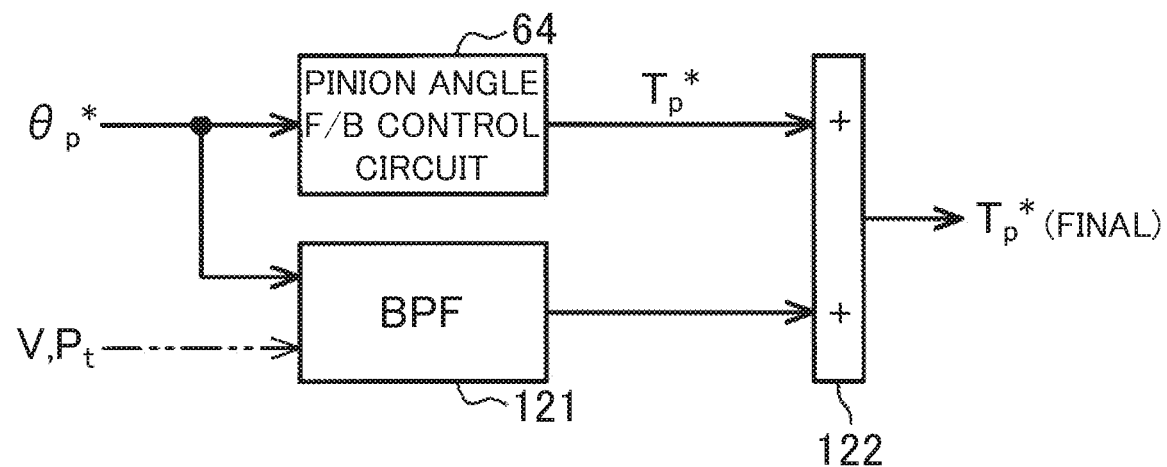
FIG. 24A is a control block diagram illustrating the configuration of a portion around the pinion angle feedback computation circuit according to the fifth embodiment.

Thus, in the present example, the steering control circuit 50b is configured as follows. As illustrated in FIG. 24A, the steering control circuit 50b has a band-pass filter (BPF) 121 and an adder 122.

The frequency characteristics of the band-pass filter 121 are set from the viewpoint of canceling out the drop in the gain G with respect to the frequency f in the pinion angle feedback control circuit 64 indicated in FIG. 23 described earlier.

Figure 25:
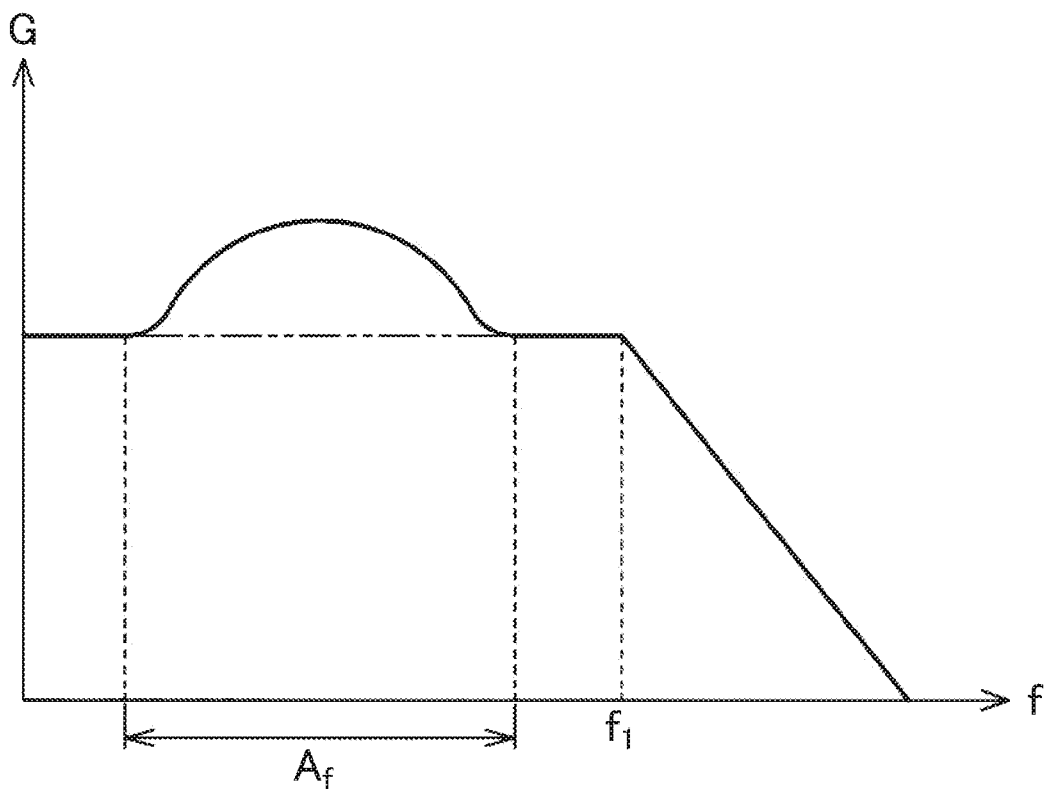
FIG. 25 is a graph illustrating the frequency characteristics of a band-pass filter according to the fifth embodiment.

As indicated by the continuous line in the graph of FIG. 25, the band-pass filter 121 has frequency characteristics that are opposite to those of the pinion angle feedback control circuit 64 in the frequency domain $A_f$. That is, the value of the gain G with respect to the frequency f is set to a larger value than the original value which is indicated by the long dashed double-short dashed line in FIG. 25. In the frequency domain $A_f$, the degree of variation in the gain G with respect to the frequency f corresponds to the degree of reduction in the gain G due to the effect of the pneumatic pressure of the tires etc. That is, the band-pass filter 121 is set to have such frequency characteristics that cancel out the degree of reduction (tendency of variation) in the gain G due to the effect of the pneumatic pressure of the tires.

The adder 122 sums up a correction command value $T_c$ and the pinion angle command value $T_p^*$, which is computed by the pinion angle feedback control circuit 64, to compute the final pinion angle command value $T_p^*$.

Thus, according to the present embodiment, by providing the control device 50 (steering control circuit 50b) with the band-pass filter 121 which serves as a feedforward element for the pinion angle feedback control circuit 64 which serves as a feedback element, the transfer function has the ideal frequency characteristics indicated in the graph of FIG. 22 described earlier as a whole since input of the target pinion angle $\theta_p^*$ to the pinion angle feedback control circuit 64 and the band-pass filter 121 until output of the final pinion angle command value $T_p^*$ through the adder 122. That is, the drop in the gain G with respect to the frequency f due to the pneumatic pressure of the tires is suppressed. Therefore, the performance of feedback control for the pinion angle $\theta_p$, and hence the steering control performance, can be demonstrated more appropriately while being affected by the pneumatic pressure of the tires. In addition, the response is secured, and therefore so-called steering delay is also suppressed.

The fifth embodiment may also be implemented in the following modified forms.

Figure 24B:
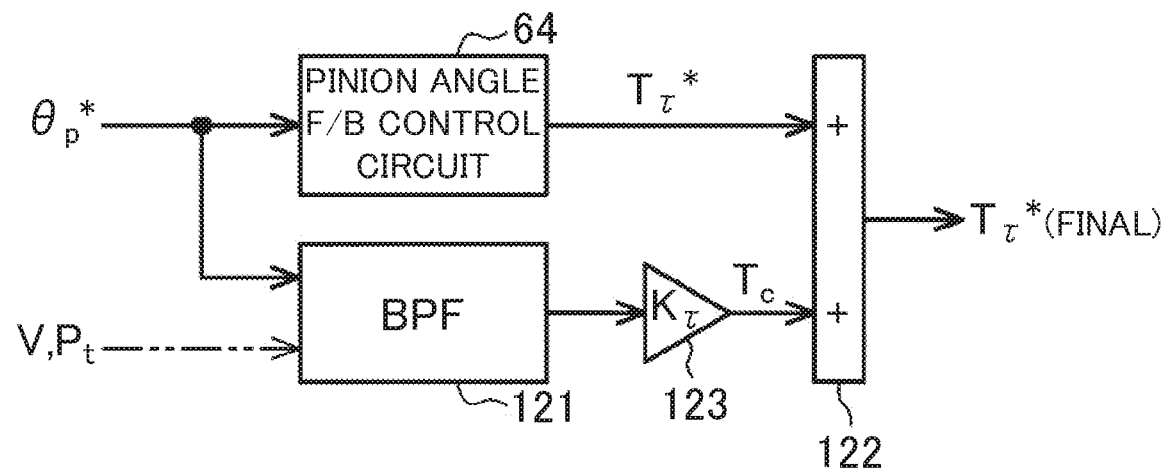
FIG. 24B is a control block diagram illustrating the configuration of a portion around a pinion angle feedback computation circuit according to a modification of the fifth embodiment.

In the present example, the pinion angle feedback control circuit 64 computes the pinion angle command value $T_p^*$ on the basis of the target pinion angle $\theta_p^*$. As illustrated in FIG. 24B, however, the pinion angle feedback control circuit 64 may compute a torque command value $T_\tau^*$, which is a target value for torque to be generated by the steering motor 41, on the basis of the pinion angle command value $T_p^*$. In this case, a conversion unit 123 is provided in a computation path between the band-pass filter 121 and the adder 122. The conversion unit 123 multiplies the target pinion angle $\theta_p^*$, which has been subjected to the filtering process which is performed by the band-pass filter 121, by a torque conversion coefficient $K_\tau$ to compute a correction command value $T_c$ for the torque command value $T_\tau^*$. The adder 122 sums up the torque command value $T_\tau^*$ and the correction command value $T_c$ to compute the final torque command value $T_\tau^*$. The energization control circuit 65 supplies electric power that matches the final torque command value $T_\tau^*$ to the steering motor 41.

In addition, at least one of parameters and gains that decide the characteristics of the band-pass filter 121 may be changed in accordance with a pneumatic pressure $P_t$ of the tires. This is because the degree of drop in the gain G with respect to the frequency f in the pinion angle feedback control circuit 64 is varied in accordance with the pneumatic pressure $P_t$ of the tires. In this case, the parameters and the gains of the band-pass filter 121 or the pneumatic pressure $P_t$ may be fixed at determined constant values when an abnormality of the pneumatic pressure $P_t$ of the tires is detected. The pneumatic pressure $P_t$ of the tires is detected by a pneumatic pressure sensor provided to each of the tires, for example.

In addition, at least one of parameters (R, L, C) and gains that decide the characteristics of the band-pass filter 121 may be changed in accordance with the vehicle speed V. This is because the degree of drop in the gain G with respect to the frequency f in the pinion angle feedback control circuit 64 is also varied in accordance with the vehicle speed V. In this case, the parameters and the gains of the band-pass filter 121 or the vehicle speed V may be fixed at determined constant values when an abnormality of the vehicle speed V is detected.

Next, a vehicle control device according to a sixth embodiment will be described. As with the fifth embodiment, the present example also has an object to suppress a reduction in the performance of feedback control for the pinion angle $\theta_p$ due to the pneumatic pressure of the tires etc.

In the present example, the steering control circuit 50b is configured as follows.

Figure 26:
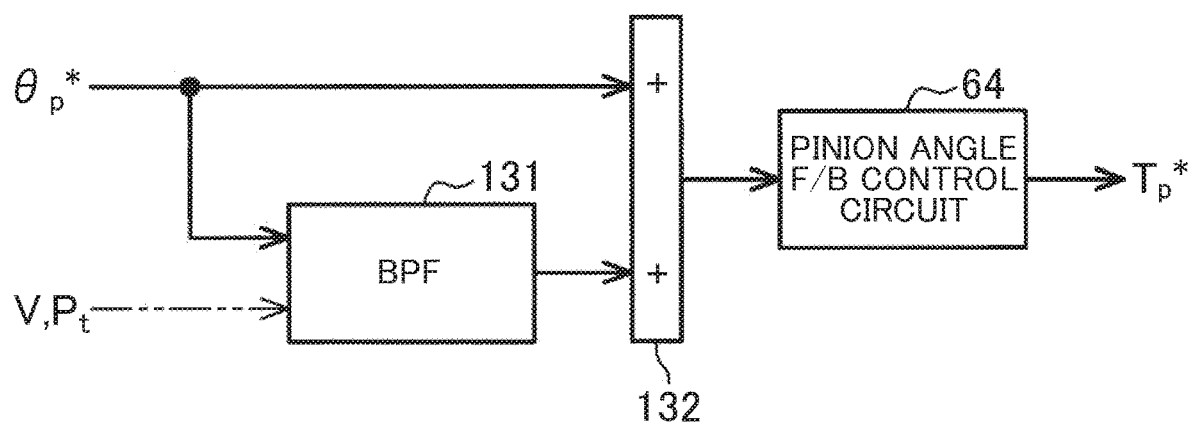
FIG. 26 is a control block diagram illustrating a portion around a pinion angle feedback computation circuit according to a sixth embodiment.

As illustrated in FIG. 26, a band-pass filter 131 and an adder 132 are provided in the stage preceding the pinion angle feedback control circuit 64, that is, in a computation path between the differential steering control circuit 63 and the pinion angle feedback control circuit 64.

The frequency characteristics of the band-pass filter 131 are the same as the frequency characteristics of the band-pass filter 121 indicated in the graph of FIG. 25 described earlier. The adder 132 sums up the target pinion angle $\theta_p$, which has been subjected to the differential steering control circuit 63, and the target pinion angle $\theta_p^*$, which has been subjected to the filtering process which is performed by the band-pass filter 131, to compute the final target pinion angle $\theta_p^*$.

The pinion angle feedback control circuit 64 computes a pinion angle command value $T_p^*$ through feedback control for the pinion angle $\theta_p$ in order to cause the actual pinion angle $\theta_p$ to follow the final target pinion angle $\theta_p^*$, which is computed by the adder 132.

Thus, according to the present embodiment, by providing the control device 50 (steering control circuit 50b) with the band-pass filter 131, the transfer function has the ideal frequency characteristics indicated in the graph of FIG. 22 described earlier as a whole since input of the target pinion angle $\theta_p^*$ to the band-pass filter 131 and the adder 132 until output of the final pinion angle command value $T_p^*$ from the pinion angle feedback control circuit 64. Therefore, the drop in the gain G with respect to the frequency f due to the pneumatic pressure of the tires etc. is suppressed. Thus, the performance of feedback control for the pinion angle $\theta_p$, and hence the steering control performance, can be demonstrated more appropriately.

As in the fifth embodiment, at least one of parameters and gains that decide the characteristics of the band-pass filter 131 may be changed in accordance with the pneumatic pressure $P_t$ of the tires or the vehicle speed V. In this case, the parameters and the gains of the band-pass filter 131 or the pneumatic pressure $P_t$ are fixed at determined constant values when an abnormality of the pneumatic pressure $P_t$ of the tires or the vehicle speed V is detected.

Next, a vehicle control device according to a seventh embodiment will be described. As with the fifth embodiment, the present example also has an object to suppress a reduction in the performance of feedback control for the pinion angle $\theta_p$ due to the pneumatic pressure of the tires etc.

Figure 27:
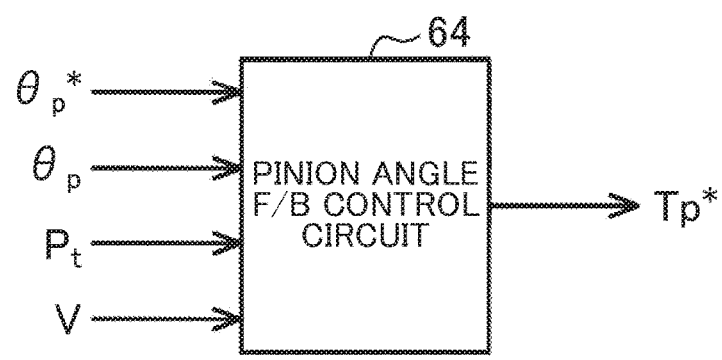
FIG. 27 is a control block diagram illustrating signals supplied to a pinion angle feedback computation circuit according to a seventh embodiment.

As illustrated in FIG. 27, the pinion angle feedback control circuit 64 retrieves the pinion angle $\theta_p$, the target pinion angle $\theta_p^*$, the pneumatic pressure $P_t$ of the tires, and the vehicle speed V. The pinion angle $\theta_p^*$ is computed by the pinion angle computation circuit 61. The target pinion angle $\theta_p^*$ has been subjected to the differential steering control circuit 63. The pneumatic pressure $P_t$ of the tires is detected through a pneumatic pressure sensor provided to each of the tires.

Figure 28:
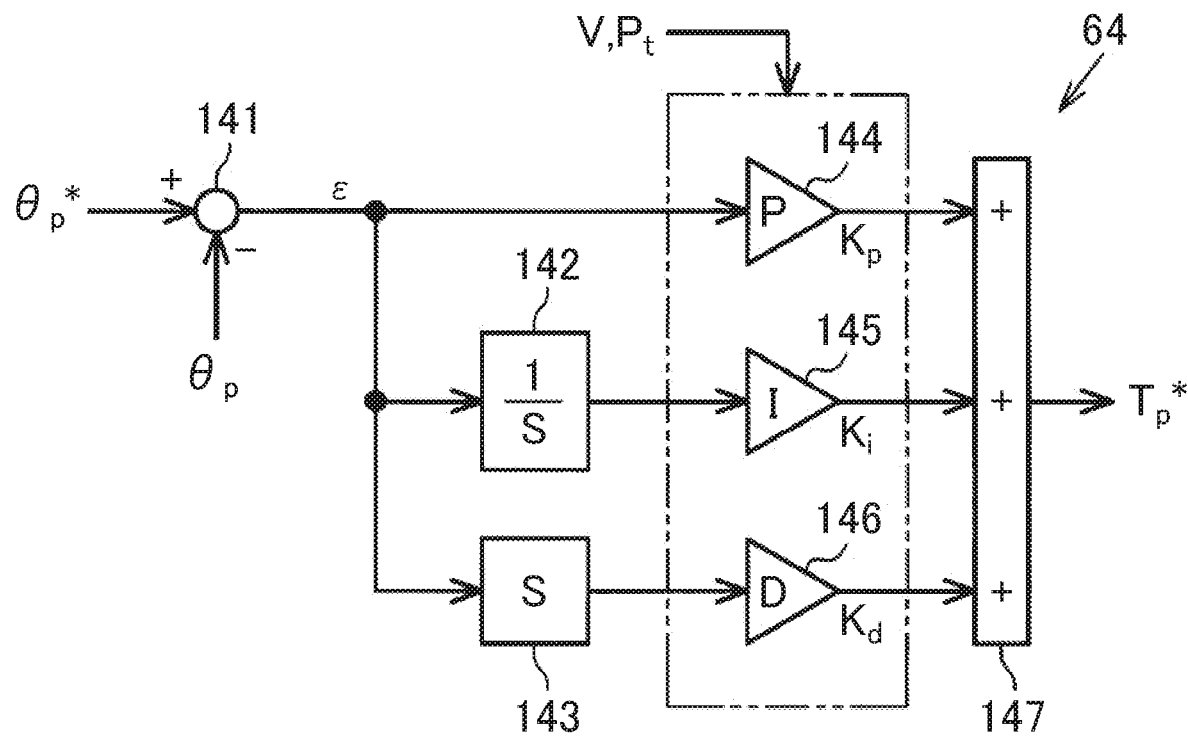
FIG. 28 is a control block diagram of the pinion angle feedback computation circuit according to the seventh embodiment.

As illustrated in FIG. 28, the pinion angle feedback control circuit 64 has a subtractor 141, an integrator 142, a differentiator 143, a proportional gain multiplication unit 144, an integral gain multiplication unit 145, a differential gain multiplication unit 146, and an adder 147.

The subtractor 141 subtracts the pinion angle $\theta_p$ from the target pinion angle $\theta_p^*$ to compute a deviation ε. The integrator 142 integrates the deviation ε. The differentiator 143 differentiates the deviation ε. The proportional gain multiplication unit 144 multiplies the deviation ε by a proportional gain $K_p$. The integral gain multiplication unit 145 multiplies the integral value of the deviation ε, which is computed by the integrator 142, by an integral gain $K_i$. The differential gain multiplication unit 146 multiplies the differential value of the deviation ε, which is computed by the differentiator 143, by a differential gain $K_d$. The adder 147 adds up the result (P-term) of the computation which is performed by the proportional gain multiplication unit 144, the result (I-term) of the computation which is performed by the integral gain multiplication unit 145, and the result (D-term) of the computation which is performed by the differential gain multiplication unit 146 to compute a pinion angle command value $T_p^*$ as a control value.

The proportional gain $K_p$, the integral gain $K_i$, and the differential gain $K_d$, which are control parameters for PID control executed by the pinion angle feedback control circuit 64 are changed in accordance with the pneumatic pressure $P_t$ of the tires and the vehicle speed V. Specifically, the proportional gain multiplication unit 144, the integral gain multiplication unit 145, and the differential gain multiplication unit 146 set the control parameters ($K_p$, $K_i$, $K_d$) using respective parameter maps.

Figure 29:
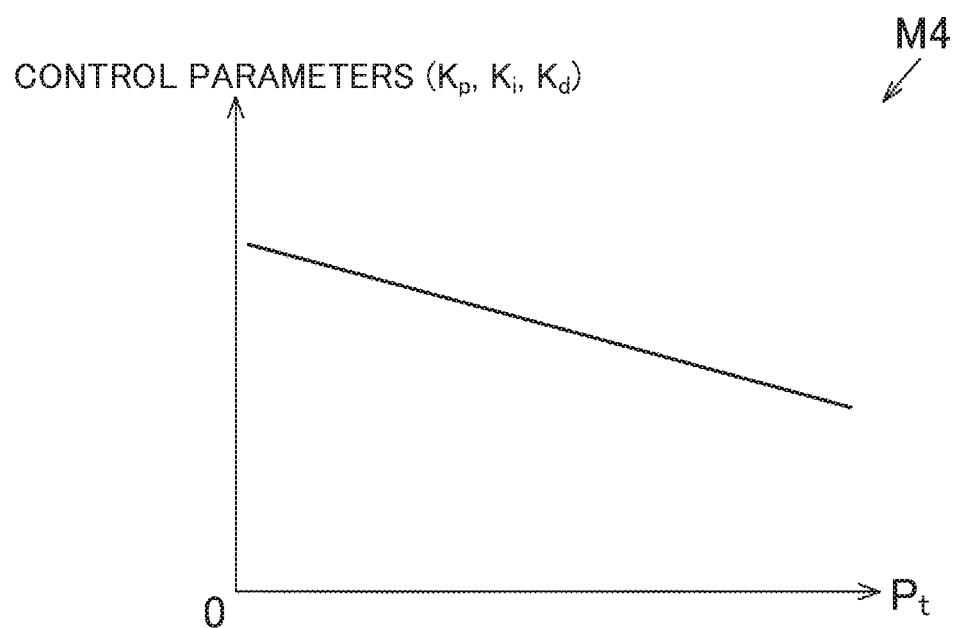
FIG. 29 is a graph illustrating the relationship between the tire pneumatic pressure and feedback control parameters according to the seventh embodiment.

As indicated in the graph of FIG. 29, a first parameter map M4 is a two-dimensional map that prescribes the relationship between the pneumatic pressure $P_t$ of the tires and the control parameters ($K_p$, $K_i$, $K_d$). The first parameter map M4 is set from the viewpoint of canceling out the drop in the gain G with respect to the frequency f in the pinion angle feedback control circuit 64 indicated in FIG. 23 described earlier. The first parameter map M4 has the following characteristics. That is, the control parameters ($K_r$, $K_i$, $K_d$) are set to a smaller value as the pneumatic pressure $P_t$ of the tires is increased.

Figure 30:
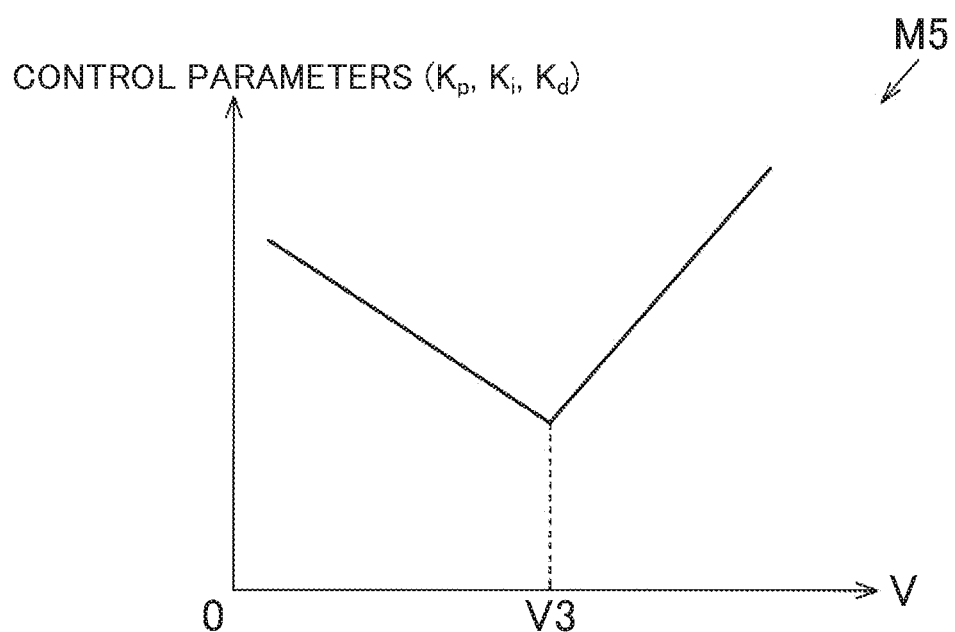
FIG. 30 is a graph illustrating the relationship between the vehicle speed and the feedback control parameters according to the seventh embodiment.

As indicated in the graph of FIG. 30, a second parameter map M5 is a two-dimensional map that prescribes the relationship between the vehicle speed V and the control parameters ($K_r$, $K_i$, $K_d$). The second parameter map M5 is also set from the viewpoint of canceling out the drop in the gain G with respect to the frequency f in the pinion angle feedback control circuit 64 indicated in FIG. 23 described earlier. The second parameter map M5 has the following characteristics. That is, when the vehicle speed V is less than a predetermined value V3 based on zero, the control parameters are set to a smaller value as the vehicle speed V is higher. When the vehicle speed V is equal to or more than the predetermined value V3, the control parameters are set to a larger value as the vehicle speed V is higher. The predetermined value V3 corresponds to a vehicle speed in a so-called medium speed range.

When an abnormality is detected in at least one of the pneumatic pressure $P_t$ of the tires and the vehicle speed V, the control parameters ($K_p$, $K_i$, $K_d$) may be fixed at determined constant values. The at least one of the pneumatic pressure $P_t$ of the tires and the vehicle speed V, in which an abnormality is detected, may be fixed at a predetermined constant value.

In addition, the proportional gain multiplication unit 144, the integral gain multiplication unit 145, and the differential gain multiplication unit 146 may change the control parameters in accordance with one of the pneumatic pressure $P_t$ of the tires and the vehicle speed V.

Thus, in the present embodiment, the drop in the gain G with respect to the frequency f due to the pneumatic pressure $P_t$ of the tires etc. is suppressed with the control parameters ($K_p$, $K_i$, $K_d$) of the pinion angle feedback control circuit 64 changed in accordance with at least one of the pneumatic pressure $P_t$ of the tires and the vehicle speed V. Therefore, feedback control for the pinion angle $\theta_p$ can be executed more appropriately while being affected by the pneumatic pressure $P_t$ of the tires etc. That is, the performance of feedback control for the pinion angle $\theta_p$, and hence the steering control performance, can be demonstrated more appropriately.

Next, an eighth embodiment in which a vehicle control device is applied to an electric power steering device (hereinafter abbreviated as "EPS") will be described below. Members that are similar to those according to the first embodiment are given the same reference numerals to omit detailed description.

Figure 31:
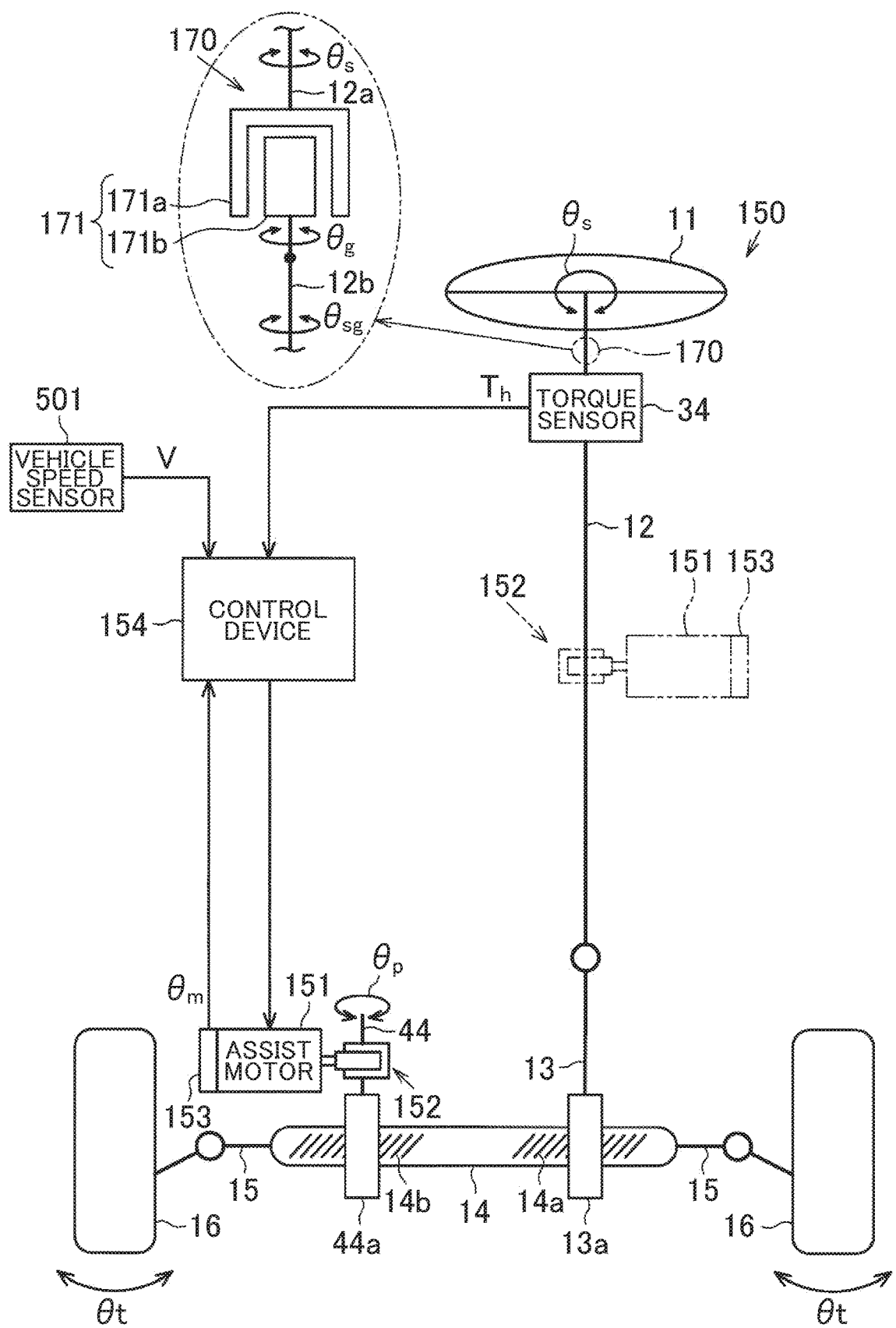
FIG. 31 is a diagram illustrating the configuration of a steering device (electric power steering device) according to an eighth embodiment.

As illustrated in FIG. 31, an EPS 150 has the steering shaft 12, the pinion shaft 13, and the steered shaft 14 which function as a power transfer path between the steering wheel 11 and the steered wheels 16. Reciprocal linear motion of the steered shaft 14 is transferred to the right and left steered wheels 16 via the tie rods 15 which are coupled to both ends of the steered shaft 14.

The EPS 150 also has an assist motor 151, a speed reduction mechanism 152, the torque sensor 34, a rotational angle sensor 153, and a control device 154 as components for generating a steering assist force (assist force). The rotational angle sensor 153 is provided to the assist motor 151, and detects a rotational angle $\theta_m$ of the assist motor 151.

The assist motor 151 is a generation source for the steering assist force. A three-phase brushless motor, for example, is adopted as the assist motor 151. The assist motor 151 is coupled to the pinion shaft 13 via the speed reduction mechanism 152. Rotation of the assist motor 151 is reduced in speed by the speed reduction mechanism 152, and the rotational force which has been reduced in speed is transferred to the pinion shaft 13 as the steering assist force.

The control device 154 executes assist control in which a steering assist force that matches the steering torque $T_h$ is generated through energization control for the assist motor 151. The control device 154 controls power supply to the assist motor 151 on the basis of the steering torque $T_h$ which is detected through the torque sensor 34, the vehicle speed V which is detected through the vehicle speed sensor 501, and the rotational angle $\theta_m$ which is detected through the rotational angle sensor 153.

Figure 32:
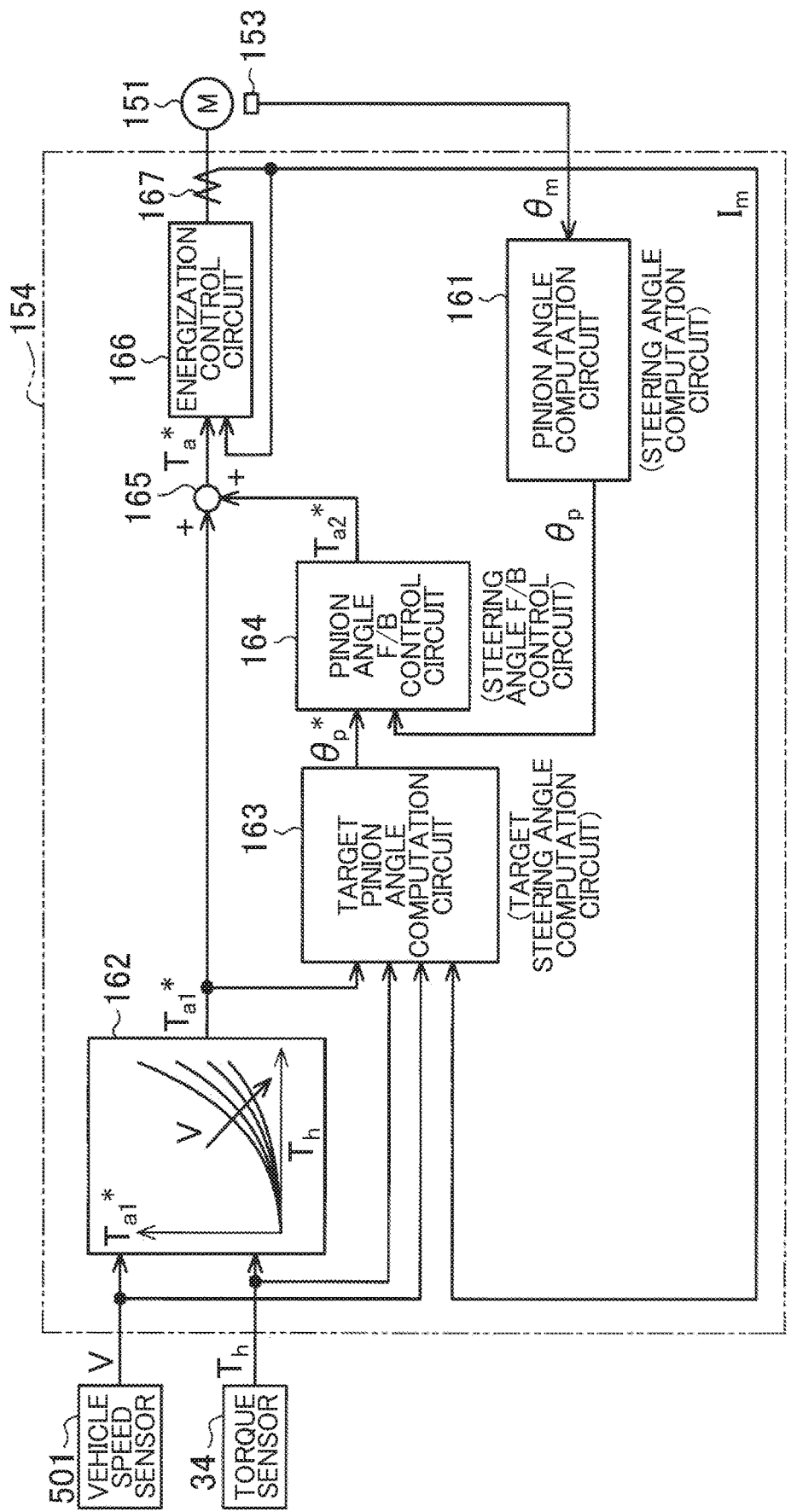
FIG. 32 is a control block diagram of an electronic control device according to the eighth embodiment.

As illustrated in FIG. 32, the control device 154 includes a pinion angle computation circuit 161, a basic assist component computation circuit 162, a target pinion angle computation circuit 163, a pinion angle feedback control circuit (pinion angle F/B control circuit) 164, an adder 165, and an energization control circuit 166.

The pinion angle computation circuit 161 retrieves the rotational angle $\theta_m$ of the assist motor 151, and computes the pinion angle $\theta_p$, which is the rotational angle of the pinion shaft 13, on the basis of the retrieved rotational angle $\theta_m$.

The basic assist component computation circuit 162 computes a basic assist component $T_{a1}*$ on the basis of the steering torque $T_h$ and the vehicle speed V. The basic assist component computation circuit 162 computes the basic assist component $T_{a1}*$ using a three-dimensional map that prescribes the relationship between the steering torque $T_h$ and the basic assist component $T_{a1}*$ in accordance with the vehicle speed V. The basic assist component computation circuit 162 sets the absolute value of the basic assist component $T_{a1}*$ to a larger value as the absolute value of the steering torque $T_h$ is larger, and as the vehicle speed V is lower.

The target pinion angle computation circuit 163 retrieves the basic assist component $T_{a1}*$, which is computed by the basic assist component computation circuit 162, and the steering torque $T_h$. The target pinion angle computation circuit 163 has an ideal model that determines an ideal pinion angle on the basis of basic drive torque when the total sum of the basic assist component $T_{a1}*$ and the steering torque $T_h$ is defined as the basic drive torque (input torque). The ideal model is obtained by preliminarily modeling a pinion angle corresponding to an ideal steered angle that matches the basic drive torque through an experiment or the like. The target pinion angle computation circuit 163 adds the basic assist component $T_{a1}*$ and the steering torque $T_h$ to calculate the basic drive torque, and computes the target pinion angle $\theta_p$ from the calculated basic drive torque on the basis of the ideal model. The target pinion angle computation circuit 163 computes the target pinion angle $\theta_p*$ in consideration of the vehicle speed V and a current value $I_m$ detected through a current sensor 167 provided in a power supply path for the assist motor 151. The current value $I_m$ is the value of the actual current to be supplied to the assist motor 151.

The pinion angle feedback control circuit 164 retrieves the target pinion angle $\theta_p*$, which is calculated by the target pinion angle computation circuit 163, and the actual pinion angle $\theta_p$, which is calculated by the pinion angle computation circuit 161. The pinion angle feedback control circuit 164 performs proportional-integral-differential (PID) control as feedback control for the pinion angle such that the actual pinion angle $\theta_p$ follows the target pinion angle $\theta_p*$. That is, the pinion angle feedback control circuit 164 calculates a deviation between the target pinion angle $\theta_p*$ and the actual pinion angle $\theta_p$, and computes a correction component $T_{a2}*$ for the basic assist component $T_{a1}*$ so as to eliminate the deviation.

The adder 165 adds the correction component $T_{a2}*$ to the basic assist component $T_{a1}*$ to compute an assist command value $T_{a2}*$. The assist command value $T_a*$ is a command value that indicates a rotational force (assist torque) to be generated by the assist motor 151.

The energization control circuit 166 supplies electric power that matches the assist command value $T_a*$ to the assist motor 151. Specifically, the energization control circuit 166 computes a current command value for the assist motor 151 on the basis of the assist command value $T_a*$. In addition, the energization control circuit 166 retrieves the current value $I_m$, which is detected through the current sensor 167. Then, the energization control circuit 166 calculates a deviation between the current command value and the actual current value $I_m$, and controls power supply to the assist motor 151 so as to eliminate the deviation. Consequently, the assist motor 151 generates torque that matches the assist command value $T_a*$. As a result, steering assist that matches the steering state is performed.

With the EPS 150, the target pinion angle $\theta_p*$ is set from the basic drive torque (the total sum of the basic assist component $T_{a1}*$ and the steering torque $T_h$) on the basis of the ideal model, and feedback control is performed such that the actual pinion angle $\theta_p$ coincides with the target pinion angle $\theta_p*$. As discussed earlier, there is a correlation between the pinion angle $\theta_p$ and the steered angle θt of the steered wheels 16. Therefore, steering operation of the steered wheels 16 that matches the basic drive torque is also determined by the ideal model. That is, the steering feel of the vehicle is decided by the ideal model. Thus, a desired steering feel can be achieved by adjusting the ideal model.

In addition, the actual steered angle θt is maintained at a steered angle θt that matches the target pinion angle $\theta_p*$. Therefore, it is possible to obtain the effect in suppressing reverse input vibration generated due to disturbance such as a road surface state or braking. That is, the correction component $T_{a2}*$ is adjusted such that the pinion angle $\theta_p$ is brought to the target pinion angle $\theta_p*$ even in the case where vibration is transferred to the steering mechanism such as the steering shaft 12 via the steered wheels 16. Therefore, the actual steered angle θt is maintained at a steered angle θt that matches the target pinion angle $\theta_p*$ which is prescribed by the ideal model. As a result, a steering assist is performed in the direction of canceling out reverse input vibration to suppress transmission of the reverse input vibration to the steering wheel 11.

However, a steering reaction force (a response felt through steering), which is a force (torque) that acts in a direction opposite to the direction of steering by the driver, only matches the target pinion angle $\theta_p*$. That is, the steering reaction force is not varied in some road surface states such as a dry road and a low-friction road, for example, and therefore it is difficult for the driver to grasp the road surface state as a response.

Thus, in the present example, the target pinion angle computation circuit 163 is provided with the computation function of the target steering angle computation circuit 52 in the first embodiment described earlier, for example.

The target pinion angle computation circuit 163 has the same functional configuration as that of the target steering angle computation circuit 52 illustrated in FIG. 3 described earlier. In contrast to the target steering angle computation circuit 52 described earlier which retrieves the target steering reaction force $T_1*$, the target pinion angle computation circuit 163 according to the present example retrieves the basic assist component $T_{a1}*$. In contrast to the target steering angle computation circuit 52 described earlier which retrieves the current value $I_b$ of the current to be supplied to the steering motor 41, in addition, the target pinion angle computation circuit 163 according to the present example retrieves the current value $I_m$ of the current to be supplied to the assist motor 151. The target pinion angle computation circuit 163 is the same as the target steering angle computation circuit 52 described earlier in that it retrieves the steering torque $T_h$ and the vehicle speed V. In contrast to the target steering angle computation circuit 52 described earlier which computes the target steering angle θ*, in addition, the target pinion angle computation circuit 163 according to the present example computes the target pinion angle $\theta_p*$. Except for a part of the signals to be retrieved and the signal to be generated, the content of the internal computation process performed by the target pinion angle computation circuit 163 is the same as that for the target steering angle computation circuit 52 described earlier. It should be noted, however, that the estimated axial force computation circuit 80 (see FIG. 4) in the vehicle model 72 performs the various compensation processes and the filtering process on a value obtained by adding the steering torque $T_h$ to the axial force F1, which is computed by the axial force computation circuit 81.

Thus, according to the present embodiment, the same effect as that of the first embodiment described earlier can be obtained. That is, unwanted components (friction, efficiency, viscosity, inertia, and transfer function for control) superimposed on the axial force F1 are removed through the various compensation processes (friction compensation, efficiency compensation, and gradient compensation) and the filtering process which is performed by the filter 85 on the axial force F1, which is computed by the axial force computation circuit 81. Therefore, the axial force $F1_e$ which reflects the road surface state more appropriately via the steered wheels 16 can be computed. When the appropriate axial force $F1_e$ is used as the spring component $T_{sp}^*$ of the basic drive torque $T_{in}^*$, the target pinion angle $\theta_p^*$, and hence the correction component $T_{a2}^*$ which is computed by the pinion angle feedback control circuit 164, better reflect the road surface state (such as road surface frictional resistance). Thus, a more appropriate steering reaction force that matches the road surface state is applied to the steering wheel 11. The driver can grasp the road surface state more adequately by feeling the steering reaction force which is applied to the steering wheel 11 as a response.

The eighth embodiment may also be implemented in the following modified forms.

In the present example, the basic assist component computation circuit 162 calculates the basic assist component $T_{a1}^*$ on the basis of the steering torque $T_h$ and the vehicle speed V. However, the basic assist component $T_{a1}^*$ may be calculated on the basis of only the steering torque $T_h$.

In the present example, in addition, the target pinion angle computation circuit 163 may be provided with the computation function of the target steering angle computation circuit 52 according to the second to fourth embodiments described earlier. Also in this way, effects equivalent to those of the second to fourth embodiments can be obtained.

In addition, the fifth to seventh embodiments described earlier may be applied to the present example. In this case, the configuration of a portion around the pinion angle feedback control circuit 164 illustrated in FIG. 32 is equivalent to that illustrated in FIGS. 24A, 24B, 26, 27, and 28 described earlier. That is, the pinion angle feedback control circuit 164 according to the present example may be substituted for one of the pinion angle feedback control circuits 64 in FIGS. 24A, 24B, 26, 27, and 28 to be incorporated into FIG. 32.

In this way, the drop in the gain G with respect to the frequency f of the pinion angle feedback control circuit 164 due to the pneumatic pressure of the tires or the vehicle speed V is suppressed. Therefore, feedback control for the pinion angle $\theta_p$ is executed more appropriately while being affected by the pneumatic pressure of the tires etc. In addition, the response to operations of the steering wheel 11 is secured, and therefore so-called steering delay is also suppressed.

In the present example, further, the EPS (electric power steering device) 150 which applies a steering assist force to the steered shaft 14 is used. However, an EPS that applies a steering assist force to the steering shaft may also be used. Such an example will be specifically described below.

As illustrated by the long dashed double-short dashed line in FIG. 31, the assist motor 151 is coupled to the steering shaft 12, rather than to the steered shaft 14, via the speed reduction mechanism 152. The pinion shaft 44 may be omitted. In this case, the control device 154 executes feedback control for the steering angle $\theta_s$, rather than feedback control for the pinion angle $\theta_p$.

That is, as given in the parentheses in FIG. 32, the pinion angle computation circuit 161 functions as a steering angle computation circuit that computes the steering angle $\theta_s$ on the basis of the current value $I_m$ of the assist motor 151. The target pinion angle computation circuit 163 functions as a target steering angle computation circuit that computes a target steering angle, which is a target value for the steering angle $\theta_s$, on the basis of the steering torque $T_h$, the vehicle speed V, the basic assist component $T_{a1}^*$, and the current value $I_m$. The target steering angle computation circuit basically has the same configuration as that of the target steering angle computation circuit 52 illustrated in FIG. 3 described earlier. It should be noted, however, that the differentiator 79 which is provided in the control device 154 differentiates the steering angle $\theta_s$ to compute the steering speed $\omega_s$. The pinion angle feedback control circuit 164 functions as a steering angle feedback control circuit that calculates a deviation between the target steering angle and the actual steering angle $\theta_s$, and that computes a correction component $T_{a2}^*$ for the basic assist component $T_{a1}^*$ so as to eliminate the deviation.

As illustrated by the long dashed double-short dashed line in FIG. 31, the EPS 150 which applies a steering assist force to the steering shaft 12 is occasionally provided with a variable-gear-ratio (VGR) mechanism 170. In order to improve the steering performance, the VGR mechanism 170 includes a VGR motor 171 provided in the steering shaft 12 (between the steering wheel 11 and the torque sensor 34), and varies the ratio (gear ratio) between the steering angle $\theta_s$ and the steered angle θt using the VGR motor 171. A stator 171a of the VGR motor 171 is coupled to an input shaft 12a, which is a portion of the steering shaft 12 on the steering wheel 11 side. A rotor 171b of the VGR motor 171 is coupled to an output shaft 12b, which is a portion of the steering shaft 12 on the pinion shaft 13 side.

When the steering wheel 11 is rotated, the stator 171a of the VGR motor 171 is rotated by the same amount as the steering wheel 11. In addition, the control device 154 rotates the rotor 171b of the VGR motor 171 in accordance with rotation of the steering wheel 11 and the vehicle speed V. Therefore, a rotational angle $\theta_{sg}$ of the output shaft 12b relative to the input shaft 12a is represented by the following formula (11).

$$\theta_{sg} = \theta_s + \theta_g \quad (11)$$

In the formula, $\theta_s$ is the steering angle, and $\theta_g$ is the rotational angle of the VGR motor. Thus, a desired gear ratio can be achieved by controlling the rotational angle $\theta_g$ of the VGR motor 171.

As given in the parentheses in FIG. 32, the target pinion angle computation circuit 163, which serves as a target steering angle computation circuit, computes a target value for the total value of the steering angle $\theta_s$ and the rotational angle $\theta_g$ of the VGR motor 171, that is, the rotational angle $\theta_{sg}$ of the output shaft 12b relative to the input shaft 12a. In addition, the target steering angle computation circuit computes a target value for the rotational angle $\theta_{sg}$ using the total value of the steering speed $\omega_s$ and the rotational speed of the VGR motor 171. The pinion angle feedback control circuit 164, which serves as a steering angle feedback control circuit, functions to calculate a deviation between a target value for the rotational angle $\theta_{sg}$ and the actual rotational angle $\theta_{sg}$, and to compute a correction component $T_{a2}^*$ for the basic assist component $T_{a1}^*$ so as to eliminate the deviation.

Next, a vehicle control device according to a ninth embodiment will be described. The present example differs from the fourth embodiment in the configuration of the axial force allocation computation circuit.

Figure 33:
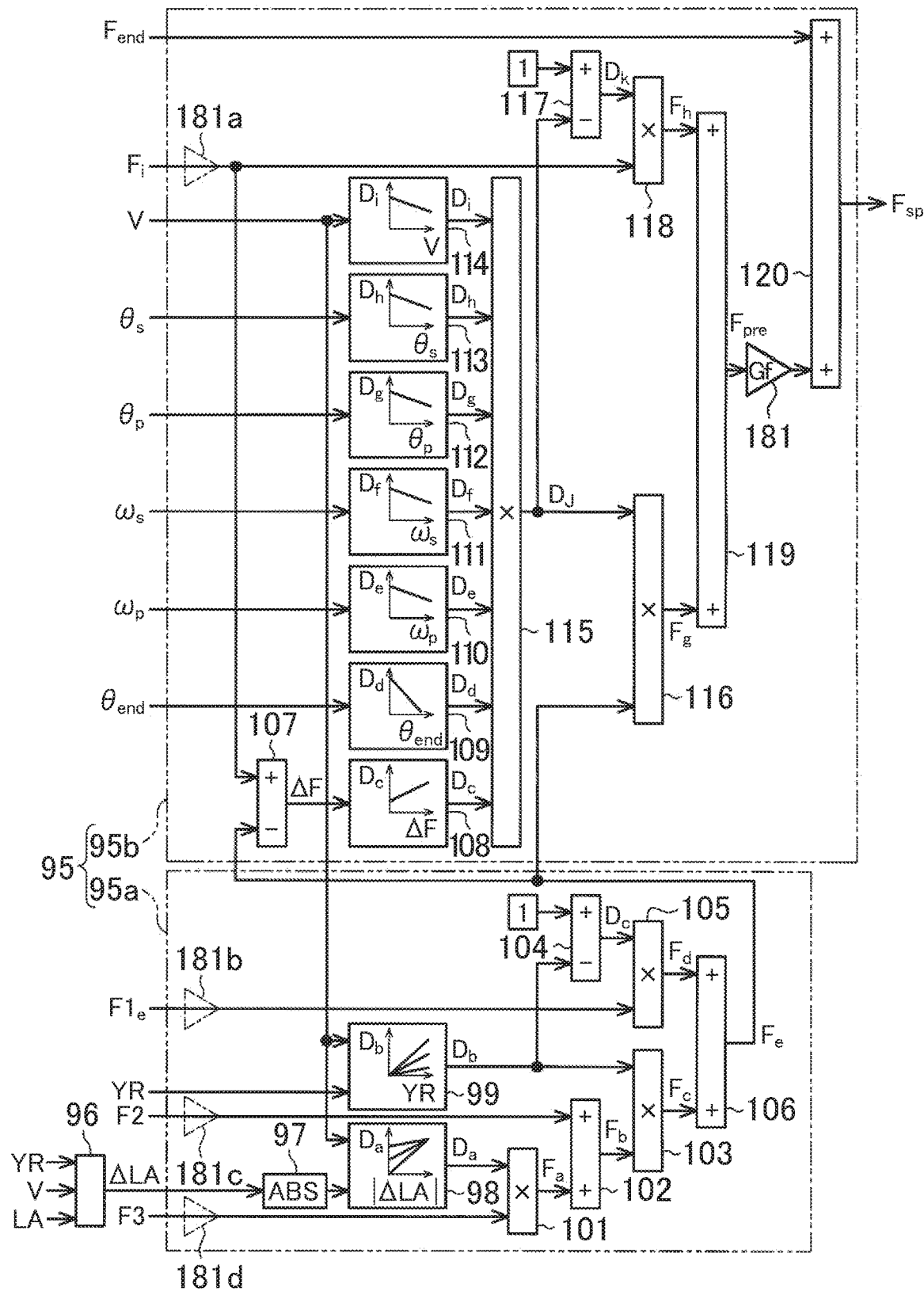
FIG. 33 is a control block diagram of an axial force allocation computation circuit according to the ninth embodiment.

As illustrated in FIG. 33, the axial force allocation computation circuit 95 has an axial force amplification unit 181. The axial force amplification unit 181 multiplies the axial force $F_{pre}$, which is computed by the adder 119, by a gain Gf to amplify the axial force $F_{pre}$. It should be noted, however, that the gain Gf is set to a value that is more than 1. With the road surface state reflected in the axial force $F_{pre}$, and with the amplified axial force $F_{pre}$ reflected in the basic drive torque $T_{in}^*$, a steering reaction force that matches the road surface state is applied to the steering wheel 11 in an amplified manner. Thus, the road surface state can be transmitted to the driver as a steering reaction force more appropriately.

Figure 34:
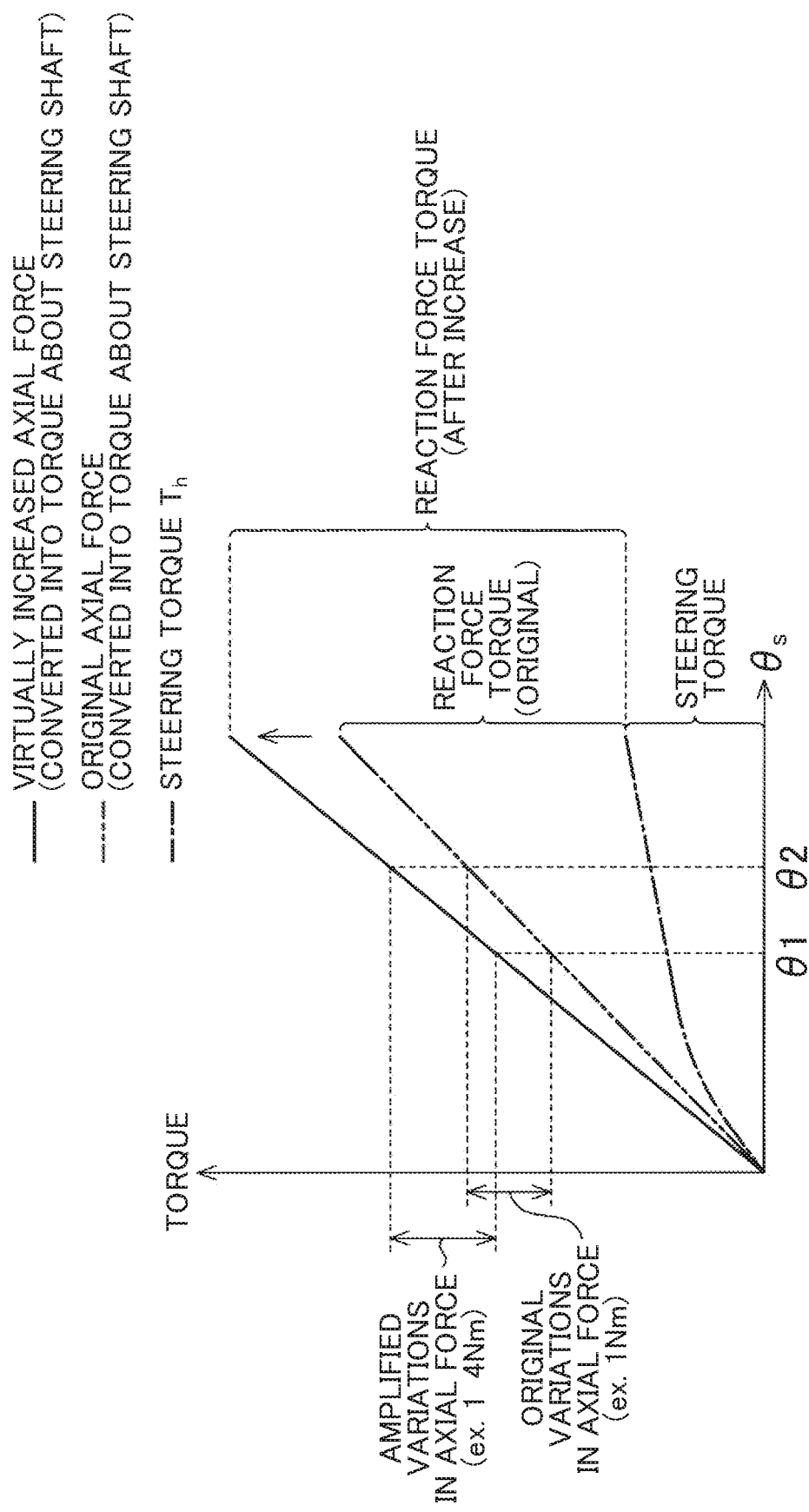
FIG. 34 is a graph illustrating the relationship between the steering angle and the axial force according to the ninth embodiment.

As indicated by the long dashed short dashed line in the graph of FIG. 34, when the steering angle $\theta_s$ and torque about the steering shaft 12 are defined on the horizontal axis and the vertical axis, respectively, the steering torque $T_h$ is gently increased along with an increase in the steering angle $\theta_s$ (absolute value). As indicated by the long dashed double-short dashed line in the graph of FIG. 34, in addition, the original axial force $F_{pre}$, which is computed by the adder 119, and the steering angle $\theta_s$ are proportional to each other. That is, the original axial force $F_{pre}$ has a larger value as the steering angle $\theta_s$ is increased.

The steering device 10 operates with the sum value of the steering torque $T_h$ and reaction force torque (torque in a direction opposite to the steering direction) from the reaction force motor 31 balanced with an axial force that acts on the steered shaft 14. When the axial force is varied, the sum value of the steering torque $T_h$ and the reaction force torque is also varied. The variations in the sum value are transmitted to the driver as road surface information. For example, in the case where the vehicle travels on a low-friction road, the axial force is decreased along with a reduction in the grip of the tires on the road surface. The sum value of the steering torque $T_h$ and the reaction force torque is also decreased in accordance with the decrease in the axial force. The decrease in the sum value which matches the road surface state (the grip of the tires on the road surface) is transmitted to the driver as a response.

In the present example, the axial force $F_{pre}$ ($F_{sp}$) is multiplied by the gain Gf. Consequently, the axial force $F_{pre}$ is amplified from the original value, which is indicated by the long dashed double-short dashed line in the graph of FIG. 34, to a value indicated by the continuous line in the graph of FIG. 34, for example. In addition, as indicated by the long dashed short dashed line in the graph of FIG. 34, the tendency of variation in the steering torque $T_h$ with respect to variations in the steering angle $\theta_s$ is the same as the case where the axial force $F_{pre}$ is not amplified. Therefore, reaction force torque with a larger value is required in the case where the axial force $F_{pre}$ is amplified than the case where the axial force $F_{pre}$ is not amplified. With the reaction force torque having a larger value that matches an increase in the axial force $F_{pre}$, the sum value of the steering torque $T_h$ and the reaction force torque is balanced with the axial force $F_{pre}$ which is virtually increased with the tendency of variation in the steering torque $T_h$ with respect to variations in the steering angle $\theta_s$ remaining unchanged.

Next, the relationship between the amount of variation in the axial force and the amount of variation in the sum value (steering torque $T_h$+reaction force torque) will be described. The gain Gf is set to 1.4, for example. In the case where the axial force $F_{pre}$ which is computed by the adder 119 is not amplified as indicated by the long dashed double-short dashed line in the graph of FIG. 34, the sum value of the steering torque $T_h$ and the reaction force torque is decreased by 1 Nm when the original axial force $F_{pre}$ is reduced by 1 Nm due to a decrease in the steering angle $\theta_s$ (absolute value) from a steering angle $\theta 2$ to a steering angle $\theta 1$.

In the case where the axial force $F_{pre}$ which is computed by the adder 119 is amplified as indicated by the continuous line in the graph of FIG. 34, in contrast, the axial force $F_{pre}$ after amplification is reduced by 1.4 Nm when the original axial force $F_{pre}$ is reduced by 1 Nm due to a decrease in the steering angle $\theta_s$ from the steering angle $\theta 2$ to the steering angle $\theta 1$. Therefore, the sum value of the steering torque $T_h$ and the reaction force torque is also decreased by 1.4 Nm.

This also applies to the relationship between the amount of variation in the axial force $F_{pre}$ and the amount of variation in the sum value (steering torque $T_h$+reaction force torque) due to a reduction in the grip of the tires on the road surface for a case where the vehicle is traveling on a low-friction road. Thus, a decrease in the sum value (steering torque $T_h$+reaction force torque) that matches the road surface state (a reduction in the grip of the tires on the road surface) is transmitted to the driver as a response in an amplified manner.

Next, the relationship between the steering angle $\theta_s$ and the steering torque $T_h$ in a state (grip loss) in which the grip of the tires on the road surface is lost will be described with reference to the graph of FIG. 35. A case where the steering wheel 11 is turned by an angle $\theta 3$ (e.g. 200 degrees) with reference to the neutral position while the vehicle is traveling at a constant vehicle speed (e.g. 40 km/h), for example, is assumed.

The tendency of variation in the steering torque $T_h$ with respect to variations in the steering angle $\theta_s$ is generally the same as a whole between the case where the axial force $F_{pre}$ is amplified and the case where the axial force $F_{pre}$ is not amplified. In the graph of FIG. 35, variations in the steering torque $T_h$ for a case where the axial force $F_{pre}$ is amplified are indicated by the continuous line, and the tendency of variation in the steering torque $T_h$ for a case where the axial force $F_{pre}$ is not amplified is indicated by the long dashed short dashed line.

Figure 35:
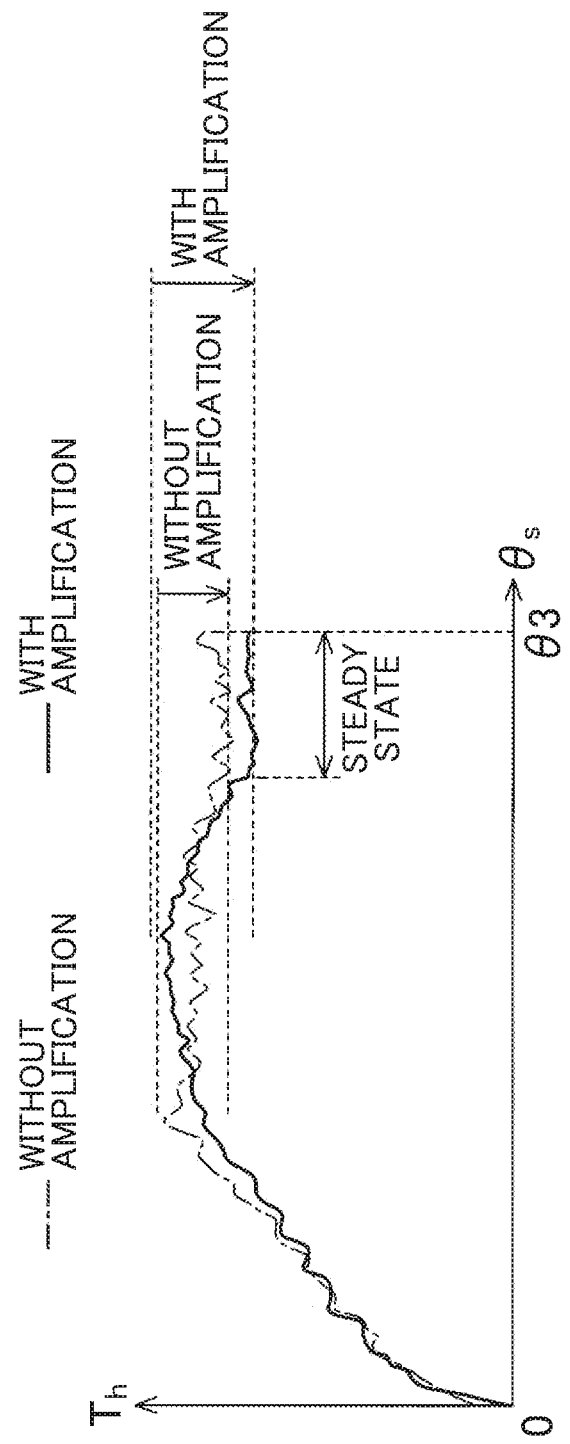
FIG. 35 is a graph illustrating variations in the steering torque that accompany variations in the steering angle according to the ninth embodiment.

As indicated in the graph of FIG. 35, the steering torque $T_h$ is increased as the steering angle $\theta_s$ is increased along with the start of the turning operation. When the steering angle $\theta_s$ is further increased, the steering torque $T_h$ is decreased as the steering angle $\theta_s$ is increased, and a steady state in which the steering torque $T_h$ is generally constant even if the steering angle $\theta_s$ is increased is reached. This is considered to be due to a reduction in the grip of the tires on the road surface. In the steady state, the steering torque $T_h$ for a case where the axial force $F_{pre}$ is amplified is smaller than the steering torque $T_h$ for a case where the axial force $F_{pre}$ is not amplified. The driver obtains a lighter steering feel when the steering torque $T_h$ is smaller. Consequently, the driver can feel a reduction in the grip of the tires on the road surface more clearly as a response.

The ninth embodiment may also be implemented in the following modified forms.

Instead of providing the axial force amplification unit 181 in the computation path between the adder 119 and the adder 120, axial force amplification units 181a, 181b, 181c, and

Figure 36:
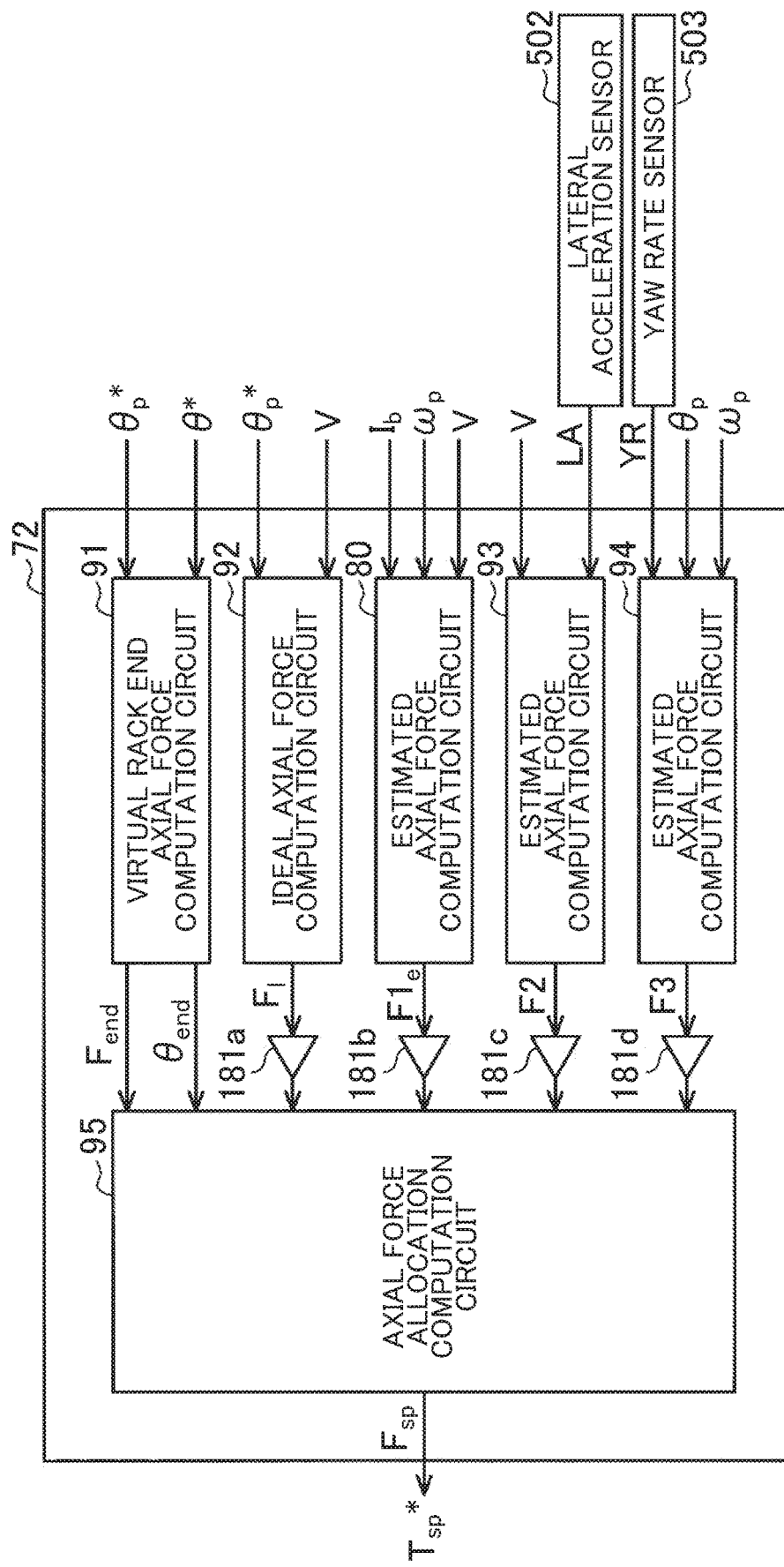
FIG. 36 is a control block diagram of a vehicle model according to a modification of the ninth embodiment.

181*d* may be provided in the four paths for retrieving the ideal axial force $F_1$ and the estimated and computed axial forces $F1_e$, F2, and F3, respectively, in the axial force allocation computation circuit 95, for example, as indicated by the long dashed double-short dashed line in FIG. 33. Meanwhile, as illustrated in FIG. 36, axial force amplification units 181*a*, 181*b*, 181*c*, and 181*d* may be provided in the computation paths between the four axial force computation circuits (92, 80, 93, 94), respectively, and the axial force allocation computation circuit 95 in the vehicle model 72. It should be noted, however, that all the gains Gf used in the axial force amplification units 181*a* to 181*d* are preferably set to the same value.

Figure 37A:
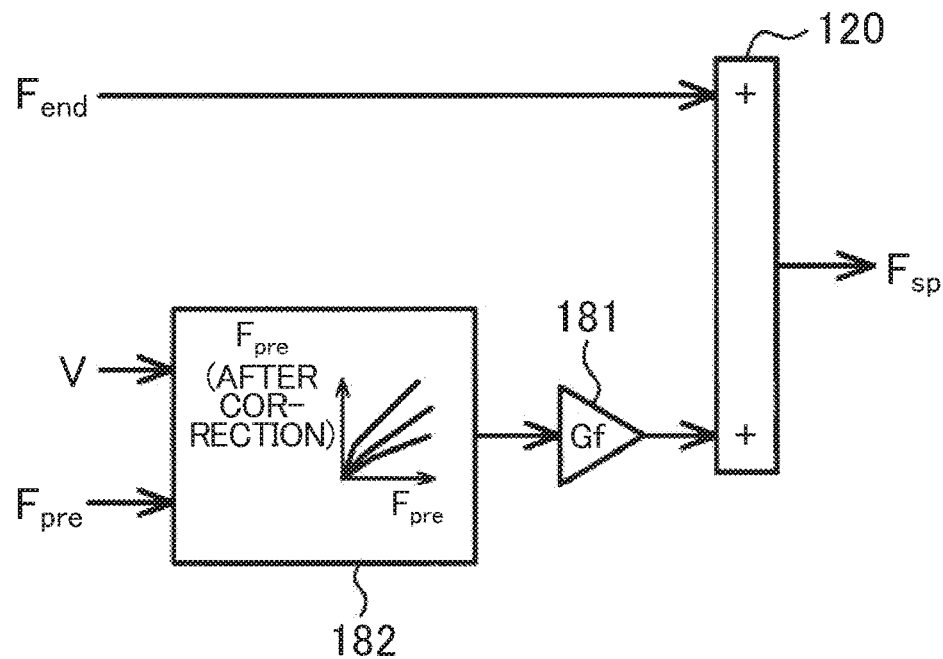
FIGS. 37A and 37B are each a control block diagram illustrating a portion around a correction computation circuit according to a modification of the ninth embodiment.

As illustrated in FIG. 37A, the axial force allocation computation circuit 95 may be configured to have a correction computation circuit 182 that corrects the axial force $F_{pre}$, which is computed by the adder 119, in accordance with the vehicle speed V. The correction computation circuit 182 computes the axial force $F_{pre}$ after correction using a map that prescribes the relationship between the axial force $F_{pre}$, which is computed by the adder 119, and the axial force $F_{pre}$ after correction in accordance with the vehicle speed V. In this case, the axial force amplification unit 181 is provided in the computation path between the correction computation circuit 182 and the adder 120.

Figure 37B:
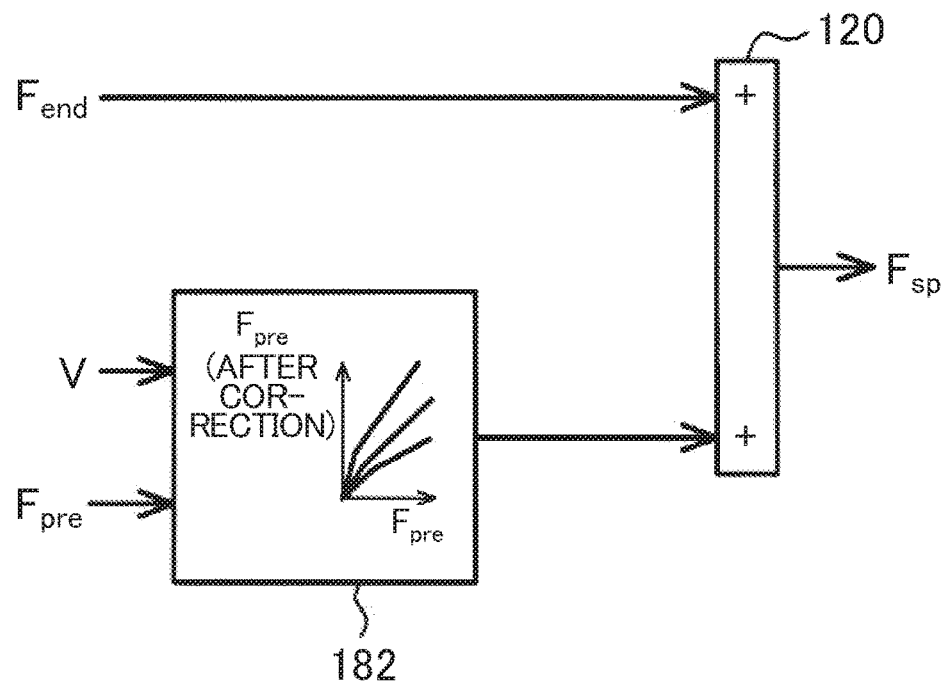

Meanwhile, as illustrated in FIG. 37B, in the case where the axial force allocation computation circuit 95 has the correction computation circuit 182, the map which is used by the correction computation circuit 182 may be set such that the axial force $F_{pre}$ after correction already has a value of the original axial force $F_{pre}$ after correction times the gain Gf. For example, when the axial force $F_{pre}$ after correction, which is computed by the correction computation circuit 182 illustrated in FIG. 37A, is replaced with an axial force X1 and the axial force $F_{pre}$ after correction, which is computed by the correction computation circuit 182 illustrated in FIG. 37B, is replaced with an axial force X2, the relationship between the axial forces X1 and X2 is represented by the following formula (12). It this way, the axial force allocation computation circuit 95 may be configured not to include the axial force amplification unit 181.

$$X2 = X1 \times Gf \quad (12)$$

Figure 38:
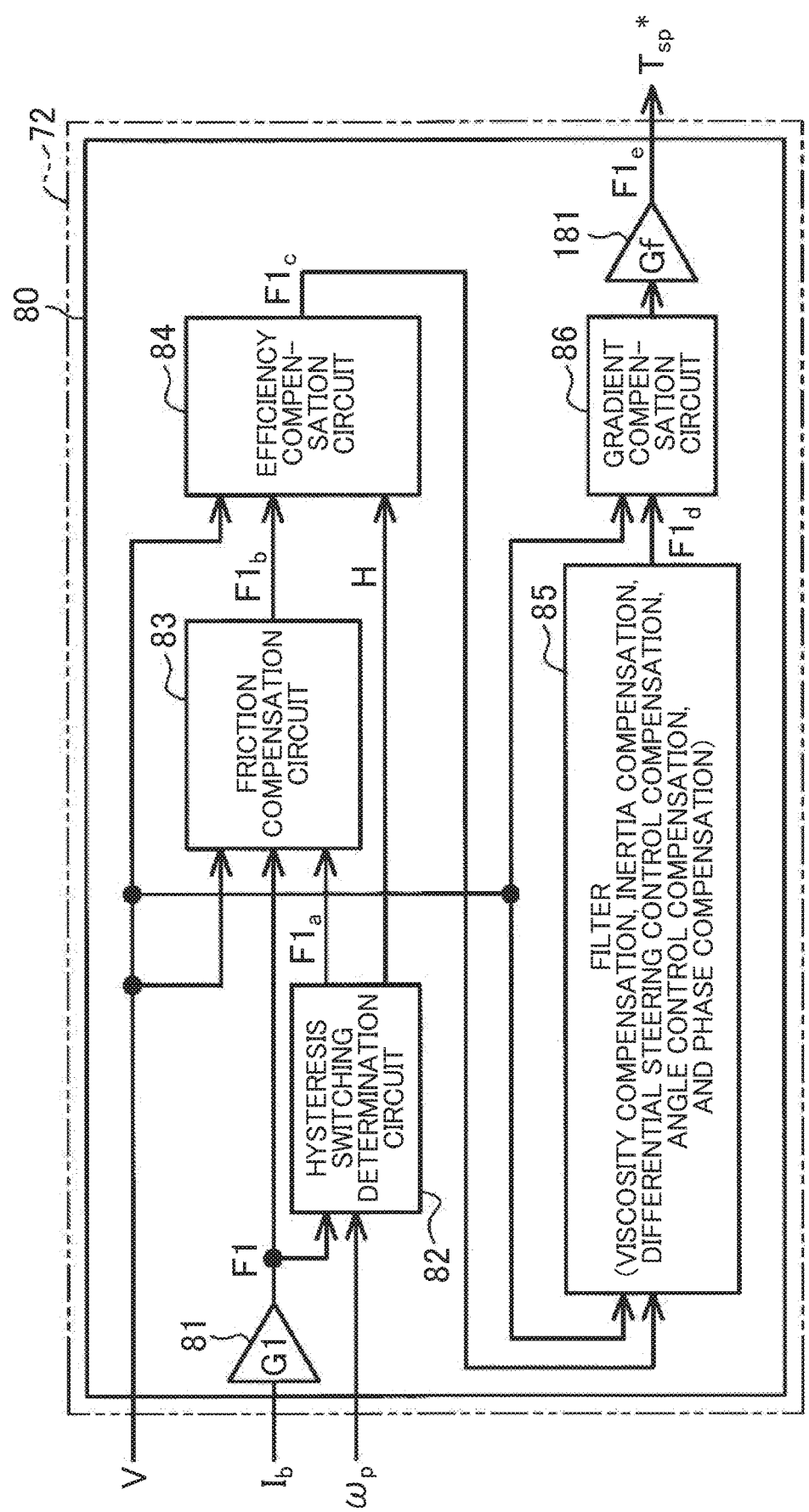
FIG. 38 is a control block diagram of a vehicle model (estimated axial force computation circuit) according to a modification of the ninth embodiment.

The present embodiment may be applied to the first to third embodiments described earlier. For example, in the case where the present embodiment is applied to the first embodiment, as illustrated in FIG. 38, the estimated axial force computation circuit 80 is provided with the axial force amplification unit 181 in the output path for the axial force $F1_e$ after gradient compensation, which is computed by the gradient compensation circuit 86. The same also applies to the case where the present embodiment is applied to the second and third embodiments.

Next, a vehicle control device according to a tenth embodiment will be described. The present example differs from the fourth embodiment in the configuration of the axial force allocation computation circuit.

Figure 39:
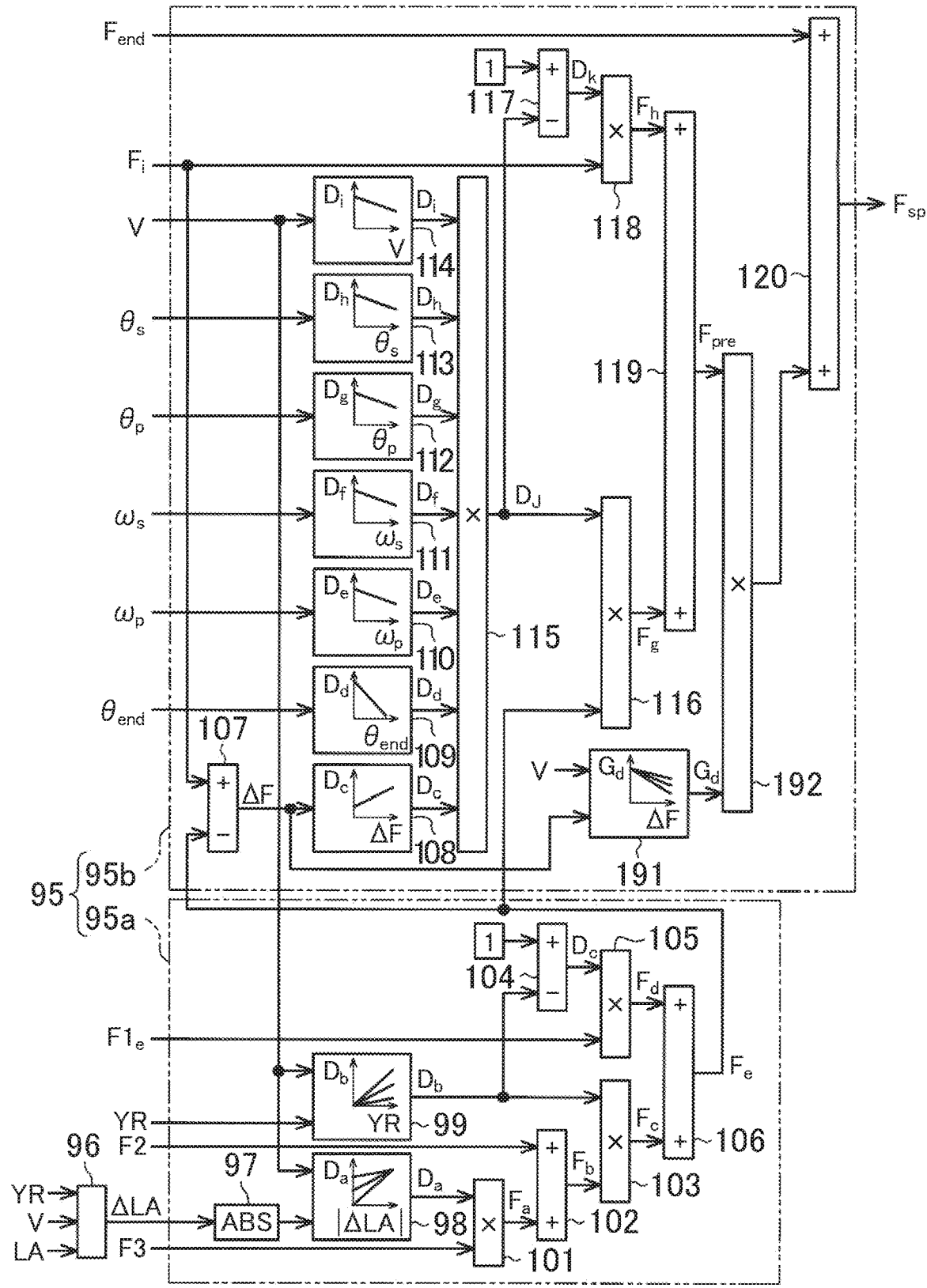
FIG. 39 is a control block diagram of an axial force allocation computation circuit according to a tenth embodiment.

As illustrated in FIG. 39, the axial force allocation computation circuit 95 has a gain computation circuit 191 and a multiplier 192. The gain computation circuit 191 retrieves the vehicle speed V, which is detected through the vehicle speed sensor 501, and the axial force deviation ΔF, which is computed by the subtractor 107. The axial force deviation ΔF is the difference between the ideal axial force $F_i$, which is based on the target pinion angle $\theta_p^*$, and the estimated axial force $F_e$, which is computed by the adder 106. The gain computation circuit 191 computes a gain $G_d$ using a map that prescribes the relationship between the axial force deviation ΔF and the gain $G_d$ in accordance with the vehicle speed V. The gain $G_d$ is set to have a smaller value as the axial force deviation ΔF is increased.

The multiplier 192 multiplies the axial force $F_{pre}$, which is computed by the adder 119, by the gain $G_d$, which is computed by the gain computation circuit 191, to compute the final axial force $F_{pre}$. When the vehicle is traveling on a low-friction road such as a wet road surface or a snow-covered road, for example, the axial force deviation ΔF between the ideal axial force $F_1$ and the estimated axial force $F_e$ tends to be caused. This is for the following reason. That is, the ideal axial force $F_1$ is computed on the basis of the target pinion angle $\theta_p$, and therefore the ideal axial force $F_1$ is unlikely to reflect the road surface state. In contrast, the estimated axial force $F_e$ is computed on the basis of various state amounts, and therefore the estimated axial force $F_e$ tends to reflect the road surface state. Therefore, while the ideal axial force $F_1$ has only a value that matches the target pinion angle $\theta_p^*$ irrespective of the grip state of the tires, the estimated axial force $F_e$ is decreased in accordance with a reduction in the grip on the road surface. Thus, the difference between the ideal axial force $F_1$ and the estimated axial force $F_e$ becomes larger as the grip on the road surface is reduced. In this way, the axial force deviation ΔF reflects the road surface state.

Thus, according to the present embodiment, the following effect can be obtained. That is, the axial force $F_{pre}$ is virtually changed in accordance with the axial force deviation ΔF between the ideal axial force $F_1$ and the estimated axial force $F_e$. For example, the axial force $F_{pre}$ which is allocated and computed is changed to a smaller value as the axial force deviation ΔF becomes larger. With the axial force $F_{pre}$, which has been changed in accordance with the axial force deviation ΔF, reflected in the basic drive torque $T_{in}^*$, a steering reaction force that better reflects the road surface state is applied to the steering wheel 11. Further improved performance to transfer the road surface state (road surface information) enables the road surface state to be transmitted to the driver as a steering reaction force more appropriately.

The tenth embodiment may also be implemented in the following modified forms.

In the present embodiment, the gain computation circuit 191 computes the gain $G_d$ using the axial force deviation ΔF between the ideal axial force $F_i$ and the estimated axial force $F_e$. However, one of (A) to (D) below may be used in place of the estimated axial force $F_e$.

(A) The axial force $F1_e$ after gradient compensation, which is computed by the estimated axial force computation circuit 80. The axial force $F1_e$ is based on the current value $I_b$ of the steering motor 41.

(B) The axial force F2, which is estimated and computed by the estimated axial force computation circuit 93. The axial force F2 is based on the lateral acceleration LA.

(C) The axial force F3, which is estimated and computed by the estimated axial force computation circuit 94. The axial force F3 is based on the yaw rate YR.

(D) The axial force $F_c$, which is computed by the multiplier 103. The axial force $F_c$ is obtained by summing up the axial forces F2 and F3 at predetermined distribution ratios.

Figure 40:
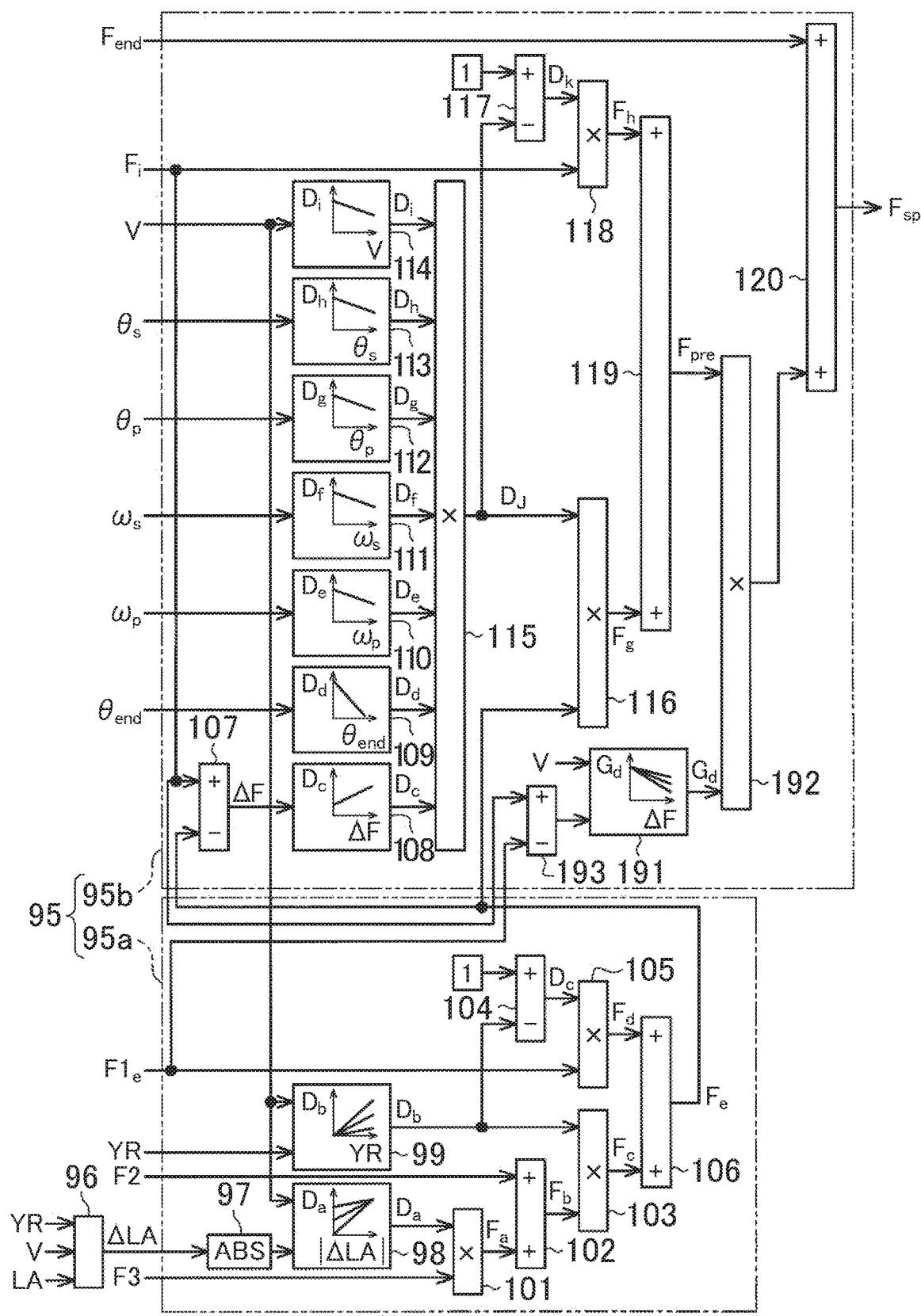
FIG. 40 is a control block diagram of an axial force allocation computation circuit according to a modification of the tenth embodiment.

In this case, as illustrated in FIG. 40, the axial force allocation computation circuit 95 is further provided with a subtractor 193. In the case where the axial force $F1_e$ after gradient compensation is used, for example, the subtractor 193 subtracts the axial force $F1_e$ after gradient compensation from the ideal axial force $F_c$ to compute the axial force deviation ΔF. The same also applies to the case where the axial force F2, the axial force F3, or the axial force $F_c$ is used.

Depending on the product specifications, the increase/decrease characteristics of the gain $G_d$ with respect to the axial force deviation ΔF in the map which is used by the gain computation circuit 191 may be reversed. That is, the gain computation circuit 191 computes the gain $G_d$ with a larger value as the axial force deviation ΔF is increased.

Depending on the product specifications, the map which is used by the gain computation circuit 191 may not take the vehicle speed V into consideration. As illustrated in FIGS. 37A and 37B, the axial force allocation computation circuit 95 may be configured to have a correction computation circuit 182 that corrects the axial force $F_{pre}$, which is computed by the adder 119, in accordance with the vehicle speed V. In the case where this configuration is adopted, in addition, the map which is used by the gain computation circuit 191 and the map which is used by the correction computation circuit 182 may be integrated with each other.

Each of the embodiments may also be implemented in the following modified forms. In the first to eighth embodiments, the torque sensor 34 is provided to the steering shaft 12. However, the torque sensor 34 may be provided to the pinion shaft 13. The torque sensor 34 may be installed at any location as long as the steering torque $T_h$ can be detected. The same also applies to the ninth and tenth embodiments.

In the first to seventh embodiments, the steering device 10 of the steer-by-wire type may be configured not to include the clutch 21. The same also applies to the ninth and tenth embodiments.

In the first to fourth embodiments, the control device 50 may be configured not to include the differential steering control circuit 63. In this case, the pinion angle feedback control circuit 64 retrieves the target pinion angle $θ_p$*, which is computed by the steering angle ratio change control circuit 62, and executes feedback control for the pinion angle $θ_p$ such that the actual pinion angle $θ_p$ follows the retrieved target pinion angle $θ_p$*. The same also applies to the ninth and tenth embodiments.

In the first to fourth embodiments, the control device 50 may be configured not to include either the differential steering control circuit 63 or the steering angle ratio change control circuit 62. In this case, the target steering angle θ*, which is computed by the target steering angle computation circuit 52, is used, as it is, as the target pinion angle ($θ_p$*). That is, the steered wheels 16 are steered by an amount corresponding to an operation of the steering wheel 11. The same also applies to the ninth and tenth embodiments.

What is claimed is:

1. A vehicle control device that controls a motor that serves as a generation source for a drive force to be applied to a steering mechanism of a vehicle on the basis of a command value computed in accordance with a steering state, comprising:
   a first computation circuit that computes a first component of the command value in accordance with at least a steering torque;
   a second computation circuit that computes a target rotational angle for a rotary body that rotates in conjunction with steering operation of steered wheels on the basis of a basic drive torque which is a total sum of the steering torque and the first component; and
   a third computation circuit that computes a second component of the command value through feedback control for causing an actual rotational angle of the rotary body to coincide with the target rotational angle, wherein:
   the second computation circuit includes:
      an estimated axial force computation circuit that computes an axial force from a source external to the vehicle that acts on the steered wheels on the basis of a current value of the motor, and
      at least one of a dynamic characteristic computation circuit and a static characteristic computation circuit, the dynamic characteristic computation circuit that compensates for an effect of dynamic characteristics of the steering mechanism on the axial force, which is computed by the estimated axial force computation circuit, and the static characteristic computation circuit that compensates for an effect of static characteristics of the steering mechanism on the axial force, which is computed by the estimated axial force computation circuit;
   the second computation circuit computes the target rotational angle with the basic drive torque reflecting the axial force, which has been compensated for by the at least one of the dynamic characteristic computation circuit and the static characteristic computation circuit, as a reaction force component for the basic drive torque;
   the second computation circuit has at least the dynamic characteristic computation circuit, among the dynamic characteristic computation circuit and the static characteristic computation circuit, on a precondition that the second computation circuit has the estimated axial force computation circuit;
   the dynamic characteristic computation circuit compensates for at least one of an inertia of the motor, a viscosity of the motor, and a transfer function of a control element including the feedback control, which is executed by the third computation circuit, as the dynamic characteristics;
   the dynamic characteristic computation circuit is a filter; and
   a transfer function of the filter is set on the basis of a value obtained by multiplying an inverse transfer function of the motor and an inverse transfer function of the control element.

2. The vehicle control device according to claim 1, wherein:
   the second computation circuit has an axial force amplification unit that amplifies the axial force.

3. The vehicle control device according to claim 1, wherein:
   the steering mechanism includes a pinion shaft that serves as the rotary body which is mechanically decoupled from a steering wheel, and a steered shaft that steers the steered wheels in conjunction with rotation of the pinion shaft;
   the vehicle control device includes, as control targets, a reaction force motor that generates a steering reaction force which is torque in a direction opposite to a steering direction as the drive force to be applied to the steering wheel on the basis of the command value, and a steering motor that generates a steering force for steering the steered wheels to be applied to the pinion shaft or the steered shaft; and
   the estimated axial force computation circuit computes the axial force on the basis of a current value of the steering motor.

4. The vehicle control device according to claim 3, further comprising:
   a fourth computation circuit that computes a command value for the steering motor through feedback control for causing an actual rotational angle of the pinion shaft to coincide with a target pinion angle computed on the basis of the target rotational angle;

a band-pass filter that performs a filtering process on the target pinion angle;

a conversion unit that converts the target pinion angle, which has been subjected to the filtering process which is performed by the band-pass filter, into the command value; and an adder that adds the command value, which is obtained as a result of conversion performed by the conversion unit, and the command value, which is computed by the fourth computation circuit, to compute a final command value for the steering motor, wherein the band-pass filter has frequency characteristics opposite to those of the fourth computation circuit.

5. The vehicle control device according to claim 3, further comprising:

a fourth computation circuit that computes a command value for the steering motor through feedback control for causing an actual rotational angle of the pinion shaft to coincide with a target pinion angle computed on the basis of the target rotational angle;

a band-pass filter that performs a filtering process on the target pinion angle; and an adder that adds the target pinion angle, which is computed on the basis of the target rotational angle, and the target pinion angle, which has been subjected to the filtering process which is performed by the band-pass filter, to compute a final target pinion angle, wherein the band-pass filter has frequency characteristics opposite to those of the fourth computation circuit.

6. The vehicle control device according to claim 3, further comprising:

a fourth computation circuit that computes a command value for the steering motor through feedback control for causing an actual rotational angle of the pinion shaft to coincide with a target pinion angle computed on the basis of the target rotational angle, wherein the fourth computation circuit changes at least one of a proportional gain, an integral gain, and a differential gain, which are control parameters, in accordance with a vehicle speed or a pneumatic pressure of tires to compensate for an effect of the vehicle speed or the pneumatic pressure of the tires on the command value for the steering motor.

7. The vehicle control device according to claim 1, wherein:

the steering mechanism includes a pinion shaft that serves as the rotary body which operates in conjunction with a steering wheel, and a steered shaft that steers the steered wheels in conjunction with rotation of the pinion shaft; and the motor is an assist motor that generates a steering assist force which is torque in the same direction as a steering direction as the drive force to be applied to the steering wheel.

8. A vehicle control device that controls a motor that serves as a generation source for a drive force to be applied to a steering mechanism of a vehicle on the basis of a command value computed in accordance with a steering state, comprising:

a first computation circuit that computes a first component of the command value in accordance with at least a steering torque;

a second computation circuit that computes a target rotational angle for a rotary body that rotates in conjunction with steering operation of steered wheels on the basis of a basic drive torque which is a total sum of the steering torque and the first component; and a third computation circuit that computes a second component of the command value through feedback control for causing an actual rotational angle of the rotary body to coincide with the target rotational angle, wherein:

the second computation circuit includes:

an estimated axial force computation circuit that computes an axial force from a source external to the vehicle that acts on the steered wheels on the basis of a current value of the motor, and at least one of a dynamic characteristic computation circuit and a static characteristic computation circuit, the dynamic characteristic computation circuit that compensates for an effect of dynamic characteristics of the steering mechanism on the axial force, which is computed by the estimated axial force computation circuit, and the static characteristic computation circuit that compensates for an effect of static characteristics of the steering mechanism on the axial force, which is computed by the estimated axial force computation circuit;

the second computation circuit computes the target rotational angle with the basic drive torque reflecting the axial force, which has been compensated for by the at least one of the dynamic characteristic computation circuit and the static characteristic computation circuit, as a reaction force component for the basic drive torque;

the second computation circuit has at least the dynamic characteristic computation circuit, among the dynamic characteristic computation circuit and the static characteristic computation circuit, on a precondition that the second computation circuit has the estimated axial force computation circuit;

the dynamic characteristic computation circuit compensates for at least one of an inertia of the motor, a viscosity of the motor, and a transfer function of a control element including the feedback control, which is executed by the third computation circuit, as the dynamic characteristics; and the dynamic characteristic computation circuit has an inertia compensation circuit that compensates for the inertia of the motor, a viscosity compensation circuit that compensates for the viscosity of the motor, and a phase compensation circuit that compensates for a phase of the axial force, which is computed by the estimated axial force computation circuit.

9. A vehicle control device that controls a motor that serves as a generation source for a drive force to be applied to a steering mechanism of a vehicle on the basis of a command value computed in accordance with a steering state, comprising:

a first computation circuit that computes a first component of the command value in accordance with at least a steering torque;

a second computation circuit that computes a target rotational angle for a rotary body that rotates in conjunction with steering operation of steered wheels on the basis of a basic drive torque which is a total sum of the steering torque and the first component; and a third computation circuit that computes a second component of the command value through feedback control for causing an actual rotational angle of the rotary body to coincide with the target rotational angle, wherein:

the second computation circuit includes:
an estimated axial force computation circuit that computes an axial force from a source external to the vehicle that acts on the steered wheels on the basis of a current value of the motor, and
at least one of a dynamic characteristic computation circuit and a static characteristic computation circuit, the dynamic characteristic computation circuit that compensates for an effect of dynamic characteristics of the steering mechanism on the axial force, which is computed by the estimated axial force computation circuit, and the static characteristic computation circuit that compensates for an effect of static characteristics of the steering mechanism on the axial force, which is computed by the estimated axial force computation circuit;
the second computation circuit computes the target rotational angle with the basic drive torque reflecting the axial force, which has been compensated for by the at least one of the dynamic characteristic computation circuit and the static characteristic computation circuit, as a reaction force component for the basic drive torque;
the second computation circuit has at least the static characteristic computation circuit, among the dynamic characteristic computation circuit and the static characteristic computation circuit, on a precondition that the second computation circuit has the estimated axial force computation circuit; and
the static characteristic computation circuit has at least one of:
a friction compensation circuit that compensates for an effect of friction of the steering mechanism on the axial force,
an efficiency compensation circuit that compensates for an effect of switching between a forward efficiency, which is an efficiency during forward operation of the steering mechanism, and a reverse efficiency, which is an efficiency during reverse operation, on the axial force, and
a gradient compensation circuit that compensates for an effect of a vehicle speed on the axial force.

10. A vehicle control device that controls a motor that serves as a generation source for a drive force to be applied to a steering mechanism of a vehicle on the basis of a command value computed in accordance with a steering state, comprising:
a first computation circuit that computes a first component of the command value in accordance with at least a steering torque;
a second computation circuit that computes a target rotational angle for a rotary body that rotates in conjunction with steering operation of steered wheels on the basis of a basic drive torque which is a total sum of the steering torque and the first component; and
a third computation circuit that computes a second component of the command value through feedback control for causing an actual rotational angle of the rotary body to coincide with the target rotational angle, wherein:
the second computation circuit includes:
an estimated axial force computation circuit that computes an axial force from a source external to the vehicle that acts on the steered wheels on the basis of a current value of the motor, and
at least one of a dynamic characteristic computation circuit and a static characteristic computation circuit, the dynamic characteristic computation circuit that compensates for an effect of dynamic characteristics of the steering mechanism on the axial force, which is computed by the estimated axial force computation circuit, and the static characteristic computation circuit that compensates for an effect of static characteristics of the steering mechanism on the axial force, which is computed by the estimated axial force computation circuit;
the second computation circuit computes the target rotational angle with the basic drive torque reflecting the axial force, which has been compensated for by the at least one of the dynamic characteristic computation circuit and the static characteristic computation circuit, as a reaction force component for the basic drive torque; and
the second computation circuit comprises:
a plurality of axial force computation circuits that include the estimated axial force computation circuit, an ideal axial force computation circuit that computes an ideal axial force on the basis of the target rotational angle, and a different estimated axial force computation circuit that computes the axial force on the basis of a vehicle behavior or a state amount that reflects a road surface state, and
an allocation computation circuit that computes a final axial force by summing up axial forces, which are computed by the plurality of axial force computation circuits including the estimated axial force computation circuit, at distribution ratios set in accordance with one of the vehicle behavior, the state amount which reflects the road surface state, and the steering state.

11. The vehicle control device according to claim 10, wherein:
the second computation circuit has an axial force amplification unit that amplifies the axial forces, which are computed by the plurality of axial force computation circuits, or the final axial force.

12. The vehicle control device according to claim 10, wherein:
the allocation computation circuit changes the final axial force in accordance with a difference between the ideal axial force, which is computed by the ideal axial force computation circuit, and a sum value obtained by summing up the plurality of axial forces, which are computed by the estimated axial force computation circuit and the different estimated axial force computation circuit, at the distribution ratios which are set in accordance with the vehicle behavior or the state amount which reflects the road surface state.

13. The vehicle control device according to claim 10, wherein:
the allocation computation circuit changes the final axial force in accordance with a difference between the ideal axial force, which is computed by the ideal axial force computation circuit, and one of the plurality of axial forces, which are computed by the estimated axial force computation circuit and the different estimated axial force computation circuit.

* * * * *